United States Patent [19]
Kondo et al.

[11] Patent Number: 5,532,938
[45] Date of Patent: Jul. 2, 1996

[54] NUMERICAL ARITHMETIC PROCESSING UNIT

[75] Inventors: Yoshikazu Kondo; Yutaka Arima, both of Hyogo, Japan

[73] Assignee: Mitsubishi Denki Kabushiki Kaisha, Tokyo, Japan

[21] Appl. No.: 306,300

[22] Filed: Sep. 15, 1994

[30] Foreign Application Priority Data

Jan. 28, 1994 [JP] Japan .................................. 6-008777

[51] Int. Cl.$^6$ .............................. G06F 7/38; G06F 7/00
[52] U.S. Cl. ....................................... 364/736; 364/736.5
[58] Field of Search ............................... 364/736, 736.5, 364/737

[56] References Cited

U.S. PATENT DOCUMENTS

| | | | |
|---|---|---|---|
| 5,175,858 | 12/1992 | Hammerstrom | 395/800 |
| 5,260,897 | 11/1993 | Toriumi et al. | 364/736 |
| 5,307,300 | 4/1994 | Komoto et al. | 364/736 |

FOREIGN PATENT DOCUMENTS

| | | |
|---|---|---|
| 59-99575 | 6/1984 | Japan . |
| 5-20283 | 1/1993 | Japan . |

OTHER PUBLICATIONS

"Parallel Architectures for Artificial Neural Nets", IEEE International Conference on Neural Networks, San Diego, vol. II, pp. 165–172, Jul. 1988, by S. Y. Kung and J. N. Hwang.

"Snap Technical Description", HNC Inc. Apr. 1993.

Primary Examiner—Roy N. Envall, Jr.
Assistant Examiner—Chuong D. Ngo
Attorney, Agent, or Firm—Lowe, Price, LeBlanc & Becker

[57] ABSTRACT

Arithmetic units are supplied with instructions from a control unit in common through an instruction broadcast bus. Each of the arithmetic units includes a process data input port, an address data input port, a process data output port and an address data output port. Address data appearing on the address ports specify addresses of a local memory. Each of the arithmetic units reads corresponding numeric data from the local memory and executes arithmetic processing in accordance with the instruction supplied from the control unit through a computing element group and a register group. In each arithmetic unit, it is possible to specify addresses of the local memory independently of each other. Each unit include circuitry for omitting an arithmetic operation on data read from the local memory when the read out data is negligible.

36 Claims, 49 Drawing Sheets

FLAGS EXPRESSING STATES

A S : "1" WHEN T > S
F A : "1" WHEN A > A(t-1)+1
S J : "1" WHEN EXTERNALLY SUPPLIED Sj IS JUMPED
DM : LSB VALUE OF DATA OF LM(LOCAL MEMORY)
W : "1" WHEN $|\Delta W_{ij}| \leq |\varepsilon(\Delta W)|$
J : W(t-1)
STOP : AS(t-1)
END : "1" WHEN S $\geq$ LIMIT ADDRESS ADDR

X : ARBITRARY

X : ARBITRARY

- FA=0 OR SJ=0 → A → F
- FA=1 AND SJ=1 → A(t-1)+1 → F

- FA=0 OR SJ=0 → A → LM(F)
- FA=1 AND SJ=1 → A → LM(F)

```
BOS210
  111   RESET END
  110   W
  101   STOP
  100   DM
  011   AS, FA, J
  010   END
  001   SJ, RESET STOP
  000   nop
```

NUMERICAL ARITHMETIC PROCESSING UNIT

BACKGROUND OF THE INVENTION

1. Field of the Invention

The present invention relates to a numerical arithmetic processing unit for processing numeric data, and more particularly, it relates to a unit for processing vast amounts of numerical operations at a high speed. More specifically, the present invention relates to a numerical arithmetic processing unit for efficiently performing vast amounts of numerical operations such as operations of sums of products and load value update operations employed in a neural network mathematical model, for example, which must be repeatedly executed at a high speed.

2. Description of the Background Art

With development of the technique of fabricating a semiconductor integrated circuit, the processing speed of a numerical arithmetic processing unit is increased. Namely, a semiconductor integrated circuit is improved in degree of integration and speed with development in micronization of elements and wires for electrically interconnecting the elements with each other, thereby increasing the speed of the numerical arithmetic processing unit. However, the micronization of the semiconductor elements now encounters its physical limit, and it is extremely difficult to remarkably improve the degree of integration and the speed of a semiconductor integrated circuit only by such process technique.

To this end, a technique of improving the overall arithmetic processing speed by implementing parallel arithmetic operations is recently watched with interest.

In general, a conventional parallel processing technique is adapted to extract only parallel-processable operations from a program described in the form of a serial sequential procedure for distribution to a plurality of arithmetic processing units. In relation to such a method of distributing parallel-processable operations to a plurality of arithmetic processing units, there have been developed an MIMD (multi instruction multi data stream) system of distributing a plurality of arithmetic operations having different processing contents to arithmetic processing units for processing in parallel with each other, an SIMD (single instruction multi data stream) system of distributing a number of arithmetic operations having common contents to a plurality of arithmetic processing units for processing the same in parallel with each other, and the like.

In general, however, the MIMD system is inferior in parallelization efficiency, although average meritorious effects can be expected for various applications and programs can be readily described with small fluctuation in parallelization efficiency for any method of describing procedures in this system. According to this system, operations having different contents are processed in parallel with each other, and hence it is difficult to extract a large number of operations which are processable in parallel with each other, leading to reduction in number of arithmetic processing units actually operating in parallel with each other, i.e., parallelization efficiency.

In the SIMD system, on the other hand, parallelization efficiency is remarkably influenced by the contents of the operations although its hardware structure is relatively simple and the design is simplified since a plurality of arithmetic processing units execute a common instruction. This is because the parallelization efficiency depends on whether or not a set of data which are processed in parallel with each other can be efficiently prepared. In simulation of a natural phenomenon or in processing along mathematical model expression of a neural network or the like, however, it is necessary to repeatedly operate vast amounts of numerical values, i.e., to repeatedly execute the same arithmetic operation. In such a field, therefore, process distribution in the SIMD system is simple and effective for implementing high parallelization efficiency. A unit for executing such vast amounts of numerical arithmetic operations is necessary and inevitable for future development of the field of information processing. Thus, improvement in performance of a parallel arithmetic processing unit of the SIMD system is expected.

On the other hand, a neural network is watched with interest as an information processing technique simulating the operation principle of vital neurons. When such a neural network is employed, it is possible to structure a flexible system having high failure immunity, which has been hard to implement in a conventional program type information processing system. In particular, the neural network exhibits a high effect in a recognition system for images, characters and sounds which are hard to program, a multi-degree-of-freedom control system and the like. However, the technique of implementing a neural network is still on the way of development, and a number of neural networks are still in a stage of implementation of low-speed and small-scale systems utilizing general purpose microcomputers. Thus, awaited is parallel processor architecture, which corresponds to a high-speed large-scale neural network.

In relation to such a stream, the parallel processing technique of the SIMD system can be regarded as the architecture which is most suitable for a neural network. The reason for this resides in the arithmetic structure of the neural network.

In the neural network, all arithmetic elements (neurons) perform weighted average processing and nonlinear processing, as described later in detail. Processed data such as synapse load values and neuron state output values are varied with the arithmetic elements. Thus, it is possible to supply an instructions to all arithmetic elements (neurons) in common. This condition meets the requirement of single instruction and multiple data, which is required for the SIMD system.

FIG. 52 illustrates a conceptual structure of each arithmetic element, i.e., a neuron 950, which is employed in a neural network. Referring to FIG. 52, the neuron 950 includes a synapse load part 952 which weighs output state values Sp, Sq, ..., Sr supplied from other neurons with prescribed synapse load values, a total sum part 954 which obtains the total sum of load signals received from the synapse load part 952, and a nonlinear conversion part 956 which nonlinearly processes an output of the total sum part 954.

The synapse load part 952, which stores weight values Wia (a=p, q, ..., r) for respective ones of related neurons, weighs the received output state values Sp, Sq, ... Sr with the corresponding load values Wia and supplies the same to the total sum part 954. Each synapse load Wia indicates coupling strength between a neuron $\underline{a}$ and the neuron 950 (neuron i).

The total sum part 954 obtains the total sum of load state values Wia·Sa received from the synapse load part 952. A total sum value ΣWia·Sa outputted from the total sum part 954 supplies a membrane potential ui of this neuron 950 (neuron i). The total sum Σ is executed for every one of the related neuron units $\underline{a}$.

The nonlinear conversion part 956 applies a prescribed nonlinear function $\underline{f}$ to the membrane potential ui received from the total sum part 954, to form an output state value Si (=f(ui)) of the neuron 950. The nonlinear function f() employed in the nonlinear conversion part 956 is generally prepared from a monotonous non-decreasing function such as a step function or a sigmoid function.

A neural network employs a plurality of neurons each having the function shown in FIG. 52. In a hierarchical neural network, such a plurality of neurons are so connected that the neurons are grouped and the respective groups are layered to provide a hierarchical structure neural network.

FIG. 53 shows an exemplary structure of a three-layer neural network. A hierarchical neural network includes an input layer, an intermediate layer (hidden layer) and an output layer. The intermediate layer may include an arbitrary number of layers. FIG. 53 shows layers I, J and K. These layers I, J and K are arbitrary layers satisfying conditions of being adjacent to each other in a neural network. The layer I includes neurons X1, X2, X3 and X4 and the layer J includes neurons Y1, Y2, Y3 and Y4, while the layer K includes neurons Z1, Z2 and Z3. The neurons Xa (a=1 to 4) of the layer I are coupled with the neurons Yb (b=1 to 4) of the layer J with weights Wbaj. The neurons Yb of the layer J are coupled with the neurons Zc (c=1 to 3) of the layer K with weights Wcbk.

One of features of the neural network resides in that the weight indicating coupling strength between neurons can be set at an optimum value by "learning". One of methods of such learning is a method called "back propagation", which is a learning with an educator. This back propagation method is now briefly described.

When a certain input pattern P is supplied, the respective neurons asynchronously operate to change output state values thereof. In the hierarchical neural network, the neuron output state values are transmitted in the order of the input layer→the intermediate layer→the output layer (feed-forward structure). Namely, when output states Xa (for the purpose of convenience, neurons and corresponding output state values are denoted by the same symbols) of the neurons X1 to X4 of the layer I are outputted, the neurons Yb of the layer J have the following membrane potential ub:

$$ub = \Sigma Wbaj \cdot Xa$$

and the output state values Yb thereof are as follows:

$$Yb = f(ub)$$

When the output state values Yb of the neurons Y1 to Y4 provided in the layer J are transmitted, the neurons Z1 to Z3 of the layer K have the following membrane potential uc:

$$uc = \Sigma Wcbk \cdot Yb$$

and the output state values Zc thereof are as follows:

$$Zc = f(uc)$$

where the total sum $\Sigma$ is obtained with respect to every one of the neurons included in the lower layer.

In learning, errors between output patterns S (S1 to Sk, where $\underline{k}$ represents the number of the neurons included in the output layer) outputted from the output layer and an educator pattern are obtained. The educator pattern shows an output pattern which is expected for the input pattern P. Assuming that the layer K shown in FIG. 53 is the output layer, an error ek of the output state value of each neuron Zc is provided as follows:

$$ek = T - S (= Tc - Zc)$$

An effective error $\delta k$ is obtained from the error ek as follows:

$$\delta k = ek \cdot d(Zc)/duc$$

where d()/duc represents a differential of the output state value of the neuron Zc by the membrane potential uc. This effective error $\delta k$ is transmitted to each neuron Yb of the layer J, so that an error eb of the output state value of this neuron Yb is obtained as follows:

$$eb = \Sigma Wcbk \cdot Sc$$

where the total sum $\Sigma$ is obtained with respect to every neuron of the layer K. An effective error $\delta b$ with respect to the neuron Yb of the layer J is obtained from the error eb as follows:

$$\delta b = eb \cdot d(Yb)/dub$$

Such errors $\underline{e}$ are successively propagated from the upper layer to the lower layer, so that weights W indicating coupling strength levels between the neurons are corrected. A weight Wcbk between each neuron Zc of the layer J and each neuron Yb of the layer K is corrected in accordance with the following equations:

$$\Delta Wcbk = \alpha \cdot \Delta Wcbk(t-1) + \eta \cdot \delta c \cdot Yb$$

$$Wcbk = \Delta Wcbk + Wcbk(t-1)$$

where $\Delta Wcbk(t-1)$ and $Wcbk(T-1)$ represent a weight correction value and a weight value obtained in a precedent weight correction cycle, and $\alpha$ and $\eta$ represent prescribed coefficients. Similarly, a weight Wbaj indicating coupling strength between each neuron Xa of the layer I and each neuron Yb of the layer J is corrected in accordance with the following equations:

$$\Delta Wbaj = \alpha \cdot \Delta Wbak(t-1) + \eta \cdot \delta b \cdot Xa$$

$$Wbaj = \Delta Wbaj + Wcbaj(t-1)$$

In the back propagation, the errors are successively propagated from the upper layer to the lower layer so that the weights W of the neurons of the respective layers are corrected in accordance with the errors. The weights W are repeatedly corrected to minimize errors with respect to an education pattern T.

In such a neural network, the output state values are successively transmitted from the lower layer to the upper layer in an input pattern recognizing operation. At this time, membrane potentials and output state values are calculated in the respective neurons. These calculations correspond to weighted average processing and nonlinear conversion processing. Also in a weight correcting operation, the same arithmetic operation is executed in the respective neurons for correcting the weights. In the weight correcting operation, the aforementioned feed forward processing, error back propagation processing and weight correcting processing are repeatedly executed until errors between the educator pattern and the output patterns are minimized or reduced below a prescribed threshold value. Thus, it is possible to execute such operations in parallel with each other, with the neurons regarded as arithmetic elements (units) in accordance with the SIMD system.

FIG. 54 shows an exemplary structure of a conventional SIMD system arithmetic processing unit. The structure shown in FIG. 54 is described in an article entitled "Parallel Architectures for Artificial Neural Nets" by S. Y. Kung et al., Proceedings of ICNN (International Conference on Neural Network) 1988, IEEE, vol. II pp. 165 to 172, for example.

Referring to FIG. 54, the parallel processing unit includes three processing units P#1 to P#3. The processing units P#1 to P#3, which are identical in structure to each other, include local memories LM1 to LM3 storing weight data, registers R1 to R3 for storing numeric data (output state values) to be processed, and arithmetic parts AU1 to AU3 executing arithmetic operations decided by instructions received through a control bus CB on the weight data read from the local memories LM1 to LM3 and the numeric data stored in the registers R1 to R3.

The registers R1 to R3 are cascade-connected with each other, and an output part of the register R3 is connected to an input part of the register R1 through a register R4. The registers R1 to R4 have data transfer functions, and form a ring registers.

The processing units P#1 to P#3 are supplied with address signals for addressing the local memories LM1 to LM3 in common from a controller (not shown) through an address bus AB. The processing units P#1 to P#3 are also supplied with instructions specifying arithmetic operations to be executed from the controller (not shown) through a control bus CB. Referring to FIG. 54, the instructions which are received through the control bus CB are supplied to the arithmetic parts AU1 to AU3. In the structure shown in FIG. 54, therefore, the same address positions are specified in the local memories LM1 to LM3, and the same instructions are executed in the processing units P#1 to P#3.

The arithmetic processing units shown in FIG. 54 equivalently express the neurons Z1, Z2 and Z3 of the layer K shown in FIG. 53. The processing units P#1 to P#3 correspond to the neurons Z1 to Z3, respectively. The local memories LM1 to LM3 each store weight data in prescribed order. The output state values stored in the registers R1 to R3 are successively shifted, and accordingly positions of the weight data stored in the local memories LM1 to LM3 are adjusted, since the same addresses are specified. The operation is now described.

FIG. 55 shows a state of a first cycle. Referring to FIG. 55, output state values S1 to S3 are stored in the registers R1 to R3 respectively. Weight data W11, W22 and W33 are read from the local memories LM1 to LM3 respectively. The arithmetic parts AU1 to AU3 perform operations of products of the weight data read W11, W22 and W33 from the corresponding local memories LM1 to LM3 and the output state values S1 to S3 stored in the corresponding registers R1 to R3 respectively. Thus, the arithmetic parts AU1 to AU3 generate load values W11·S1, W22·S2 and W33·S3 respectively. The load values calculated by the arithmetic parts AU1 to AU3 are stored in internal registers (not shown).

FIG. 56 shows a state of a second cycle. In the second cycle, the output state values S1 to S4 stored in the registers R1 to R4 are shifted anticlockwise. Thus, the registers R1 to R3 store the output state values S2 to S4 respectively. Each address supplied to the address bus AB is incremented by 1, and next weight data W12, W23 and W34 are read from the local memories LM1 to LM3. In the arithmetic parts AU1 to AU3, load values W12·S2, W23·S3 and W34·S4 are calculated and added to the previously calculated load values. This operation is repeated also in a third cycle, and the registers R1 to R3 store the output state values S4, S1 and S2 in a fourth cycle as shown in FIG. 57. Weight data W14, W21 and W32 are read from the local memories LM1 to LM3. The arithmetic parts AU1, AU2 and AU3 calculate load values W14·S4, W21·S1 and W32·S2, and accumulate these values on the sums of the load values calculated in the precedent cycles. Thus, membrane potentials $\Sigma W1j \cdot Sj$, $\Sigma W2j \cdot Sj$ and $\Sigma W3j \cdot Sj$ are calculated in the arithmetic parts AU1, AU2 and AU3 after completion of the fourth cycle, as shown in FIG. 54.

The above processing is executed for each neuron of the neural network. The membrane potential $u$ obtained for each neuron is nonlinearly converted to provide the output state value of each neuron in one layer. The above operation is repeatedly executed for each layer of the neural network, to decide the output state value of every neuron. After the output state values of the output layer are decided, it is necessary to back-propagate the errors to correct the weight data of the respective neurons in learning. The errors employed for correcting the weight data are propagated as follows:

First, errors $\delta$ with respect to the neuron units of the upper layer are calculated and supplied to the arithmetic parts AU1 to AU3 respectively. In the first cycle, the weight data W11, W22 and W33 are read from the local memories LM1 to LM3 as shown in FIG. 58. The arithmetic parts AU1 to AU3 calculate products W11·$\delta$1, W22·$\delta$2 and W33·$\delta$3 respectively. The products are transmitted to the corresponding registers R1 to R3. Thus, a single term of each of errors e1 to e3 are obtained.

In the next cycle, error components stored in the registers R1 to R4 are shifted anticlockwise as shown in FIG. 59. In synchronization with this shifting, the next weight data W12, W23 and W34 are read from the local memories LM1 to LM3. The arithmetic parts AU1 to AU3 calculate and obtain products W12·$\delta$1, W23·$\delta$2 and W34·$\delta$3, which in turn are added to the error components stored in the corresponding registers R1 to R3, to be stored in the corresponding registers R1 to R3 again. Thus, next components of the errors are obtained. In the fourth cycle, the arithmetic parts AU1 to AU3 calculate and obtain products W14·$\delta$1, W21·$\delta$2 and W32·$\delta$3 through the weight data W14, W21 and W32 read from the local memories LM1 to LM3, as shown in FIG. 60. The products are added to the error components stored in the corresponding registers R1 to R3, to be stored in the corresponding registers R1 to R3 again. After completion of the four cycles, the registers R1 to R4 store $\Sigma Wj1 \cdot \delta$, $\Sigma Wj2 \cdot \delta j$, $\Sigma Wj3 \cdot \delta j$ and $\Sigma Wj4 \cdot \delta j$, as shown in FIG. 61. The respective total sums are obtained with respect to the subscript j. Thus, the errors e1, e2, e3 and e4 with respect to the neurons of the lower layer are obtained. Effective errors are calculated through these errors, to correct synapse load values, i.e., the weight data of the neurons in accordance with the above equations expressing weight correction amounts.

In such a conventional SIMD system arithmetic processing unit, an instruction is supplied to the control bus CB so that the processing units P#1, P#2 and P#3 execute the same arithmetic processing, thereby calculating the membrane potentials of the neurons and the load correction amounts in parallel with each other. All processing units P#1 to P#3 operate in the respective arithmetic cycles, whereby the arithmetic operations can be efficiently carried out.

In the processing system and/or the processing mechanism which has been proposed in general, various devises are structured in consideration of an improvement in utilization efficiency of available resource (arithmetic processing unit). However, no consideration is made on the contents of the arithmetic operations to be executed, and it is premised that all arithmetic operations are executed. In the aforementioned parallel arithmetic processing unit, for example, local memory addresses are supplied to the processing units P# in common to read the weight data, and arithmetic operations are executed on all output state values S and all effective errors δ. In the conventional parallelization method, therefore, it is impossible in principle to make high-speed processing exceeding the so-called "peak performance" indicating processability in parallel operations of all resources.

Such non-dependence on the contents of individual arithmetic operations guarantees versatility of the contents of processing, and is regarded as necessary for ensuring easiness in design by standardization of the processing mechanism.

When the contents of the arithmetic operations are predictable to some extent, however, it may be possible to arrange the individual processing contents for effectively improving the processability. The term "content" of each processing indicates "the content of single integrated processing" such as "calculation of membrane potential of every neuron", for example, and the term "content" of each arithmetic processing indicates "content of each arithmetic operation executed in certain processing" such as individual input data and arithmetic result data in the product of one weight data (synapse load value) in membrane potential calculation and an output state value, for example.

Namely, when it is determinable that a predicted content of arithmetic processing has only a negligible influence in the processing, it is possible to omit this arithmetic processing and that utilizing the result thereof, thereby reducing the processing time. However, a structure of changing a subsequent procedure in consideration of the content of individual arithmetic processing has not yet been implemented.

In the prior art shown in FIG. 54, for example, the output state values S and the effective errors δ are stored in the ring register and successively shifted to execute arithmetic operations. When certain output state values Si or certain effective errors δi have small values which exert no influence on membrane potential calculation and error calculation, it is possible to reduce the number of arithmetic processing times by omitting arithmetic operations related to these numeric data, thereby reducing the processing time. In the structure of this prior art, however, the addresses are supplied to the local memories in common to successively read the weight data. When the data are stored in the ring register with omission of small value numeric data, therefore, the weight data cannot be read from the local memories in correspondence to the numeric data stored in the ring register, and hence no correct arithmetic operations can be performed. In this prior art, further, no consideration is made on a structure of omitting fine data values when such output state values or effective errors reach small values in the process of the arithmetic operations.

SUMMARY OF THE INVENTION

An object of the present invention is to provide a numerical arithmetic processing unit having high processing efficiency.

Another object of the present invention is to provide a numerical arithmetic processing unit which can reduce its processing time.

Still another object of the present invention is to provide a numerical arithmetic processing unit which can change subsequent procedures in consideration of the contents of arithmetic operations.

A further object of the present invention is to provide an SIMD system numerical arithmetic processing unit having high processing efficiency and a short processing time.

A numerical arithmetic processing unit according to the present invention includes storage means storing numeric data, and set means for setting arithmetic operations to be executed following reading of the numeric data in accordance with numerical values of the numeric data read from the storage means.

The storage means preferably includes a plurality of entries, each of which links a numeric part and a numeric code part specifying an operation to be executed with respect to the numeric part and stores the same as numeric data.

The numeric code part preferably specifies whether the related numeric part is data to be arithmetically processed, or that specifying an operation to be subsequently executed.

The set means preferably includes means for setting operations to be subsequently executed in accordance with the numeric code parts.

Each numeric code part further preferably specifies whether the related numeric part is numeric data to be processed or an address indicating a position of the entry for subsequently reading numeric data from the storage means.

The set means preferably includes means for incrementing an address indicating an entry position of the storage means when the numeric code part indicates that the related numeric part is data to be processed, and setting the numeric part as an address indicating an entry position of the storage means to be subsequently accessed when the numeric code part indicates that the related numeric part is an address.

According to the present invention, the content of processing to be subsequently executed is decided by the set means in accordance with the numerical value of each numeric data, whereby the optimum procedure such as omission of arithmetic processing with respect to unnecessary numeric data, for example, can be set in response to the numerical value of the numeric data thereby efficiently executing the processing.

Preferably, a numerical value and a numeric code for specifying processing are linked together and stored in each entry of the storage means, whereby it is possible to readily and correctly identify the characteristic of the numerical value by reading the content stored in each entry for setting the processing for the numerical value.

Preferably, the numeric code part further indicates whether the related numeric part is a numerical value to be arithmetically operated or specifies a procedure to be subsequently executed, so that it is possible to readily and correctly identify the arithmetic processing and the process to be subsequently executed by observing the numeric code part for performing change/no change of the procedure.

Preferably, the set means sets the arithmetic operation to be subsequently executed in accordance with each numeric code part, whereby it is not necessary to observe all numerical values of the numeric data and the structure for setting the processes is simplified.

Preferably, each numeric code part indicates whether the related numeric part is data to be arithmetically operated or an address indicating a storage position of numeric data to be subsequently accessed, whereby it is possible to execute the processing while skipping numeric data requiring no arithmetic processing through such numeric code, for reducing the processing time.

Preferably, the set means sets the value of each address for the storage means in accordance with each numeric code part, whereby it is possible to execute arithmetic processing only on numeric data to be subjected to prescribed arithmetic processing, thereby reducing the processing time.

DESCRIPTION OF THE PREFERRED EMBODIMENTS

[Operation Principle]

Figure 1:
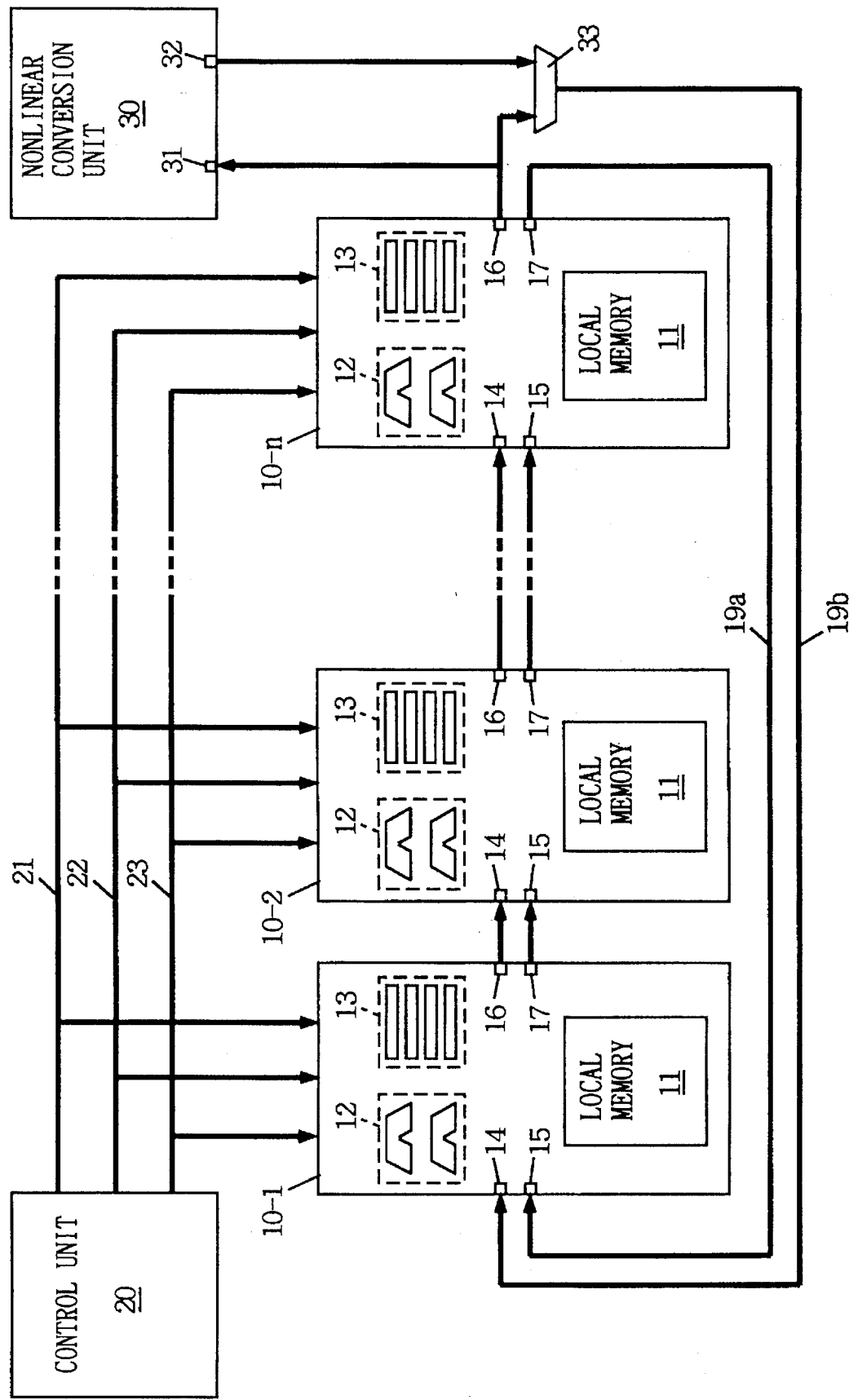
FIG. 1 schematically illustrates an overall structure of a numerical arithmetic processing unit according to the present invention.

Description is now made on an operation principle on which the present invention is made based, with reference to an exemplary neural network.

A neural network, which is mathematical model expression of a neural network, has the following characteristics in the contents of its arithmetic operations:

(a) In a hierarchical neural network, the firing rate of neurons provided in an intermediate layer becomes sparse with progress of learning. In other words, the output state value of each neuron approaches a state to be expected with progress of learning in the hierarchical neural network. Output states of neurons forming an output layer approach states which are decided by expected patterns (educator signals), while the number of neurons in firing states is reduced in the intermediate layer (in general, the firing rate of the neurons provided in the intermediate layer is reduced in proportion to the logarithm of the number of repeated times of learning).

(b) In an interconnected neural network, output states of respective neurons approach such states that the energy of the overall neural network assumes the minimum value with a lapse of time from an initial state upon application of an input pattern. In other words, fluctuation in the output state values of the neurons is reduced with time.

(c) In error back propagation learning, correction amounts of respective load values converge to a small amount.

Due to these characteristics (a) to (c), there arises such a probability that the following arithmetic operations can be omitted. Namely, it is possible to omit arithmetic operations having no influence on overall processing by changing the procedure in consideration of contents or results of the arithmetic operations, thereby reducing the overall processing time.

(1) Due to the aforementioned characteristics (a) and (b), it is possible to omit transfer operations in neurons whose output state values remain unchanged. Namely, it is possible to omit a product related to $\Delta Si(t)=0$ in the following operation of a membrane potential $uj(t)$:

$$uj(t)=uj(t-1)-\Sigma Wji(t) \cdot \Delta Si(t)$$

where $uj(t)$ represents the membrane potential at a time $t$, $uj(t-1)$ represents that in a precedent cycle, $Wji(t)$ represents a synapse load value (weight) at the time $t$, and $\Delta Si(t)=(Si(t)-Si(t-1))$ represents an amount of change of an output state value $Si$. The total sum $\Sigma$ is obtained in relation to the subscript $i$.

(2) Due to the aforementioned characteristic (a), it is possible to omit each operation with an output state value $Si$ of zero in a hierarchical neural network. Namely, it is possible to omit an operation related to $Si(t)=0$ in the following arithmetic operation of the membrane potential $uj(t)$:

$$uj(t)=\Sigma Wji(t) \cdot Si(t)$$

(3) Due to the aforementioned characteristic (c), it is possible to omit each load value update operation for a load value correction amount $\Delta Wji$ of zero in load correction processing in error back propagation learning. Namely, it is possible to omit a weight update operation of $$Wji(t)=Wji(t-1)+\Delta Wji(t)$$

when $$\Delta Wji(t)=\alpha \cdot \Delta Wji(t-1) + \eta \cdot ej(t) \cdot (dSj(t)/duj) \cdot Si=0$$

where $ej(t)$ represents a back propagation error to a neuron $j$, $\alpha$ represents a coefficient of inertia, and $\eta$ represents a learning coefficient.

In the above description, it is assumed that each arithmetic operation is omitted under a condition of an ideal state, i.e., with an amount of fluctuation is zero ($\Delta Si(t)=0$, $Si(t)=0$ and $\Delta Wji(t)=0$). In practice, however, it is also possible to set each condition for omission with a value of not more than a small value $\epsilon$ ($\Delta Si(t) \leq \epsilon a$, $Si(t) \leq \epsilon b$ and $\Delta Wji(t) \leq \epsilon c$). Namely, it is possible to set the percentage of the omitted arithmetic operations, i.e., speed-up of the overall processing and permissible arithmetic accuracy by properly adjusting respective conditions for omission, i.e., the respective threshold values $\epsilon a$, $\epsilon b$ and $\epsilon c$. Thus, it is possible to implement a numerical arithmetic processing unit for efficiently executing processing, particularly a numerical arithmetic processing unit of the SIMD system. The inventive numerical arithmetic processing unit is now described in the order of the overall structure, schematic operations and detailed structures of respective parts.

[Overall Structure]

FIG. 1 schematically illustrates the overall structure of a numerical arithmetic processing unit according to an embodiment of the present invention. Referring to FIG. 1, the numerical arithmetic processing unit includes a plurality of (n in FIG. 1) arithmetic units 10-1 to 10-n which operate in parallel with each other, a control unit 20 which supplies instructions to the plurality of arithmetic units 10-1 to 10-n in common, and a nonlinear conversion unit 30 which performs nonlinear conversion processing on processing result data outputted from the plurality of arithmetic units 10-1 to 10-n.

Each of the arithmetic units 10-1 to 10-n includes a computing element group 12 having a plurality of computing elements for performing arithmetic operations of supplied numeric data, a register group 13 including a plurality of registers for storing numeric data which are required for processing operations and temporarily used data such as status flags, and a local memory 11 storing process data such as the numeric data which are required for the arithmetic operations of the computing element group 12.

Each of the arithmetic units 10-1 to 10-n further includes two input ports 14 and 15 for inputting the numeric data, and two output ports 16 and 17 for outputting the numeric data. The input ports 14 and 15 can input data including numerical values to be processed and address data for addressing the local memory 11 respectively. In the following description, data including numerical values to be processed are referred to as "process data", and the term "numeric data" is employed as those including both of address data and process data.

The output ports 16 and 17 can output process data and address data respectively. Referring to FIG. 1, each arithmetic unit 10 (generically indicating the arithmetic units 10-1 to 10-n) includes two input ports 14 and 15 and two output ports 16 and 17. Alternatively, the arithmetic unit 10 may include three or more input ports and three or more output ports.

The arithmetic units 10-1 to 10-n are cascadeconnected with each other. Namely, the output ports 16 and 17 of an arithmetic unit 10-i (i=1 to n−1) are connected to the input ports 14 and 15 of the next stage arithmetic unit 10-(i+1). The address data output port 17 of the arithmetic unit 10-n in the final stage of such cascade connection is connected to the input port 15 of the arithmetic unit 10-1 in the first stage of the cascade connection through an annular channel 19a. The process data output port 16 of the arithmetic unit 10-n is connected to an input port 31 of the nonlinear conversion unit 30 and to one input of a two-input one-output selector 33. The other input of the selector 33 is connected to an output port 32 of the nonlinear conversion unit 30, while the output of the selector 33 is connected to the process data input port 14 of the arithmetic unit 10-1 through another annular channel 19b.

The selector 33 selects one of process data outputted from the output port 16 of the arithmetic unit 10-n and from the nonlinear conversion unit 30 through the output port 32, and outputs the selected one onto the annular channel 19b under control by the control unit 20 (this control path is not shown in FIG. 1). Thus, the arithmetic unit 10-n is connected in the form of a ring, or the arithmetic units 10-1 to 10-n and the nonlinear conversion unit 30 are connected in the form of a ring in response to the input selection of the selector 33. The annular channels 19a and 19b include paths interconnecting the arithmetic units 10 with each other.

The control unit 20 notifies the arithmetic units 10-1 to 10-n of common instructions through an instruction broadcast bus 21 which is connected with the arithmetic units 10-1 to 10-n in common. The arithmetic units 10-1 to 10-n execute arithmetic operations in accordance with the instructions supplied through the instruction broadcast bus 21. Thus, the arrangement shown in FIG. 1 satisfies the conditions of one control part/multiple arithmetic parts which are required for an SIMD processing unit, whereby it is possible to implement a parallel numerical arithmetic processing unit incorporating nonlinear conversion processing which is necessary for a neural network.

An address broadcast bus 22 and a data broadcast bus 23 are further provided in common for the arithmetic units 10-1 to 10-n. The control unit 20 can write the same process data (or constant data) in the same address positions or specific registers of the local memories 11 of the arithmetic units 10-1 to 10-n by simultaneously notifying the arithmetic units 10-1 to 10-n of address data and process data (or constant data) through the address broadcast bus 22 and the data broadcast bus 23.

Figure 2:
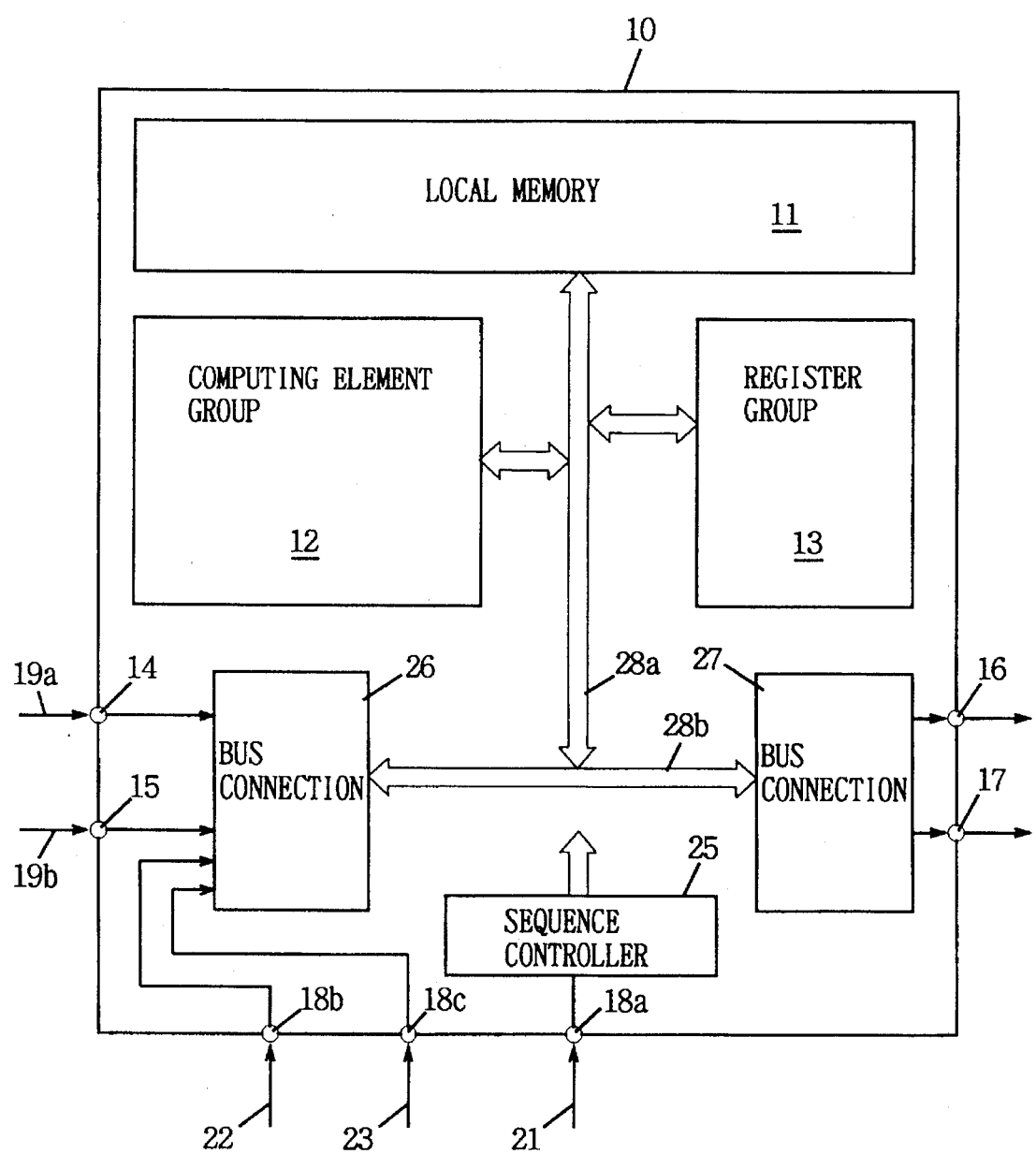
FIG. 2 schematically illustrates an internal structure of an arithmetic unit shown in FIG. 1.

FIG. 2 schematically illustrates the internal structure of each arithmetic unit 10. Referring to FIG. 2, the arithmetic unit 10 includes an instruction input port 18a for receiving an instruction supplied through the instruction broadcast bus 21, input ports 18b and 18c receiving address data and process data (or constant data) supplied through the address broadcast bus 22 and the data broadcast bus 23, a sequence controller 25 which executes an operation necessary in the arithmetic unit 10 in accordance with the instruction received through the input port 18a, a bus connection circuit 26 which transmits numeric data supplied on the input ports 14 and 15 or the input ports 18b and 18c to an internal bus 28b under control by the sequence controller 25, and another bus connection circuit 27 which transmits numerical data on the internal bus 28b to the output ports 16 and 17.

The sequence controller 25 includes a control circuit controlling operations performed in the arithmetic unit 10 such as connection between the local memory 11, the computing element group 12 and the register group 13 with an internal bus 28a and access operations such as writing and reading of numeric data in and from the local memory 11, the computing element group 12 and the register group 13, and write/read circuitry and selectors and the like for executing these operations.

The structure of the arithmetic unit 10 conceptually shown in FIG. 2 is similar to that utilized in a digital signal processor (DSP) which performs an operation of sums of products at a high speed. In the arithmetic unit 10 shown in FIG. 2, however, the circuits included in the sequence controller 25, structures of which are described later in detail, have functions of changing subsequent procedures in accordance with numerical values of numeric data.

Figure 3:
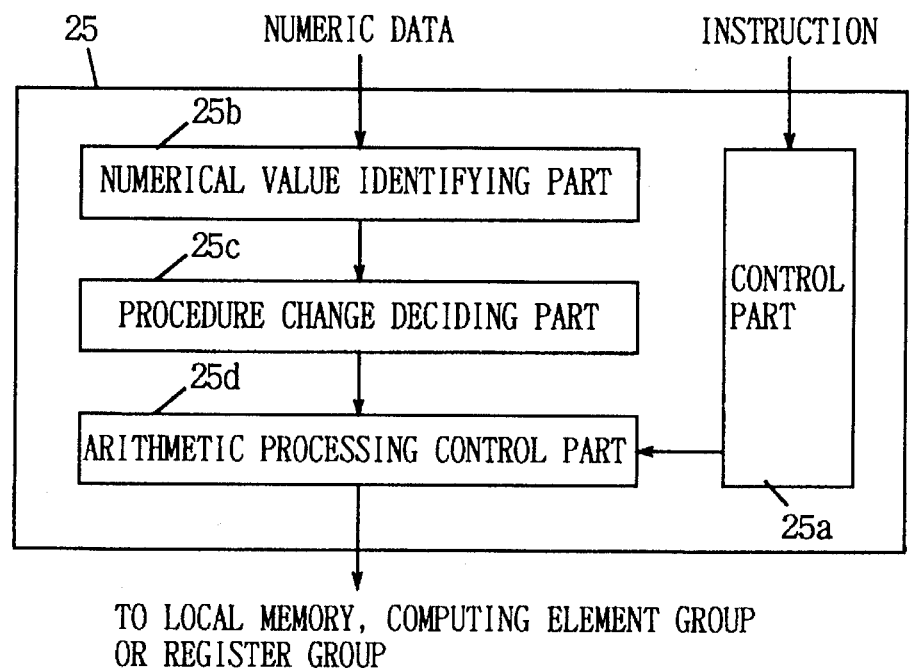
FIG. 3 schematically illustrates a functional structure of a sequence controller shown in FIG. 2.

As shown in FIG. 3, the sequence controller 25 includes a control part 25a which decodes the instruction received from the control unit 20 for generating control signals required for executing the instruction and the buses among the elements of each arithmetic unit with each other, a numerical value identifying part 25b for identifying numerical values of received numeric data in execution of arithmetic processing, a procedure change deciding part 25c for deciding whether or not subsequent procedures are to be changed in accordance with the numerical values identified by the numerical value identifying part 25b, and an arithmetic processing control part 25b for setting procedures of subsequent arithmetic operations in accordance with the result of decision by the procedure change deciding part 25c for executing the set arithmetic operations.

The arithmetic processing control part 25d is supplied with the control signals from the control part 25a. This arithmetic processing control part 25d executes access control and transmission of numeric data with respect to the local memory 11, the computing element group 12 or the register group 13. The numeric data processed therein are not status flags which are generally employed in a processor but process data to be arithmetically operated, and supplied to an arithmetic processing part (such as the computing element group 12, for example) similarly to process data arithmetically operated by the computing element group 12.

It is possible to omit unnecessary arithmetic operations by providing the function of changing subsequent procedures in accordance with the numerical values of the numeric data, thereby efficiently executing the processing. A specific structure of such procedure change is described later in detail.

Figure 4:
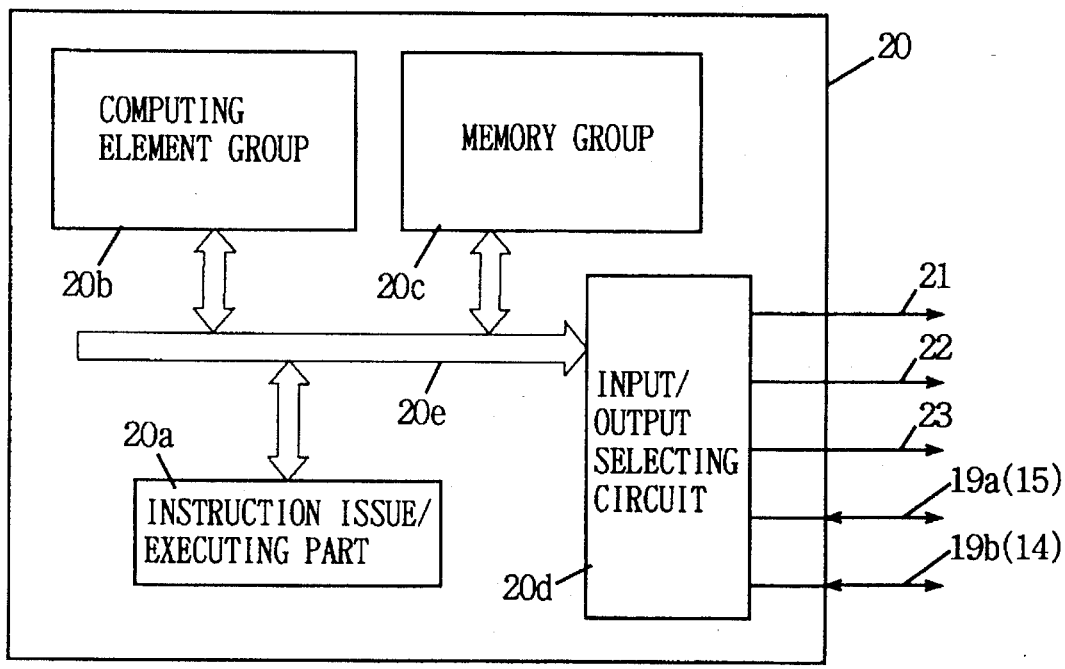
FIG. 4 schematically illustrates an internal structure of a control unit shown in FIG. 1.
Figure 20:
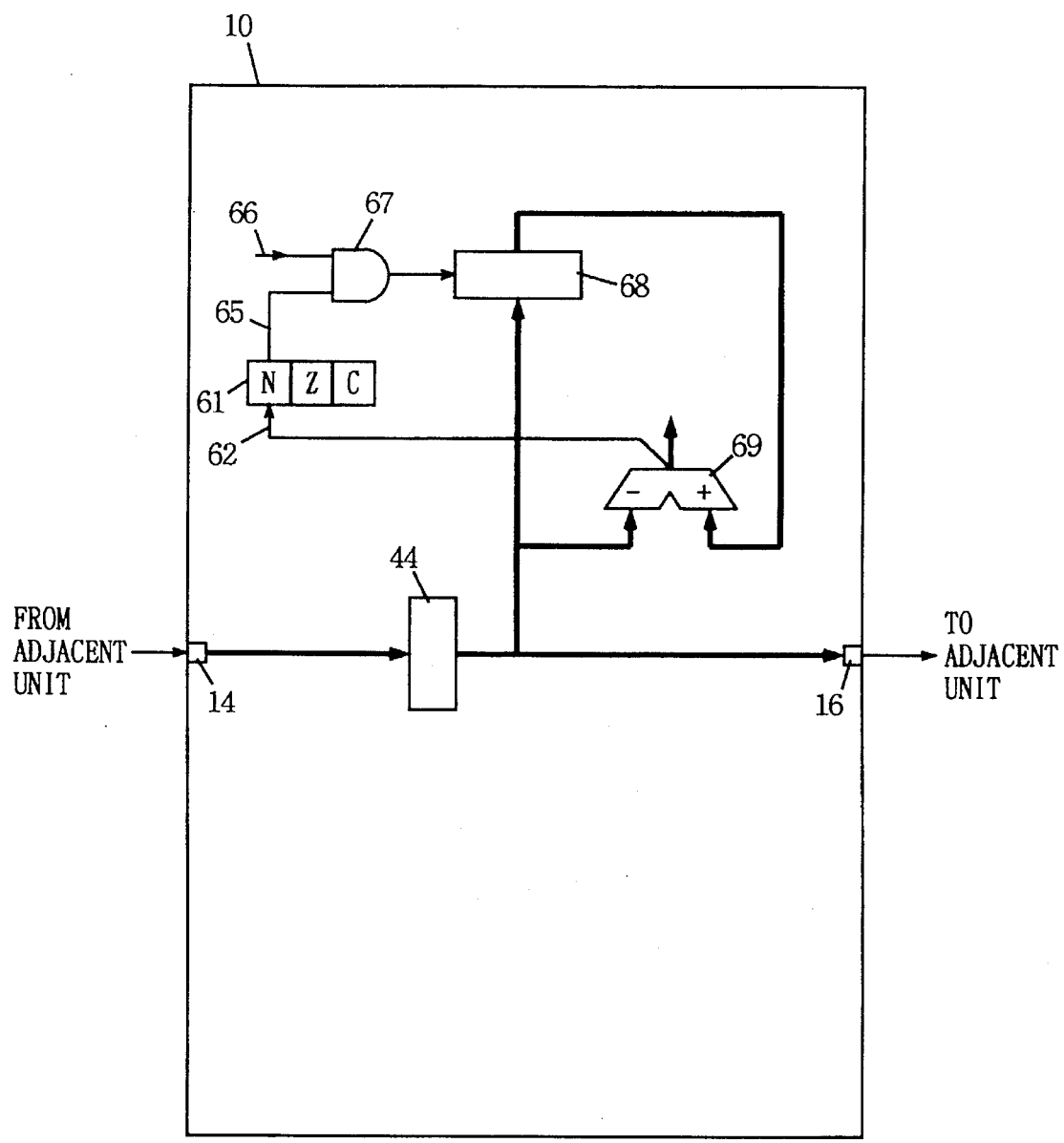
FIG. 20 illustrates a structure of an arithmetic processing unit implemented following the arrangement shown in FIG. 19.

FIG. 4 schematically illustrates the control unit 20 shown in FIG. 20. Referring to FIG. 4, the control unit 20 includes an instruction issue/executing part 20a, a computing element group 20b, a memory group 20c and an input/output selecting circuit 20d. The instruction issue/executing part 20a includes an instruction memory, and has a function of successively transmitting instructions stored in the instruction memory along progress of operations to the instruction broadcast bus 21 through the input/output selecting circuit 20d and generating necessary process or constant data by executing the instructions, for transmitting the same onto the address broadcast bus 22 and the data broadcast bus 23 through the input/output selecting circuit 20d. The instruction issue/executing part 20a further has a function of executing necessary arithmetic operations through the computing element group 20b and the memory group 20c in accordance with the instructions stored in the instruction memory. This instruction issue/executing part 20a can bidirectionally transfer data with the annular channels 19a and 19b (or the input ports 14 and 15 of the arithmetic units 10) through the input/output selecting circuit 20d.

Referring again to FIG. 1, the arithmetic units 10-1 to 10-n include the process data input ports 14 and the address data input ports 15 respectively, as hereinabove described. The input ports 14 and 15 and the output ports 16 and 17 are interconnected with each other between adjacent ones of the arithmetic units 10-1 to 10-n. Therefore, it is possible to independently set addresses for the local memories 11 of the respective arithmetic units 10-1 to 10-n in accordance with process data currently supplied at the same time. This structure can execute sum of product operations $uj=\Sigma Wji \cdot Si$ required by a neural network at a high speed, and contributes to implementation of a function for omitting waste operations as described later in detail. Description is now made on implementation of sum of product operations for calculating membrane potentials in the neural network.

Figure 5:
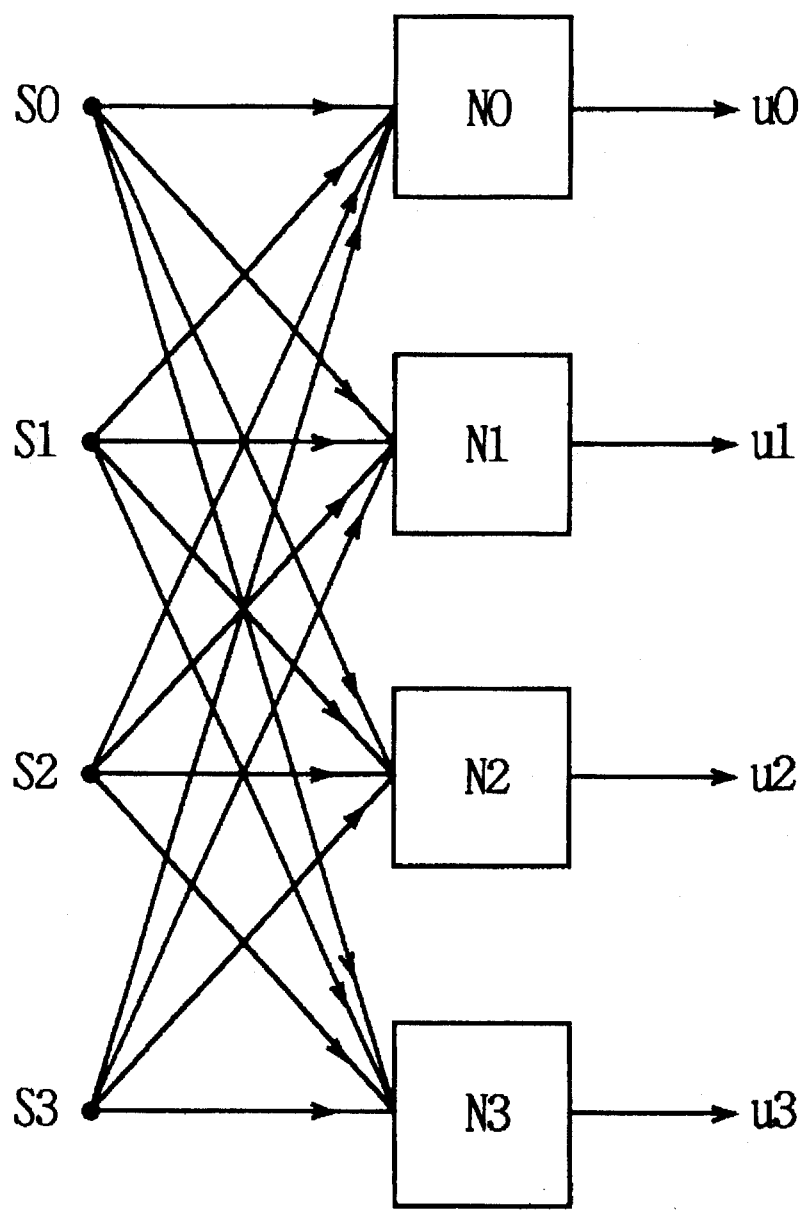
FIG. 5 illustrates a structure of a neural network utilized for illustrating the operation of the numerical arithmetic processing unit according to the present invention.

Description is made on an operation for calculating membrane potentials u0 to u3 generated by neurons N0 to N3 of a layer J in accordance with output state values S0 to S3 from neurons of a layer I as shown in FIG. 5. Each of the neurons N1 to N4 corresponds to a single arithmetic unit.

Figure 6:
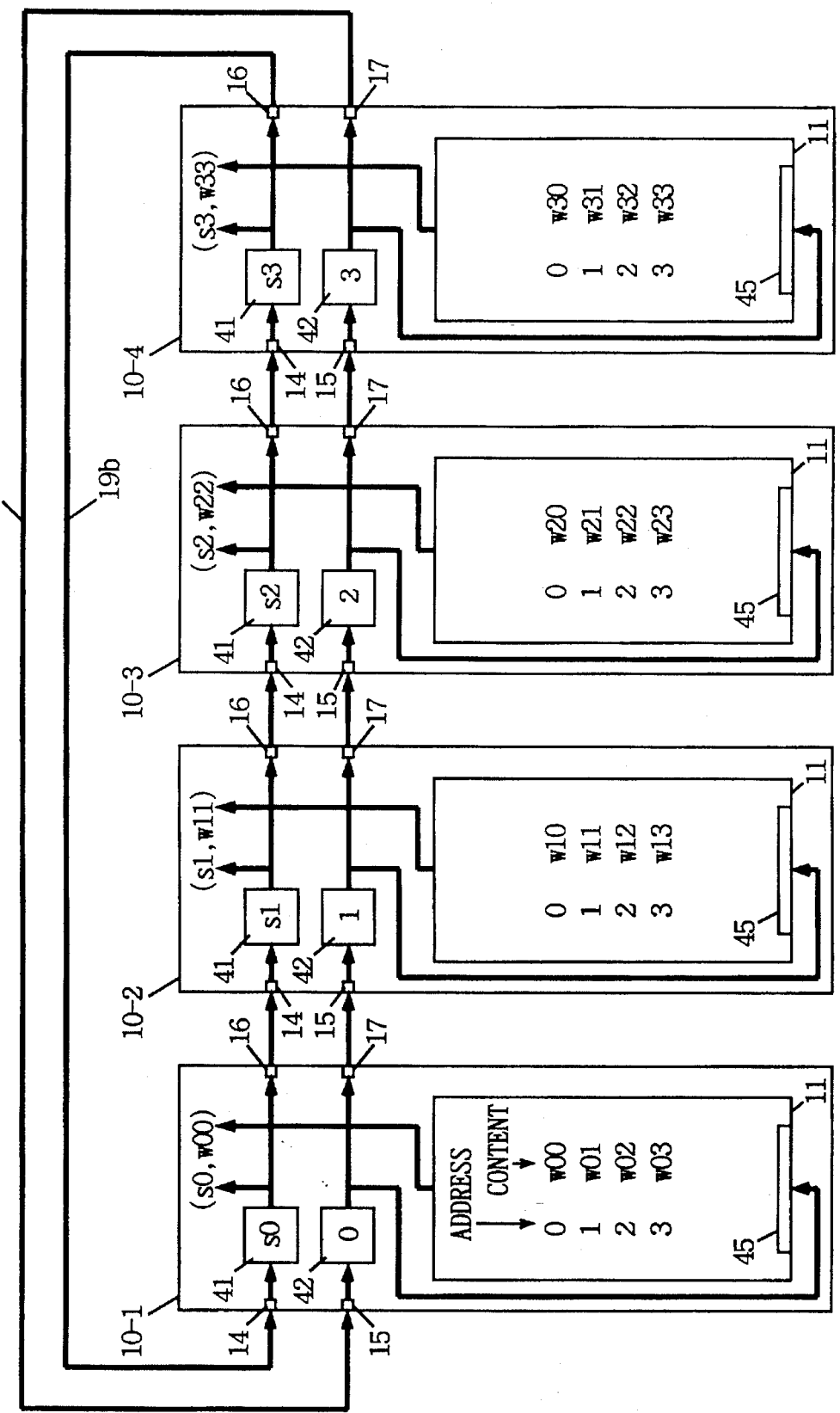
FIG. 6 is a diagram for illustrating an arithmetic processing operation in the numerical arithmetic processing unit according to the present invention.

FIG. 6 shows arrangement of numeric data in execution of sum of product operations for calculating the membrane potentials uj. Referring to FIG. 6, four arithmetic units 10-1 to 10-4 are interconnected with each other in the form of a ring. In each of the arithmetic units 10-1 to 10-4, the process data input port 14 is coupled to a register 41, and the address data input port 15 is coupled to another register 42. The registers 41 and 42 are so connected that data stored therein are transmitted to the process data output port 16 and the address data output port 17. Due to this connection mode, the registers 41 and 42 of the arithmetic units 10-1 to 10-4 are connected in the form of rings. In each of the arithmetic units 10-1 to 10-4, the register 41 stores an output state value Si (i=0 to 3) of the neuron, and the register 42 stores an address $i$ for identifying the neuron generating the output state value stored in the register 41.

In each of the arithmetic units 10-1 to 10-4, the local memory 11 stores corresponding weight data (synapse load value) Wji in an address position corresponding to the neuron identifying address $i$ generating the output state value Si. Namely, the local memory 11 of the arithmetic unit 10-1 stores a synapse load value W0i in an address $i$. In the local memory 11 of the arithmetic unit 10-2, a synapse load value W1i is stored in an address $i$. In the local memory 11 of the arithmetic unit 10-3, a synapse load value W2i is stored in an address $i$. In the local memory 11 of the arithmetic unit 10-4, a synapse load value W3i is stored in an address $i$. In each of the arithmetic units 10-1 to 10-4, address data held by the register 42 is supplied to an address decoder 45 which is provided in the local memory 11. In each of the arithmetic units 10-1 to 10-4, further, the synapse load value Wji read from the local memory 11 is transmitted to an arithmetic part (not shown) with the output state value Si stored in the corresponding register 41, so that product operations are executed and the product results are accumulated.

The connection mode shown in FIG. 6 is established by the sequence controller 25 shown in FIG. 2 in accordance with a product operation starting instruction. Storage of the output state values and the corresponding address data in the registers 41 and 42 may be successively transmitted from the control unit 20, or successively loaded from an external control unit (not shown). From an initial state shown in FIG. 6, the numeric data held in the registers 41 and 42 are shifted clockwise every cycle to be successively transmitted to the registers 41 and 42 of the related adjacent arithmetic units.

Figure 7:
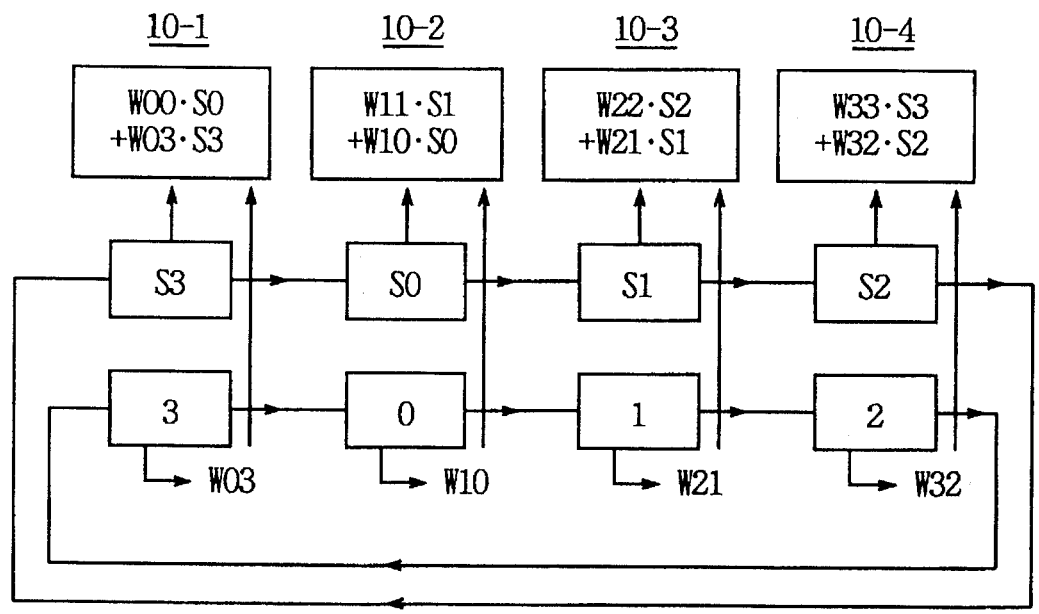
FIG. 7 is a diagram for illustrating an operation of the numerical arithmetic processing unit according to the present invention.

In a next state, the arithmetic unit 10-1 is supplied with an output state value S3 and an address 3 and the arithmetic unit 10-2 is supplied with an output state value S0 and an address 0 while the arithmetic unit 10-3 is supplied with an output state value S1 and an address 1 and the arithmetic unit 10-4 is supplied with an output state value S2 and an address 2, as shown in FIG. 7. Synapse load values are read from the corresponding local memories 11 in accordance with the respective addresses, to execute product operations and adding operations. Thus, two product terms are added and the result is stored in each of the arithmetic units 10-1 to 10-4.

Figure 8:
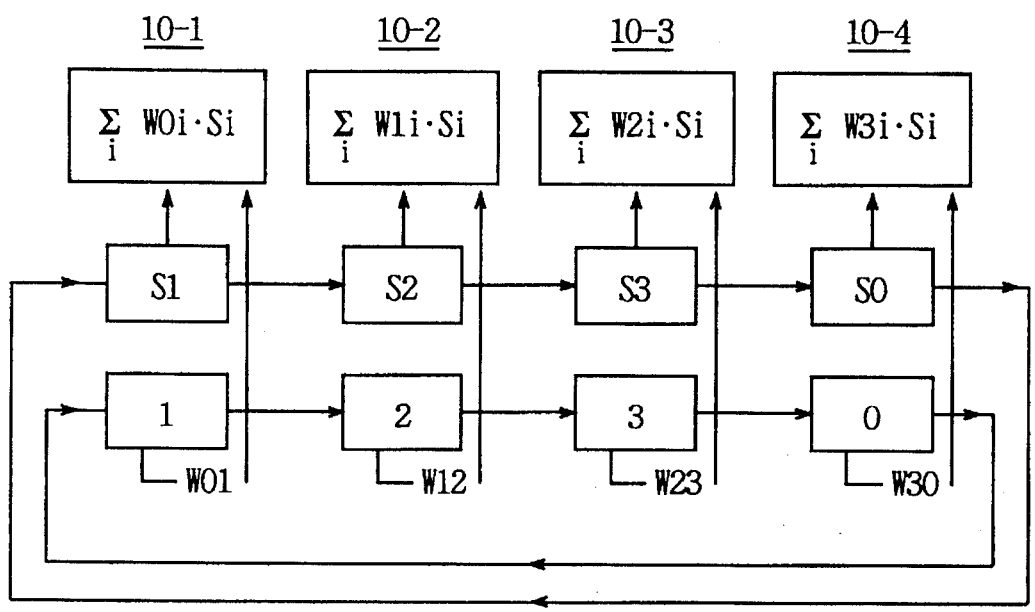
FIG. 8 is a diagram for illustrating an operation of the numerical arithmetic processing unit according to the present invention.

When the shift operation is executed three times, the arithmetic unit 10-1 stores the output state value S1 and the address 1 and the arithmetic unit 10-2 is supplied with the output state value S2 and the address 2 while the arithmetic unit 10-3 is supplied with the output state value S3 and the address 3 and the arithmetic unit 10-4 is supplied with the output state value S0 and the address 0, as shown in FIG. 8. In accordance with these addresses, the arithmetic units 10-1 to 10-4 read corresponding synapse load values from the local memories 11 and calculate products with the output state value S1 to accumulate the results. The arithmetic unit 10-1 is successively supplied with (W00, S0), (W01, S1), (W02, S2) and (W03, S3) as a set of (synapse load value, output state value) to execute a sum of product operation. The arithmetic unit 10-2 is successively supplied with process data pairs of (W11, S1), (W12, S2), (W13, S3) and (W10, S0) to execute sum of product operations.

The arithmetic unit 10-3 successively execute sum of product operations by process data pairs of (W22, S2), (W23, S3), (W20, S0) and (W21, S1). The arithmetic unit 10-4 is successively supplied with process data pairs of (W33, S3), (W30, S0), (W31, S1) and (W32, S2) to execute sum of product operations. After completion of these cycles, therefore, the arithmetic units 10-1 to 10-4 calculate and store membrane potentials uj respectively. In any clock cycle, the arithmetic units 10-1 to 10-4 are supplied with output state values and addresses, to execute sum of product operations. Thus, all arithmetic units 10-1 to 10-4 execute arithmetic operations without entering idle states, and it is possible to complete the processing at a high speed.

Since both of the output state values and the addresses i for identifying the neurons outputting the output state values are supplied, the local memories 11 may simply store the corresponding synapse load value data in neuron identifying address positions dissimilarly to the conventional structure, and it is not necessary to store the synapse load values in consideration of cycles for circulating the output state values. Thus, it is possible to readily store the synapse load values in the local memories 11.

The aforementioned operating characteristics remain applicable intactly also when the number of the arithmetic units 10 and the process data (synapse load values) are increased. Thus, it is possible to readily extend a large-scale neural network requiring processing of several 100 to several 1000 elements (neurons), thereby efficiently executing arithmetic operations.

The aforementioned structure of transmitting both of the output state values and the corresponding addresses thereby specifying different addresses in the local memories in the respective arithmetic units brings the aforementioned easiness of extension of the network since there is no need for change in response to the order of storage of the synapse load values and that of transmission of the output state values, while it is possible to readily omit waste operations such as multiplication of zero or small values. A number of such waste operations are caused in output state values of nonlinearly processed neurons, as described later in more specific terms. Particularly in the final stage of the operation, it is frequent that 80 to 90% of output state values require no calculation. When such waste operation elements are not supplied to the arithmetic units 10, therefore, waste operations are omitted and hence it is possible to execute the processing at a higher speed. The structure for omitting such waste operations is now described.

It is assumed here that output state values S2, S3, S5 and S7 of four neurons reach zero or small values when sum of product operations uj=$\Sigma$Wji·Si in a range of 0≦i ≦7 are executed in parallel through four arithmetic units 10-1 to 10-4. The conventional unit requires eight clock cycles (arithmetic cycles) due to existence of eight output state values S0 to S7 of the neurons.

Figure 9:
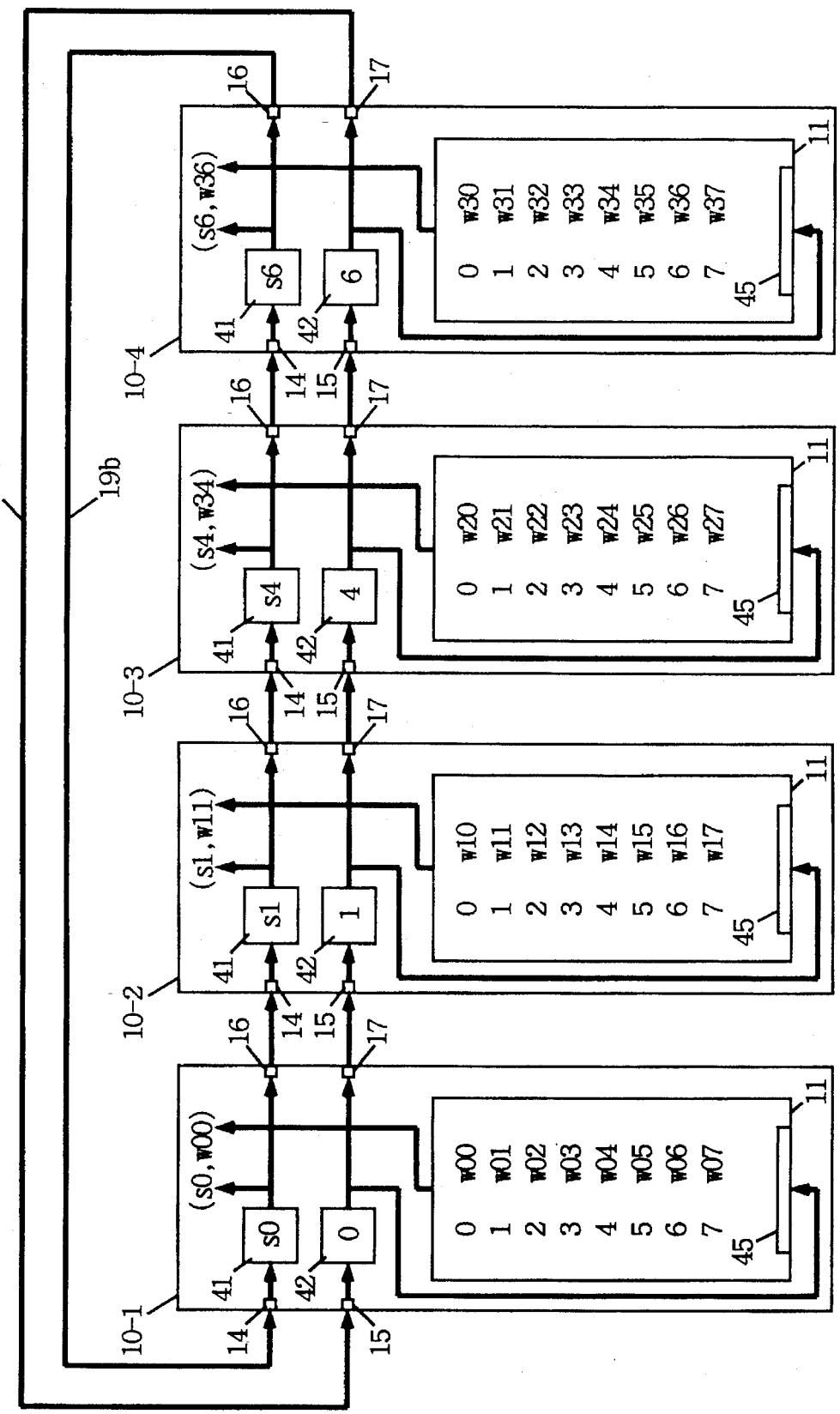
FIG. 9 is a diagram for illustrating an operation of the numerical arithmetic processing unit according to the present invention.

According to the present invention, on the other hand, only the output state values S0, S1, S4 and S6 requiring arithmetic operations are supplied to the arithmetic units 10-1 to 10-4, as shown in FIG. 9. At this time, addresses 0, 1, 4 and 6 are also supplied to the arithmetic units 10-1 to 10-4 in correspondence to the output state values S0, S1, S4 and S6 respectively. In the arithmetic units 10-1 to 10-4, synapse load values read from the local memories 11 are those stored in storage positions specified by addresses which are stored in the registers 42. Therefore, the sum of product operations are completed in four clock cycles (arithmetic cycles).

The arithmetic unit 10-1 executes a sum of product operation with respect to process data (W00, S0), (W01, S1), (W04, S4) and (W06, S6). The arithmetic unit 10-2 is successively supplied with process data (W11, S1), (W14, S4), (W16, S6) and (W10, S0) to execute a sum of product operation.

The arithmetic unit 10-3 is successively supplied with process data (W24, S4), (W26, S6), (W20, S0) and (W21, S1) to execute a sum of product operation. The arithmetic unit 10-4 is successively supplied with process data (W36, S6), (W30, S0), (W31, S1) and (W34, S4) to execute a sum of product operation.

No operation is executed with respect to process data related to the four output state values S2, S3, S5 and S7 causing waste operations, whereby the arithmetic processing can be executed at a high speed. Such a waste operation omitting function cannot be obtained in a conventional unit having only one input/output port or a structure of supplying address information of the local memories 11 to the respective arithmetic units in common. Results obtained by simulation as to improvement of processing efficiency by such waste operation omission are now described in more specific terms.

[Simulation Results of Waste Operation Omission]

Figure 10:
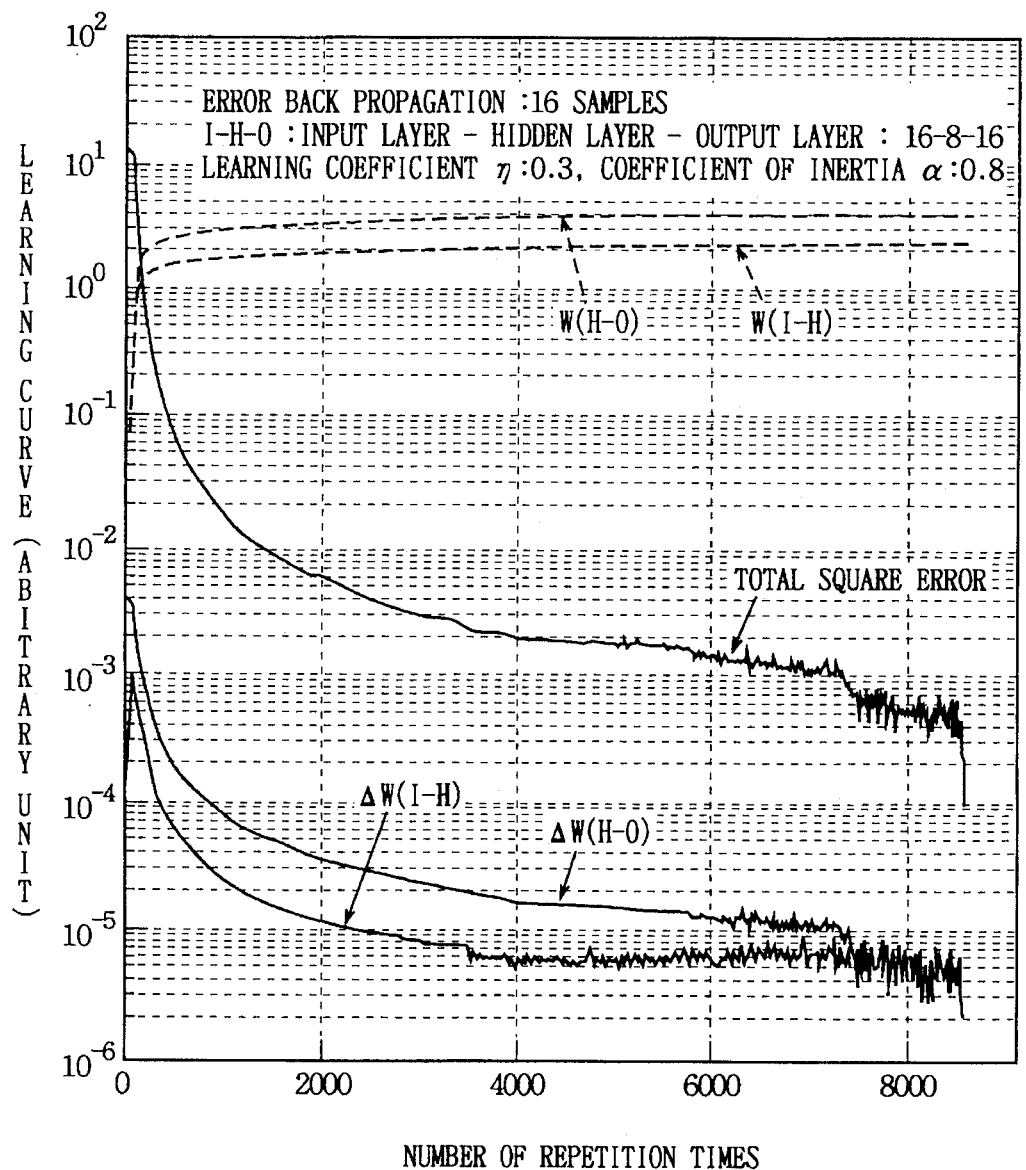
FIG. 10 shows results of simulation for illustrating an effect of omission of arithmetic processing in a neural network.

FIG. 10 shows results obtained by simulation through software for synapse load value correction amounts, total square errors and synapse load values varied with the number of learning repetition times in learning in a hierarchical neural network in accordance with error back propagation. The neural network has three-layer structures of an input layer I, a hidden layer H and an output layer O. The input layer I, the hidden layer H and the output layer O include 16, 8 and 16 neurons respectively. A learning coefficient $\eta$ is 0.3, and a coefficient $\alpha$ of inertia is 0.8. Referring to FIG. 10, the axis of abscissas shows the number of learning repetition times, and the axis of ordinates shows learning curves in arbitrary units.

A curve W(I-H) shows an average value <|Whi|> of absolute values of synapse load values Whi between the input layer neurons and the hidden layer neurons, and a curve W(H-0) shows an average value <|Woh|> of absolute values of synapse load values Woh between the hidden layer neurons and the output layer neurons. A curve $\Delta$W(I-H) shows an average value <|$\Delta$Whi|> of absolute values of synapse load value correction amounts between the input layer neurons and the hidden layer neurons, and a curve $\Delta$W(H-0) shows an average value <|$\Delta$Woh|> of absolute values of synapse load value correction amounts between the hidden layer neurons and the output layer neurons. The total square error shows the total sum $\Sigma e^2$ of errors $e$ of all neurons. In the simulation results shown in FIG. 10, all operations are performed with no omission. It is understood that amounts of change of the parameters W(I-H), W(H-0), $\Delta$W(I-H), $\Delta$W(H-0) and $\Sigma e^2$ are reduced with progress of the learning.

Figure 11:
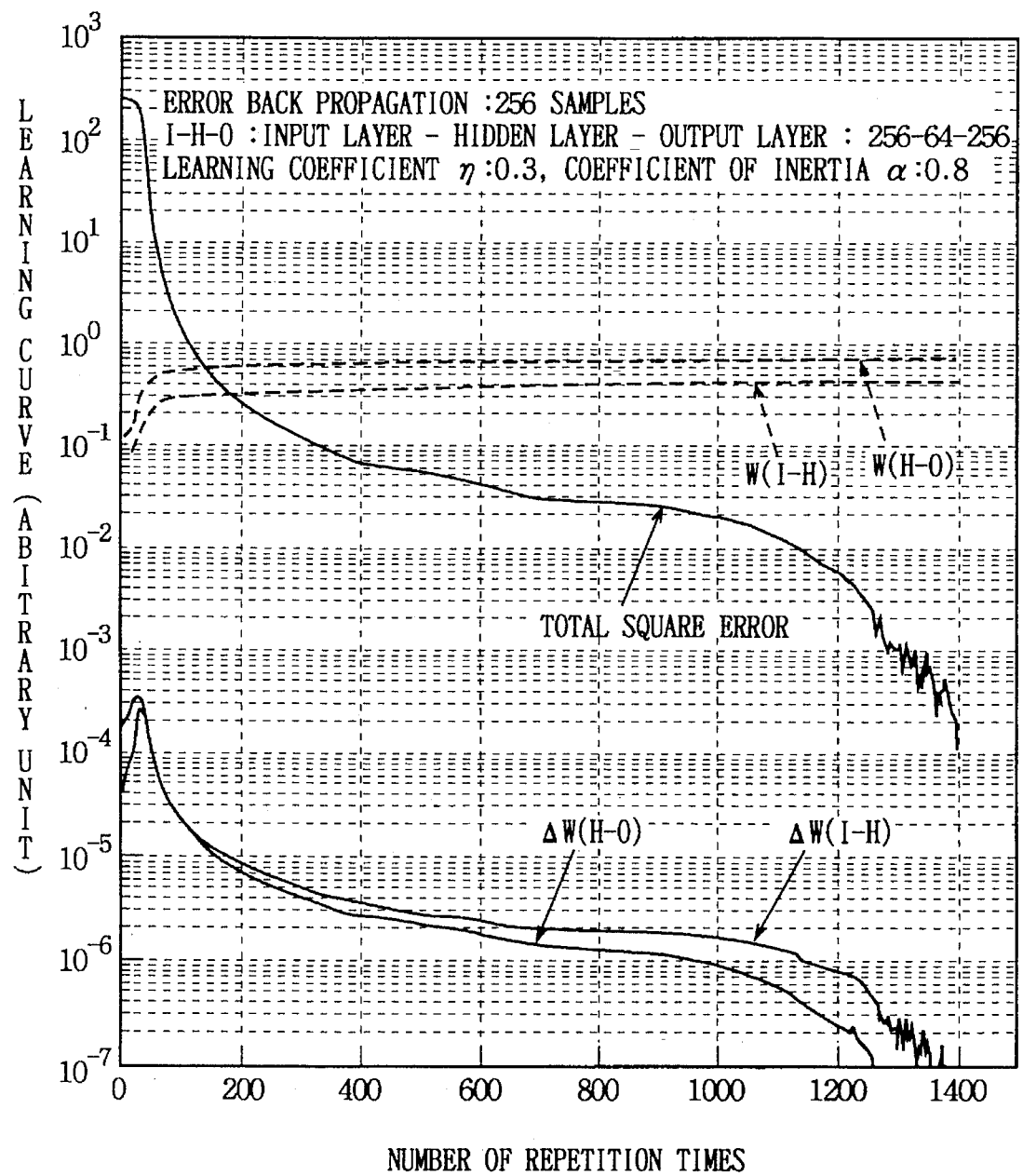
FIG. 11 shows results of simulation for illustrating an effect of reduction of arithmetic processing in the neural network.

FIG. 11 shows results obtained by simulation through software for synapse load values, the synapse load value correction amounts and total square errors varied with the number of learning repetition times in learning in a hierarchical neural network in accordance with error back propagation. In the simulation shown in FIG. 11, an input layer, an hidden layer and an output layer include 256, 64 and 256 neurons respectively. A learning coefficient $\eta$ and a coefficient $\alpha$ of inertia are 0.3 and 0.8 respectively. Respective parameters shown in FIG. 11 are defined identically to those shown in FIG. 10. Also in the simulation shown in FIG. 11, all arithmetic operations are executed. The number of samples as employed is 256. Also in the simulation results shown in FIG. 11, amounts of change of the respective parameters are reduced with progress of learning.

Figure 12:
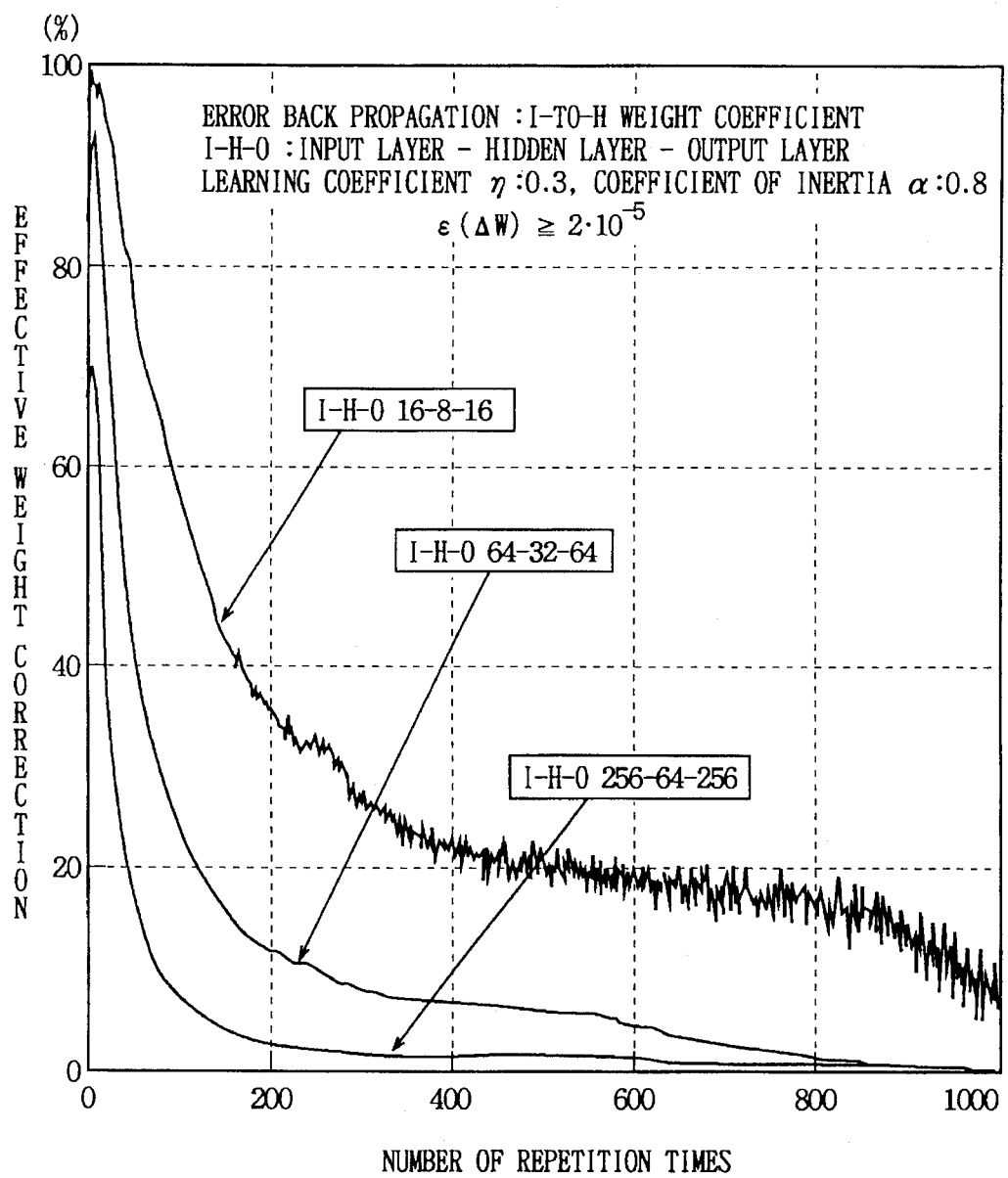
FIG. 12 shows results of simulation for illustrating the effect of omission of arithmetic processing in the neural network.

FIG. 12 shows change rates of synapse load value correction amounts, which are greater than a threshold value $\epsilon(\Delta W)$, between input layer neurons and hidden layer neurons in learning by error back propagation.

Referring to FIG. 12, $2 \cdot 10^{-5}$ is employed as the threshold value $\epsilon(\Delta W)$. A learning coefficient $\eta$ and a coefficient $\alpha$ of inertia are 0.3 and 0.8 respectively. Referring to FIG. 12, the axis of ordinates shows effective weight correction amounts (number of neurons having synapse load correction amounts exceeding the threshold value $\epsilon(\Delta W)$/number of neurons subjected to correction of synapse load values) with respect to neural networks having 16, 8 and 16 neurons, 64, 32 and 64 neurons and 256, 64 and 256 neurons in input layers I, hidden layers H and output layers O respectively in percentage, and the axis of abscissas shows the number of learning repetition times. As understood from FIG. 12, effective weight correction is reduced with progress of learning in any neural network structure. Namely, the number of neurons whose synapse load value correction amounts $\Delta Whi$ are reduced below the threshold value $\epsilon$ is increased with progress of learning.

Figure 13:
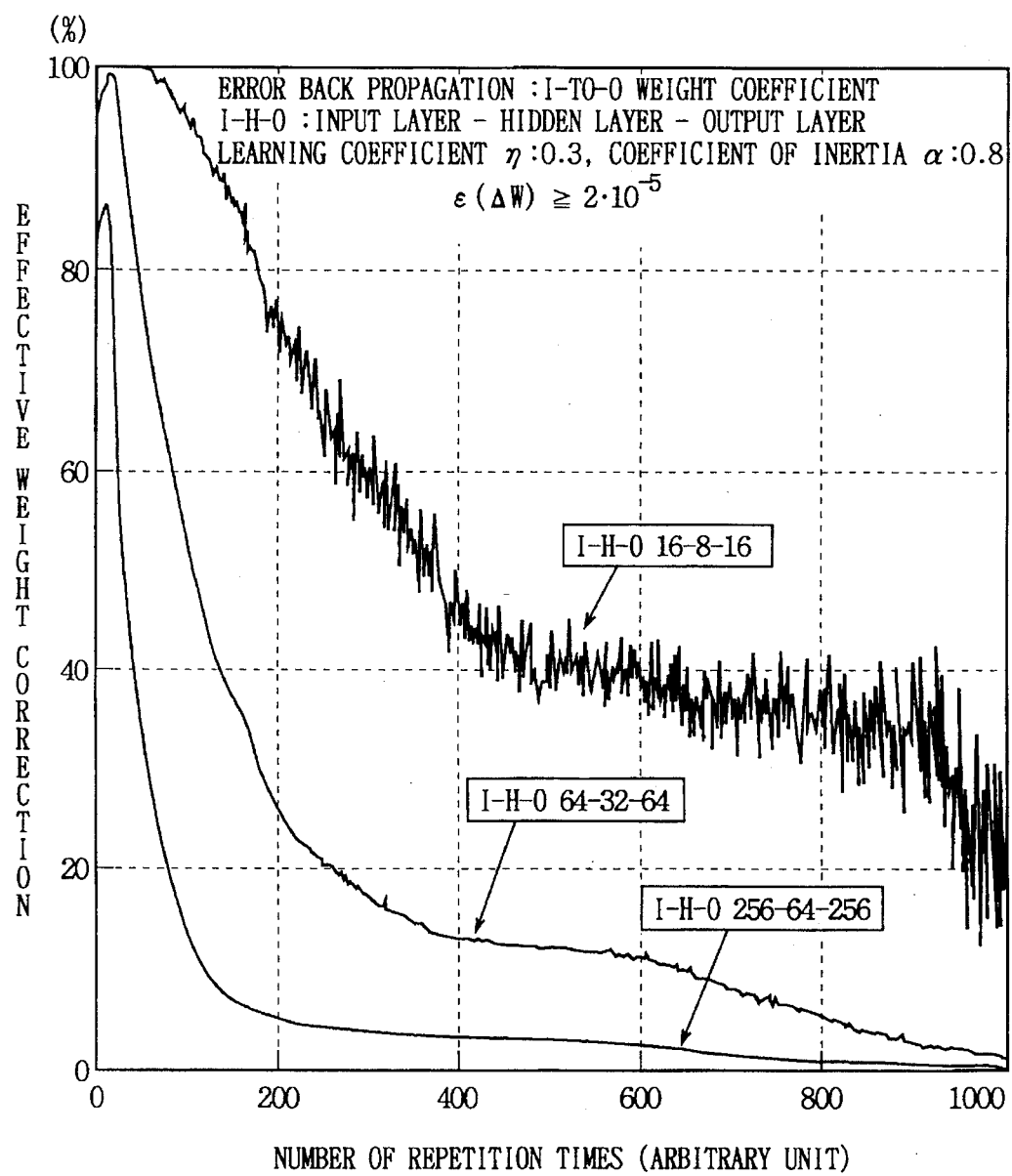
FIG. 13 shows results of simulation for illustrating the effect of omission of arithmetic processing in the neural network.

FIG. 13 shows effective weight correction between hidden layer neurons and output layer neurons in learning by error back propagation in a three-layer neural network. The effective weight correction which is shown in the axis of ordinates in FIG. 13 in percentage is obtained by software through conditions similar to those for obtaining the effective weight correction shown in FIG. 12. The axis of ordinates in FIG. 13 shows the number of learning repetition times in arbitrary units. Also in synapse load value correction arithmetic operations between the hidden layer neurons and the output layer neurons, the number of neurons whose synapse load value correction amounts $\Delta Woh$ are greater than a threshold value $\epsilon(\Delta W)$ is reduced with progress of learning (with increase in number of repetition times).

Figure 14:
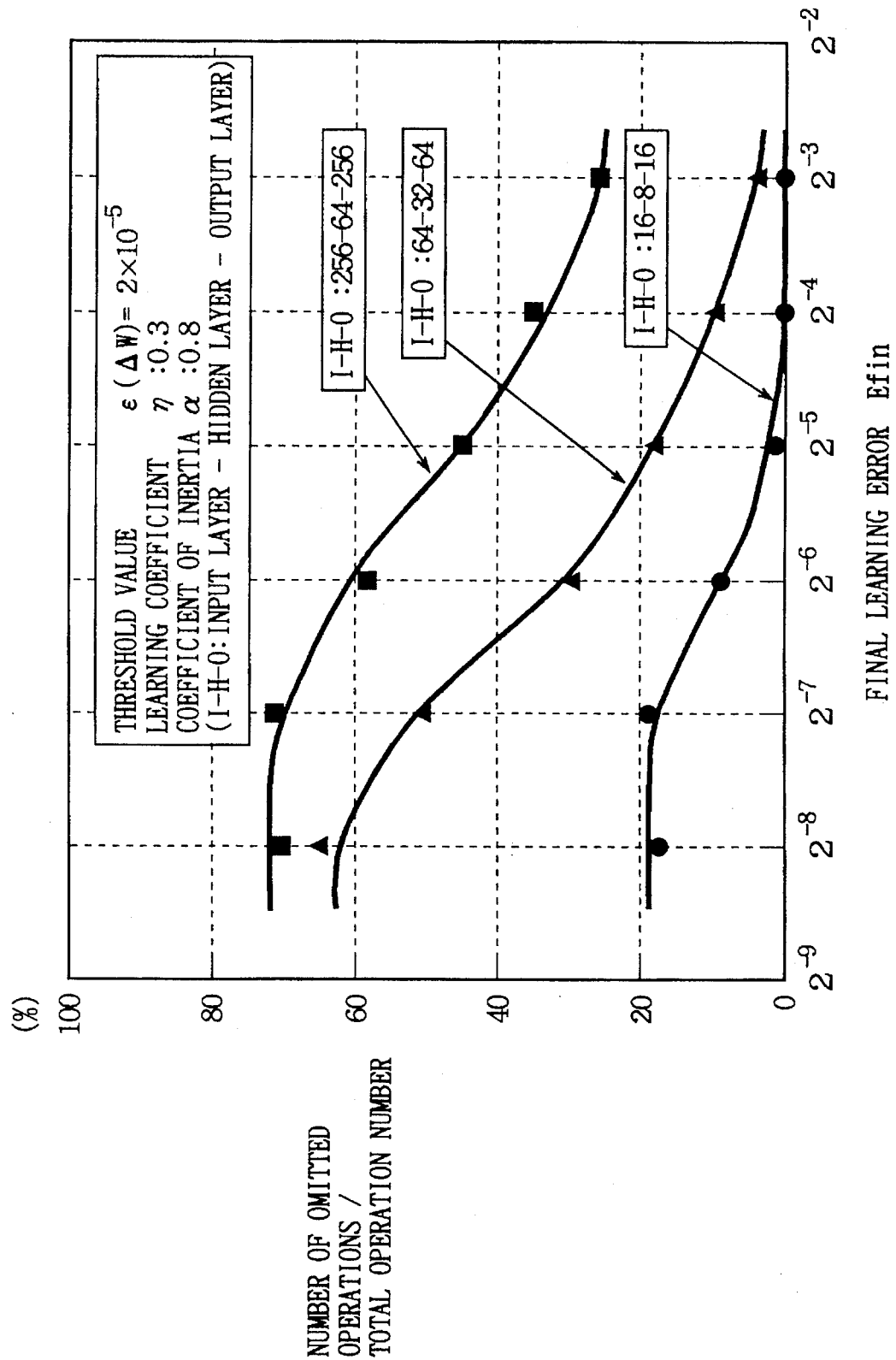
FIG. 14 illustrates results of correspondence between numbers of omitted arithmetic operations and arithmetic accuracy in a neural network obtained by simulation.

FIG. 14 shows relations between final learning errors and numbers of processed operations, which is obtained by software simulation. Conditions of learning in FIG. 14 are identical to those employed for simulation shown in FIGS. 12 and 13. The axis of abscissas shows final learning errors Efin (errors between output patterns and educator patterns), and the axis of ordinates shows rates (percent) of numbers of omitted operations with respect to the total operation number. When the final learning errors Efin, i.e., allowed arithmetic errors are large, the learning is completed in an insufficient state (a state with a small number of learning repetition times) and hence synapse load values W and synapse load value correction amounts are relatively large and the number of omissible operations (operations related to synapse load value correction amounts less than the threshold value $\epsilon(\Delta W)$) is reduced.

When the final learning errors Efin are small, on the other hand, the synapse load values W and the synapse load value correction amounts are reduced, i.e., effective weight correction is reduced. When the final learning errors Efin are reduced, therefore, the number of omissible operations is increased and the processing speed is increased. In a neural network having 256, 64 and 256 neurons in input, hidden and output layers, for example, about 70% of arithmetic operations can be omitted when the final learning error Efin is $2^{-8}$.

As clearly understood from FIG. 14, it is possible to omit unnecessary arithmetic operations and remarkably improve the processing speed by providing pairs of input and output ports and supplying the same with process data and address data respectively so that different addresses can be specified in the respective arithmetic units. In addition to the threshold value $\epsilon(\Delta W)$ for the synapse load value correction amount $\Delta W$, threshold values $\epsilon(S)$ and $\epsilon(\Delta S)$ may also be provided for an output state value S and an output state value change amount $\Delta S$ respectively, to adjust processing accuracy and the processing speed.

In addition to the aforementioned arithmetic operation omitting effect, the structure shown in FIG. 1 has the following advantages:

As shown in FIG. 1, the arithmetic units 10-1 to 10-n are connected to the address broadcast bus 22 and the data broadcast bus 23 in common, and the control unit 20 can simultaneously notify the arithmetic units 10-1 to 10-n of address data and process data or constant data through these buses 22 and 23. Namely, the control unit 20 can notify all arithmetic units 10-1 to 10-n of constant data and address data which are necessary for the arithmetic units 10-1 to 10-n in common. Only the control unit 20 stores numeric data (constant data, for example) which are necessary for all arithmetic units 10-1 to 10-n in common, to notify the arithmetic units 10-1 to 10-n of the common numeric data at need. Thus, it is possible to implement reduction of storage capacities of the local memories 11 and saving of address information holding registers in the arithmetic units 10-1 to 10-n with no requirement for all-the-time storage of such common numeric data in the arithmetic units 10-1 to 10-n, thereby reducing the unit scale.

Further, it is possible to insert the nonlinear conversion unit 30 in the annular channel 19b by the selector 33 only when it is required. The nonlinear conversion unit 30 generally has a large unit scale since it performs complicated nonlinear conversion processing. Due to provision of the selector 33, it is possible to utilize the single nonlinear conversion unit 30 for all arithmetic units 10-1 to 10-n in common. Thus, there is no need to provide nonlinear conversion units in all arithmetic units 10-1 to 10-n, and hence a unit having a small occupied area can be implemented. Processing of nonlinear conversion $Sj=f(uj)$ is executed in the following manner, for example:

In each of the arithmetic units 10-1 to 10-n, the membrane potential uj obtained by the sum of product operation $\Sigma Wji \cdot Si$ is stored in the register 41 which is connected with the data input port 14 and the data output port 16 (see FIG. 6). Then, the connection path of the selector 33 is so switched as to insert the nonlinear conversion unit 30 in the annular channel 19b. Similarly to the sum of product operation value, the membrane potential uj stored in each register 41 is through to the annular channel 19b in accordance with clocks. The nonlinear conversion unit 30 performs nonlinear conversion on the membrane potential uj as received every clock, and supplies the conversion result to the selector 33 through the output port 32. The membrane potentials are successively nonlinearly converted from the membrane potential un stored in the arithmetic unit 10-n, so that the nonlinearly converted output state value Sn is stored in the register 41 of the first stage arithmetic unit 10-1 through the selector 33 and the annular channel 19b. Clocks of the same number as the arithmetic units 10-1 to 10-n are supplied to shift the data stored in the registers 41 of the arithmetic units 10-1 to 10-n, thereby storing the output state values Si in the registers 41 of the arithmetic units 10-1 to 10-n.

It is also possible to provide the nonlinear conversion unit 30 with a function of sequentially working output state values Sj. For example, it is possible to decide whether each output state value Sj is in excess of a threshold value $\Delta\epsilon(S)$ through a comparator after nonlinear conversion processing to prevent transmission of an output state value Sj of zero or a minute value to the annular channel 19b while omitting the operation.

[Modification 1]

Figure 15:
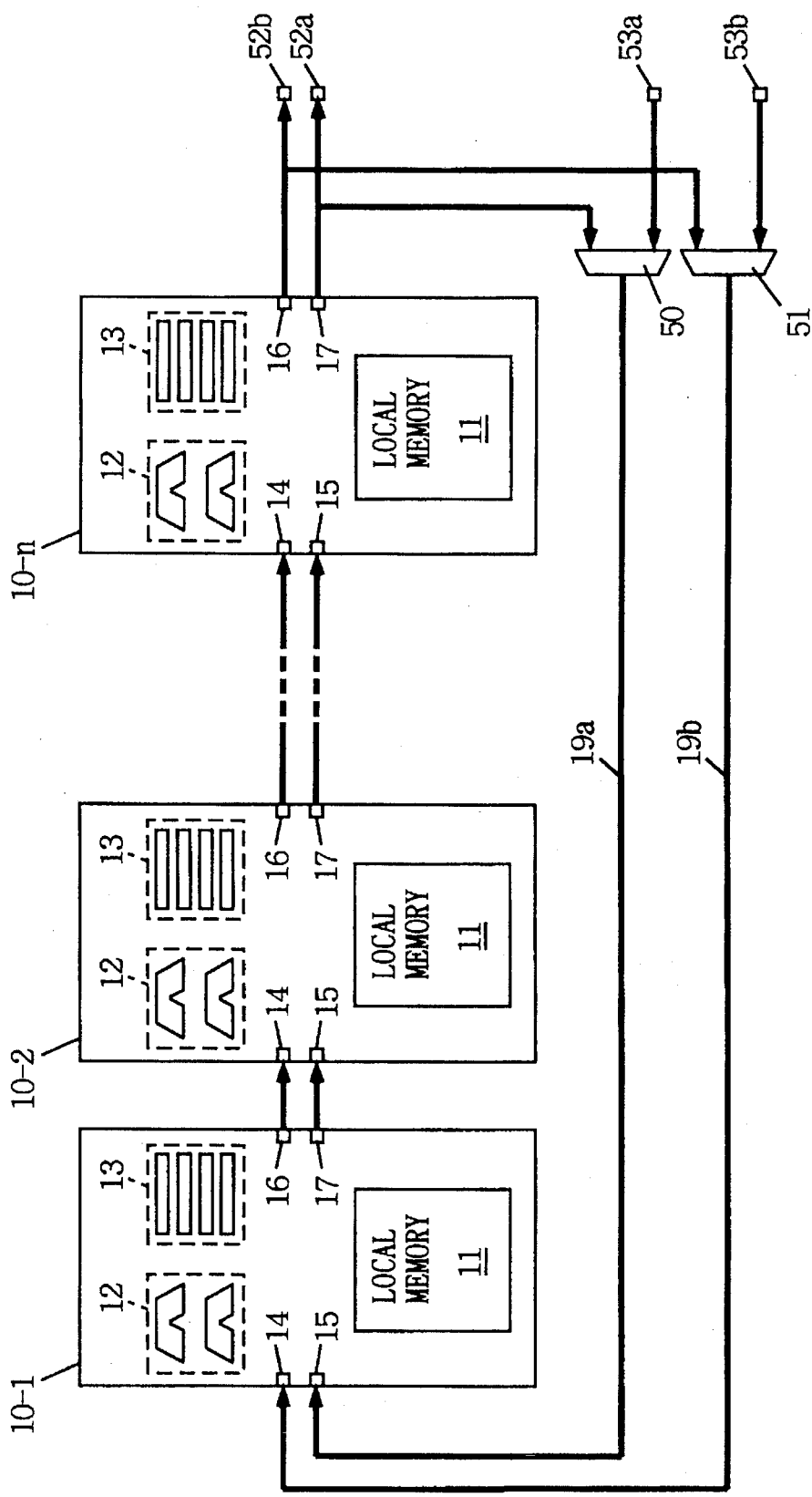
FIG. 15 illustrates a first modification of the numerical arithmetic processing unit according to the present invention.

FIG. 15 shows a structure of a modification of the inventive numerical arithmetic processing unit. In the arrangement shown in FIG. 15, selectors 50 and 51 are inserted in annular channels 19a and 19b respectively. The selector 50 selects one of output data from an output port 17 of an arithmetic unit 10-n and data (not restricted to numeric data) supplied from an input terminal 53a, and supplies the selected one to an input port 15 of an arithmetic unit 10-1 through the annular channel 19a. The selector 51 selects one of output data supplied from an output port 16 of the arithmetic unit 10-n and data supplied through an input terminal 53b, and supplies the selected one to an input port 14 of the arithmetic unit 10-1 through the annular channel 19b. Output ports 16 and 17 of the arithmetic unit 10-n are connected to output terminals 52b and 52a. The input terminals 53a and 53b and the output terminals 52a and 52b are signal (data) input/output terminals provided on a semiconductor chip on which this numerical arithmetic processing unit is formed.

Connection paths of the selectors 50 and 51 are preferably set from the exterior by controlling potentials of specific pin terminals, or by fixedly connecting specific pads on the chip to prescribed potentials. This is because the selectors 50 and 51 are mainly adapted to interconnect a plurality of chips each provided with the numerical arithmetic processing unit shown in FIG. 1 with each other for extending the scale of the neural network. When the neural network is formed by a single numerical arithmetic processing unit (chip), on the other hand, connection paths of the selectors 50 and 51 may be established under control by the control unit 20 (see FIG. 1), for convenience in loading of data to be processed from the exterior.

Description is now made on extension of the scale of the neural network through the selectors 50 and 51.

In general, only several or several 10 arithmetic units can be integrated on a single semiconductor chip with respect to a single control unit, due to restriction of a currently available fabrication technique (refer to "An 11-Million Transistor Neural Network Execution Engine" by Griffin M. et al., ISSCC Digest of Technical Papers, 1991, pp. 180–181). In order to form a large-scale neural network by interconnecting several 100 to several 1000 arithmetic units, therefore, it is necessary to interconnect a plurality of semiconductor chips, each provided with numerical arithmetic processing units, with each other. Due to provision of the selectors 50 and 51, it is possible to readily implement a large-scale neural network by interconnecting semiconductor chips with each other.

Figure 16:
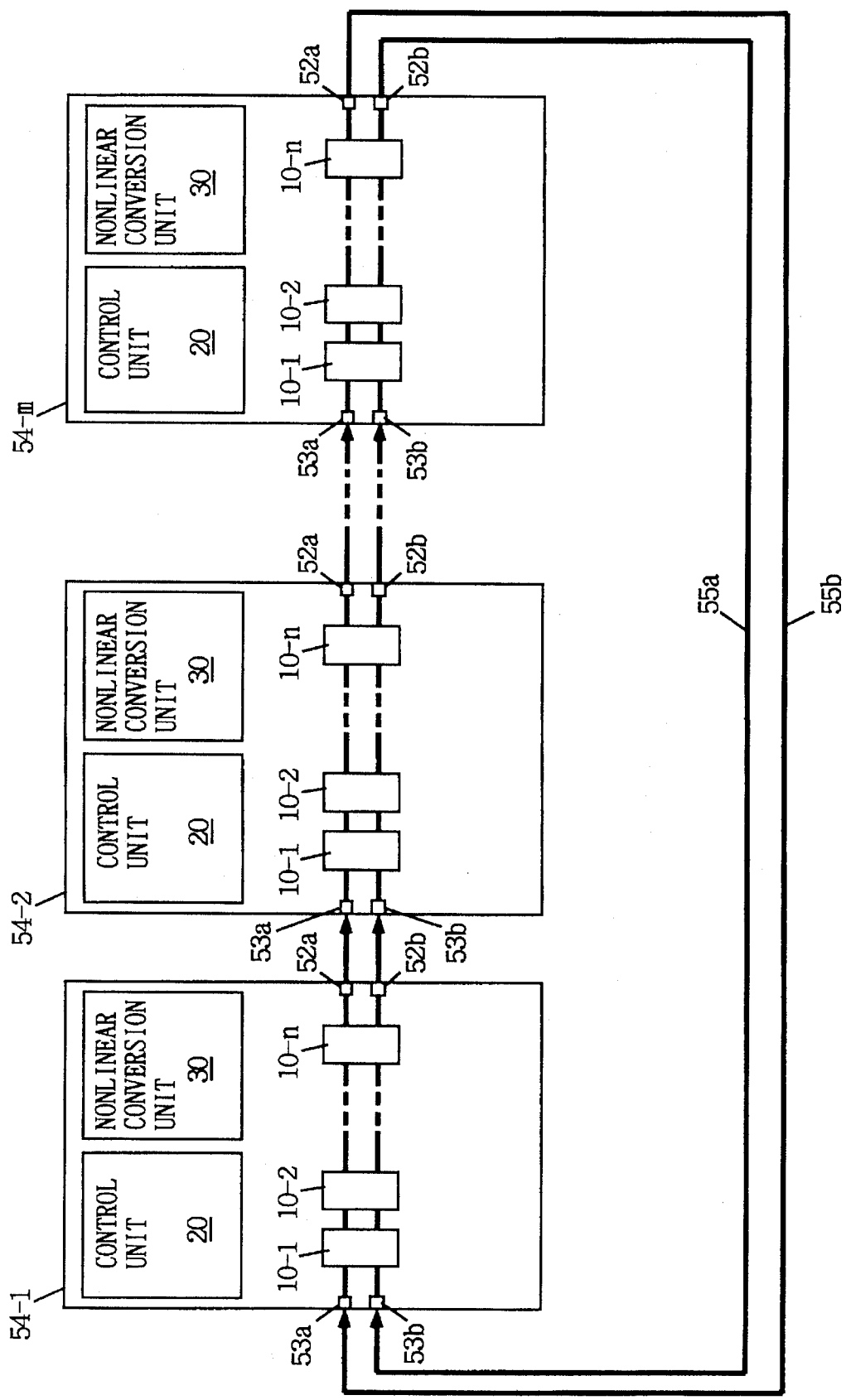
FIG. 16 is a diagram for illustrating an effect of the numerical arithmetic processing unit shown in FIG. 15.

FIG. 16 shows a connection mode of interconnecting m (m: an integer greater than or equal to 2) semiconductor chips 54-1 to 54-m. Each of the semiconductor chips 54-1 to 54-m, which are identical in structure to each other, includes a control unit 20, a nonlinear conversion unit 30, and arithmetic units 10-1 to 10-n, similarly to the structure shown in FIG. 1. Selectors 50 and 51 (not shown) are set in states of selecting data supplied to input terminals 53a and 53b. Output terminals 52a and 52b of a semiconductor chip 54-k (k=1 to m−1) are connected to input terminals 53a and 53b of a next stage semiconductor chip 54-(k+1). The output terminals 52a and 53b of the semiconductor chip 54-m are connected to the input terminals 53a and 53b of the semiconductor chip 54-1 through annular channels 55a and 55b. Therefore, large annular channels are formed to connect n·m arithmetic units in the form of a ring, thereby implementing a large-scale neural network.

In each of the semiconductor chips 54-1 to 54-m, the arithmetic units 10-1 to 10-n are supplied with process data indicating output state values and addresses indicating corresponding neurons. Also when the output state values are successively transmitted through the large annular channels 55a and 55b, therefore, it is possible to read corresponding synapse load value data in each arithmetic unit. In each arithmetic unit, therefore, a local memory can store addresses identifying neurons included in the neural network as implemented and synapse load value data corresponding to the addresses, whereby it is possible to readily implement a large-scale neural network having the aforementioned waste operation omitting function.

Due to the nonlinear conversion unit 30 provided in each of the semiconductor chips 54-1 to 54-m, it is possible to execute nonlinear conversion operations in the semiconductor chips 54-1 to 54-m in parallel with each other. When the selector 33 shown in FIG. 1 is provided next to the selector 50 shown in FIG. 15, it is possible to calculate output state values of neurons expressed by the arithmetic units 10-1 to 10-n included in the respective semiconductor chips 54-1 to 54-m, for holding the results of the calculation in the respective semiconductor chips 10-1 to 10-n and transferring the same to the adjacent chips.

[Modification 2]

As shown in FIG. 4, the control unit 20 can transfer data with the input ports 14 and 15 of the arithmetic units. In this case, it is possible to further extend the structure to transfer data with input/output terminals on semiconductor chips.

Figure 17:
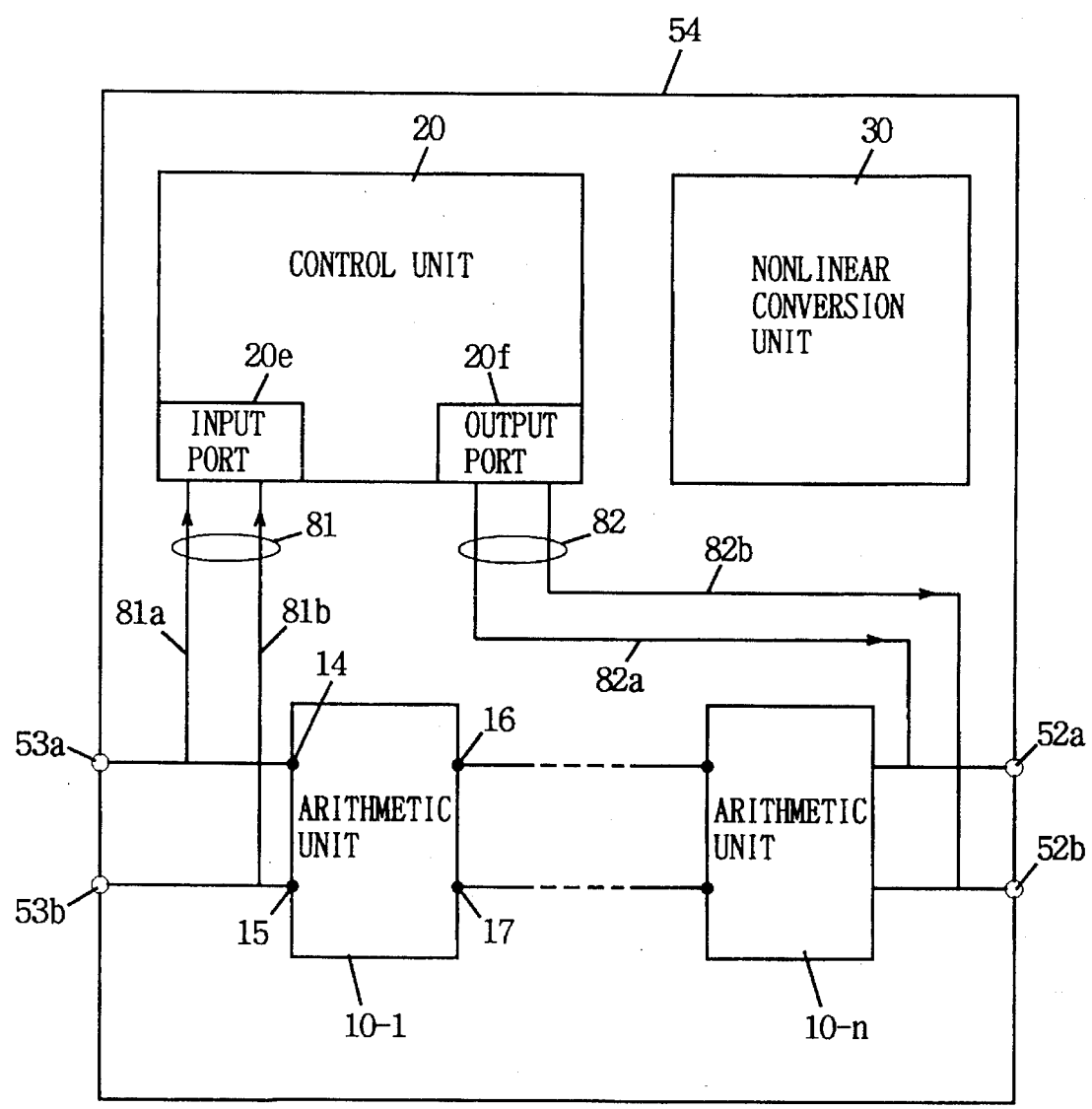
FIG. 17 illustrates a second modification of the numerical arithmetic processing unit according to the present invention.

FIG. 17 shows another modification of the numerical arithmetic processing unit of the present invention. This figure schematically shows the structure of a numerical arithmetic processing unit which is formed on a single semiconductor chip 54. In the structure shown in FIG. 17, a control unit 20 includes an input port 20e which receives data supplied to input/output terminals 53a and 53b through input paths 81a and 81b, and an output port 20f which transmits data to output terminals 52a and 52b through output paths 82a and 82b respectively. The input ports 20e and 20f are included as extended structures of the input/output selecting circuit 20d shown in FIG. 4 respectively.

In the structure shown in FIG. 17, the control unit 20 can receive the data, which are supplied to the input terminals 53a and 53b, in its input port 20e through the input paths 81 (81a and 81b) to make necessary working thereon and transmit the worked data to the output terminals 52a and 52b from the output port 20f through the output paths 82. This structure allows control unit 20 to process data requiring no processing by the arithmetic units 10-1 to 10-n, and has the following advantage. The arrangement shown in FIG. 17 is provided with the selectors 50 and 51 shown in FIG. 15, and the input and output paths 81 and 82 are provided in front stages of the input parts of these selectors 50 and 51, for example, while the control unit 20 transfers data to the input terminals 53a and 53b and the output terminals 52a and 52b not through the selectors 50 and 51. A selector for switching transmission paths may be provided.

Figure 18:
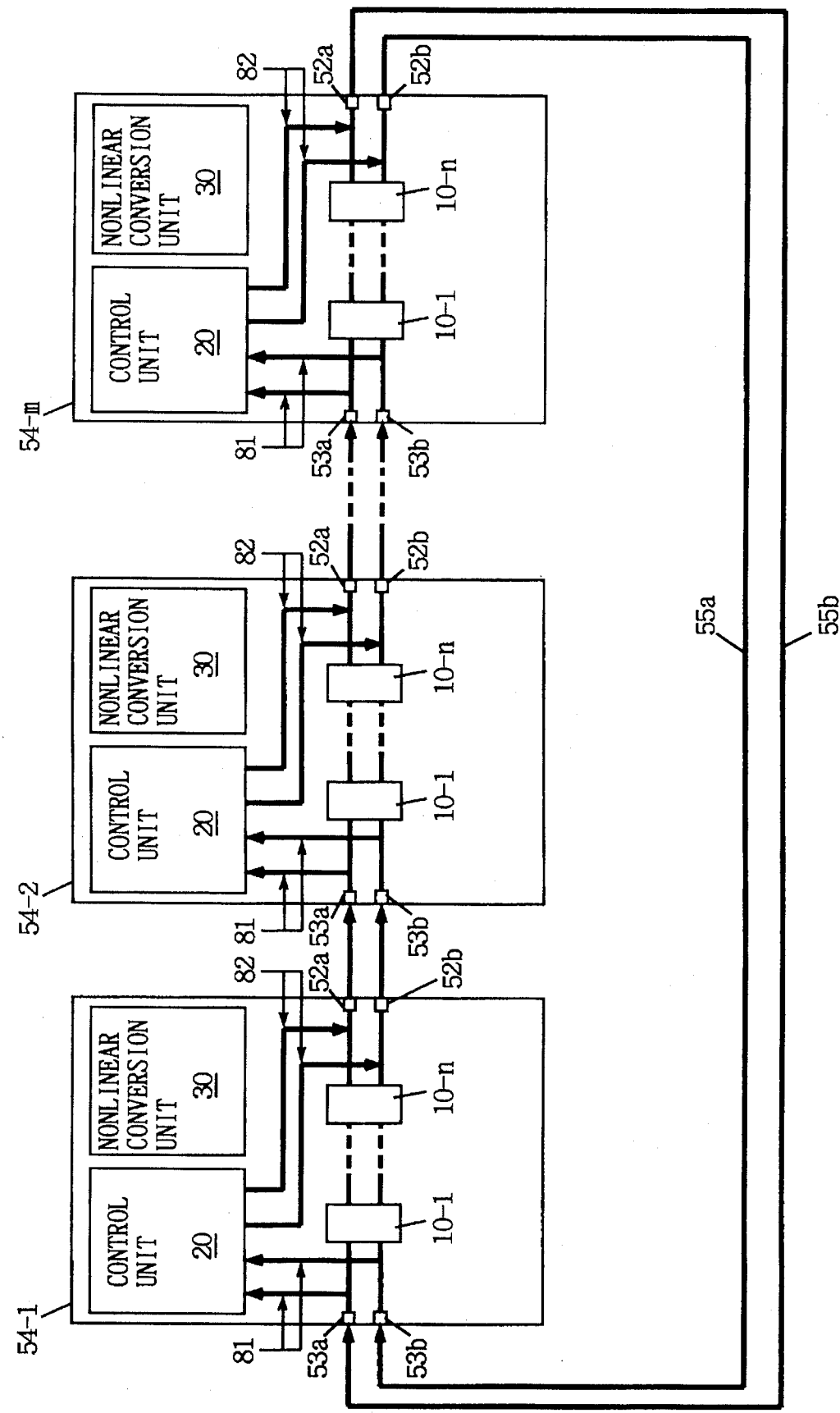
FIG. 18 is a diagram for illustrating an advantage of the structure shown in FIG. 17.

FIG. 18 shows such a state that a plurality of (m) semiconductor chips 54 shown in FIG. 17 are connected with each other in the form of a ring. Referring to FIG. 18, the input terminals 53a and 53b are connected to an input port (not shown in FIG. 18) of the control unit 20 through the input paths 81 and the output terminals 52a and 52b are connected to an output port (not shown in FIG. 18) of the control unit 20 in each of the semiconductor chips 54-1 to 54-n. Thus, the control units 20 are connected with each other in the form of a ring through the input paths 81, the output paths 82 and annular channels 55a and 55b, whereby communication between the control units 20 becomes possible. Only one clock cycle is required for communication between the control units 20 which are included in adjacent semiconductor chips 54-k and 54-(k+1), and hence it is possible to carry out data transfer at a higher speed as compared with communication employing the registers 41 and 42 (see FIG. 9, for example) of the arithmetic units 10-1 to 10-n. Namely, the content of an arbitrary register (as clearly shown in the structure of the control unit shown in FIG. 4, the control unit includes a necessary register group and temporarily stores data required for arithmetic processing) included in each control unit 20 is transferred to the output terminal 52a and/or 52b through the output paths 82, and incorporates data supplied from the control unit 20 in the adjacent semiconductor chip supplied to the input terminal 53a and/or 53b in one clock cycle. Thus, it is possible to transfer data to the control unit of the adjacent semiconductor chip in one clock cycle. Further, it is possible to transfer data to a control unit included in a remote semiconductor chip by repeating the aforementioned operation a plurality of clock cycles.

As hereinabove described, it is possible to implement communication between the control units at a high speed by providing paths for connecting the input/output terminals to the control units, as shown in FIG. 17.

[Modification 3]

Each arithmetic unit 10 includes the computing element group 12 and the register group 13 as shown in FIG. 2, and executes various operations under control by the sequence controller 25. In a certain type of neural network (LVQ model: learning vector quantization model), it is necessary to identify an output neuron outputting the maximum output state value. Such maximum value detecting processing can be readily implemented by executing operations through registers which are included in the register group 13. A method of performing arithmetic processing (state register reference operation) for controlling arithmetic result data storing operations of arithmetic result storage registers with reference to arithmetic results is now described.

Figure 19:
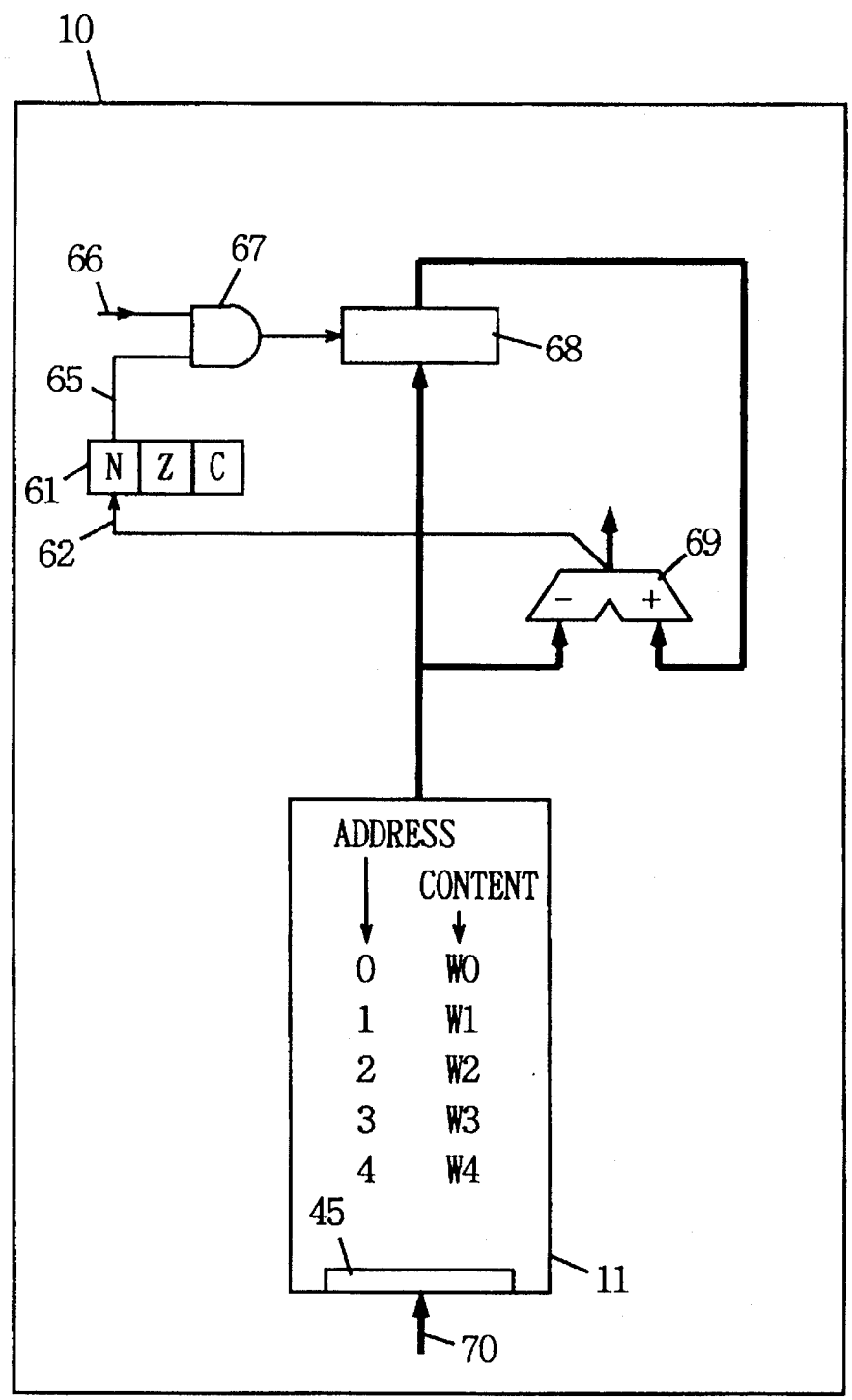
FIG. 19 illustrates a third modification of the numerical arithmetic processing unit according to the present invention.

FIG. 19 shows arrangement for carrying out a state register reference operation in each arithmetic unit. Referring to FIG. 19, the arrangement includes an arithmetic result storage register 68 for storing arithmetic result data, a subtracter 69 for numeric data Wi (i=0 to 4) read from the local memory 11 and the arithmetic result data stored in the arithmetic result storage register 68, a state register 61 storing status bits (negative N, zero Z, overflow C etc.) reflecting the state of the arithmetic result of the subtracter 69, and a gate circuit 67 for passing a clock signal 66 in accordance with the negative bit N stored in the state register 61. The subtracter 69 is included in the computing element group 12 in the arrangement shown in FIG. 2, while the arithmetic result storage register 68 and the state register 61 are included in the register group 13. The gate circuit 67, which is a component for operation control, is included as a component of the sequence controller 25 shown in FIG. 2. The arithmetic result storage register 68 stores numeric data read from the local memory 11 when the clock signal 66 is supplied from the gate circuit 67. The local memory 11 stores numeric data Wi to be subjected to maximum value detection processing, such as an output state value, for example.

The state register 61 asserts the negative bit N when the subtraction result in the subtracter 69 is negative, while the same asserts the zero bit Z when the result is zero. The overflow bit C is asserted when an overflow takes place. This state register 61 stores a signal 65 indicating the state of the negative bit N and supplies the same to the gate circuit 67. The gate circuit 67 passes the clock signal 66 when the signal 65 indicates a negative state, i.e., when the negative bit N is asserted. The state register 61 asserts any one of the bits N, Z and C in accordance with a sign bit 62 of the arithmetic result in the subtracter 69. Since the output signal 65 of the state register 61 expresses the state of the negative bit N, it is not necessary to use the bits Z and C in particular in this case, and the maximum value is detected by using only the sign bit 62 of the arithmetic result in the subtracter 69. The subtracter 69 subtracts the numeric data read from the local memory 11 from data held in the register 68.

In the aforementioned structure, address information 70 which is supplied to the local memory 11 is incremented to be supplied to the decoder 45, while the numeric data Wi are successively read from the local memory 11 to be supplied to a negative input of the subtracter 69 and the clock signal 66 is supplied to the clock signal 66, so that the arithmetic result storage register 68 finally stores numeric data providing the maximum value among the numeric data Wi stored in the local memory 11. The content of the register 68 is reloaded or updated when the clock signal 66 is supplied from the gate circuit 67. The gate circuit 67 supplies the clock signal 66 to the register 68 when the negative bit N stored in the state register 61 is asserted. The negative bit N is asserted when the arithmetic result of the subtracter 69 is negative and the sign bit 62 indicates a negative state, i.e., when numeric data supplied from the local memory 11 is greater than that held in the state register 68. Therefore, it is possible to detect the maximum value of the numeric data W stored in the local memory 11 in the arithmetic unit 10. The aforementioned operation is equivalent to the following C language description, as described later in detail with reference to a flow chart showing the maximum value detecting operation in the overall unit:

```
reg = 0;
for ( i = 0;i<MAXARRAY;i++){
    sreg = sgn(w[i]-reg);
    reg = sreg?w[i]:reg;
}
```

In the above C language description, the variable sreg shows the state register 61, the variable reg shows the register 68 storing the arithmetic result, and the array w[i] shows the numeric data Wi stored in the local memory 11. The constant MAXARRAY shows the number (five in FIG. 19) of the numeric data Wi stored in the local memory 11. The function sgn() provides the sign bit of the arithmetic result from the subtracter 69. The content of this C language description is as follows: First, the variable reg is initialized at zero. Then, i is initialized at zero, and then successively incremented one by one up to the constant MAXARRAY, to execute the following operation. The sign of difference between the array w[i] and the variable reg is obtained and this sign is regarded as the variable sreg. One of the array w[i] and the variable reg is selected in accordance with the value of the variable sreg, and the selected one is newly regarded as the variable reg. Thus, the maximum value of the numeric data stored in the local memory 11 is obtained in the arithmetic unit 10 when i reaches the constant MAXARRAY.

The numerical arithmetic processing unit includes a plurality of arithmetic units. Therefore, the numeric data stored in the register 68 of each arithmetic unit 10 are candidates for the maximum value. Description is now made on an operation for obtaining the maximum value from numeric data which are stored in respective registers 68 of a plurality of arithmetic units.

FIG. 20 illustrates a connection mode in a single arithmetic unit 10 for obtaining the maximum value. Referring to FIG. 20, a data register 44 is connected between input and output ports 14 and 16 in the arithmetic unit 10. The remaining structure of an arithmetic part is identical to that shown in FIG. 19. Numeric data stored in the register 44 are supplied to a subtracter 69 and a register 68. The connection arrangement shown in FIG. 20 is implemented under control by the sequence controller 25 shown in FIG. 2. The data register 44 stores numeric data of maximum value candidates stored in the arithmetic result storage register 68. In operation, the arithmetic result storage register 68 stores the numeric data stored in the data register 44 when the numeric data stored in the data register 44 are greater than that stored in the arithmetic result storage data 68. The numeric data stored in the data register 44 are successively transmitted to an adjacent arithmetic unit to execute subtraction and storage operations. This is equivalent to the following C language description:

```
for(i = 0;i<MAXPU;i++){
    sreg = sgn(dreg-reg);
    reg = sreg?dreg:reg;
}
```

The new variable dreg shows the data register 44 which is connected to the data input and output ports 14 and 16, and the constant MAXPU shows the number of arithmetic units which are connected to an annular channel. The maximum value candidates stored in the register 44 are successively transferred through the annular channel, to be compared with those in the remaining arithmetic units. Finally the register 68 (reg) of each arithmetic unit 10 stores the final maximum value selected from the maximum value candidates in common, and the maximum value candidates stored in the data register 44 (dreg) are returned into the corresponding arithmetic unit. The series of operations is now described more.

Figure 21A:
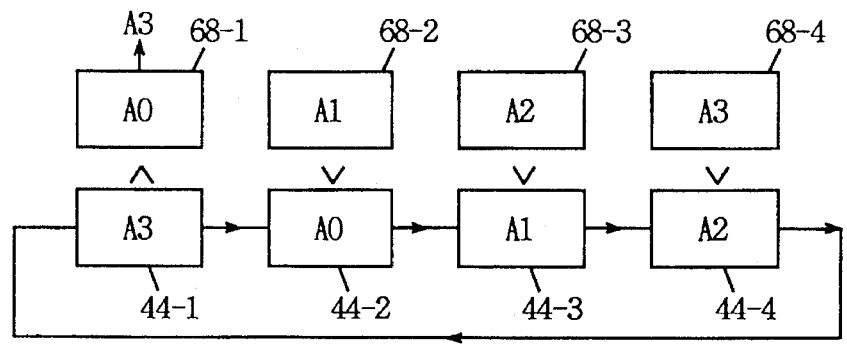
FIGS. 21A–21D is a diagram for illustrating an operation of the structure shown in FIGS. 19 and 20.

Consider an operation for obtaining the maximum value of numeric data A0 to A3 stored in four arithmetic units, as shown in FIG. 21A. It is assumed that the numeric data A0 to A3 satisfy relations of A0<A1<A2<A3. In a first cycle, registers 44-1 to 44-4 store the numeric data A3, A0, A1 and A2 respectively. Corresponding registers 68-1 to 68-4 store the numeric data A0, A1, A2 and A3 respectively. When subtraction processing is performed, the data held in the register 68-1 is changed from the numeric data A0 to the numeric data A3 since the numeric data A3 is greater than the numeric data A0. No data held in the remaining registers 68-2 to 68-4 are updated.

Figure 21B:
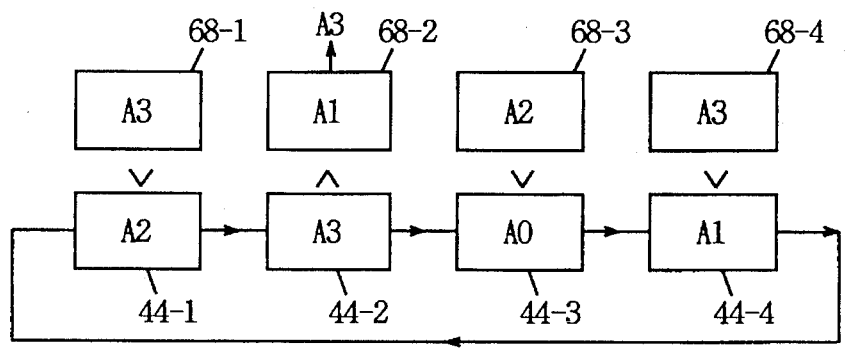

In a next arithmetic cycle, the data registers 44-1 to 44-4 store the numeric data A2, A3, A0 and A1 respectively as shown at in FIG. 21B. When subtraction processing is executed, the numeric data A1 stored in the register 68-2 is replaced by the numeric data A3 stored in the register 44-2. No data held in the remaining registers 68-1, 68-2 and 68-4 are updated.

Figure 21C:
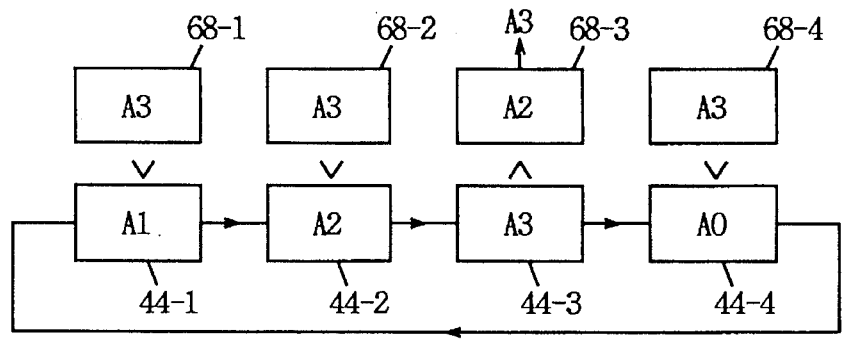

In a next arithmetic cycle, the data held in the data registers 44-1 to 44-4 are shifted by one so that these registers hold the numeric data A1, A2, A3 and A0 respectively as shown in FIG. 21C. The numeric data A2 held in the register 68-3 is updated by the numeric data A3 stored in the register 44-3. No data held in the remaining registers 68-1, 68-2 and 68-4 are updated.

Figure 21D:
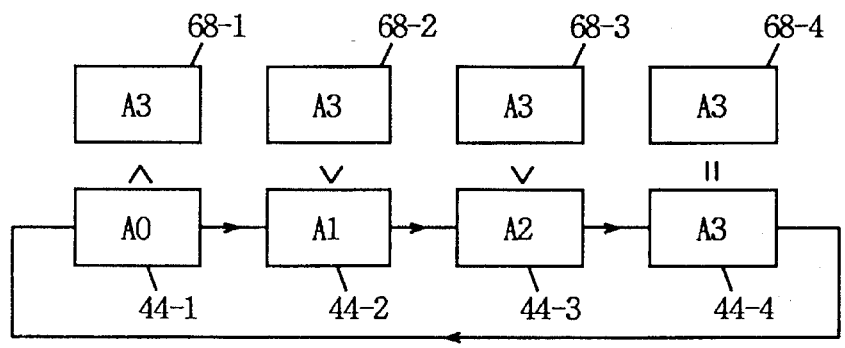

In a next arithmetic cycle, therefore, the registers 44-1 to 44-4 store the initial numeric data A0 to A3 respectively while the registers 68-1 to 68-4 store the numeric data A3 in common, as shown in FIG. 21D. Thus, it is possible to detect the maximum value. In the state shown in FIG. 21D, subtraction of the data held in the registers 44-1 to 44-4 and the corresponding registers 68-1 to 68-4 is carried out. A sign bit of a subtracter is zero only in the arithmetic unit corresponding to the data register 44-4 storing the maximum numeric data A3, while sign bits are positive in the remaining arithmetic units. Thus, it is possible to identify which arithmetic unit generates the maximum value by storing the sign bits in the state registers 61 (refer to FIG. 20).

The sign bit 62 outputted from the subtracter 69 asserts the negative bit N when the same is negative, while the sign bit 62 deasserts the negative bit N when the same is positive. When such representation of numeric data that the sign bit is zero when the arithmetic result of the subtracter 69 is positive or zero and the sign bit is 1 only when the arithmetic result of the subtracter 69 is negative is employed, the zero bit Z may be observed. The zero bit Z can be formed by assuming NAND of all bits of the arithmetic result in the subtracter 69. Alternatively, the subtracter 69 may be so formed as to subtract the data held in the registers 68 from those held in the data registers 44 in a final stage operation. In any case, it is possible to make a specific bit of the state register 61 in the arithmetic unit providing the maximum value different in value from corresponding state bits in state registers in the remaining arithmetic units by adjusting the arithmetic processing mode according to the mode of representation of the numeric data.

The finally performed operation corresponds to the following C language description:

```
sreg=sgn(dreg-reg);
```

Figure 22:
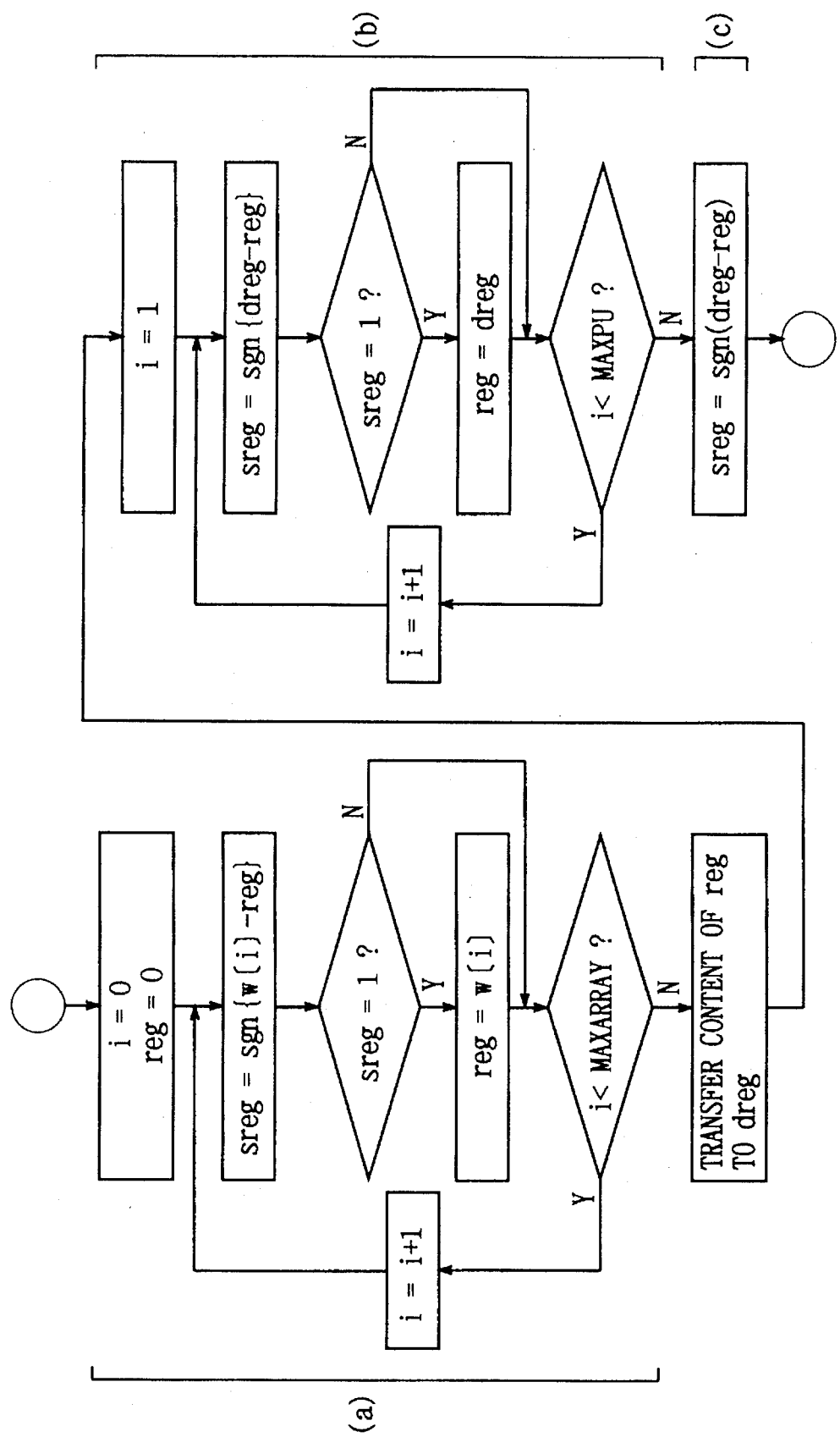
FIG. 22 is a flow chart showing the operation of the structure shown in FIGS. 19 and 20.

FIG. 22 is a flow chart of the aforementioned maximum value detecting operation. Detailed description of the flow chart shown in FIG. 22 is omitted to avoid repeated description, while a processing step group (a) corresponds to the arithmetic processing operation for obtaining the maximum value candidate in a single arithmetic unit. A processing step group (b) corresponds to the arithmetic processing step (see FIG. 20) for updating data held in the register 68 of the arithmetic unit to that of the maximum value. A processing step (c) corresponds to the processing step for identifying the arithmetic unit forming the maximum numeric data.

The arithmetic unit forming the maximum numeric data is identified by the control unit 20. If the respective arithmetic units notify the control unit 20 of all bits of the state registers 61, the number of signal wires or interconnection line is increased to increase the area occupied by the wires, and this is unpreferable in view of integration.

Figure 23:
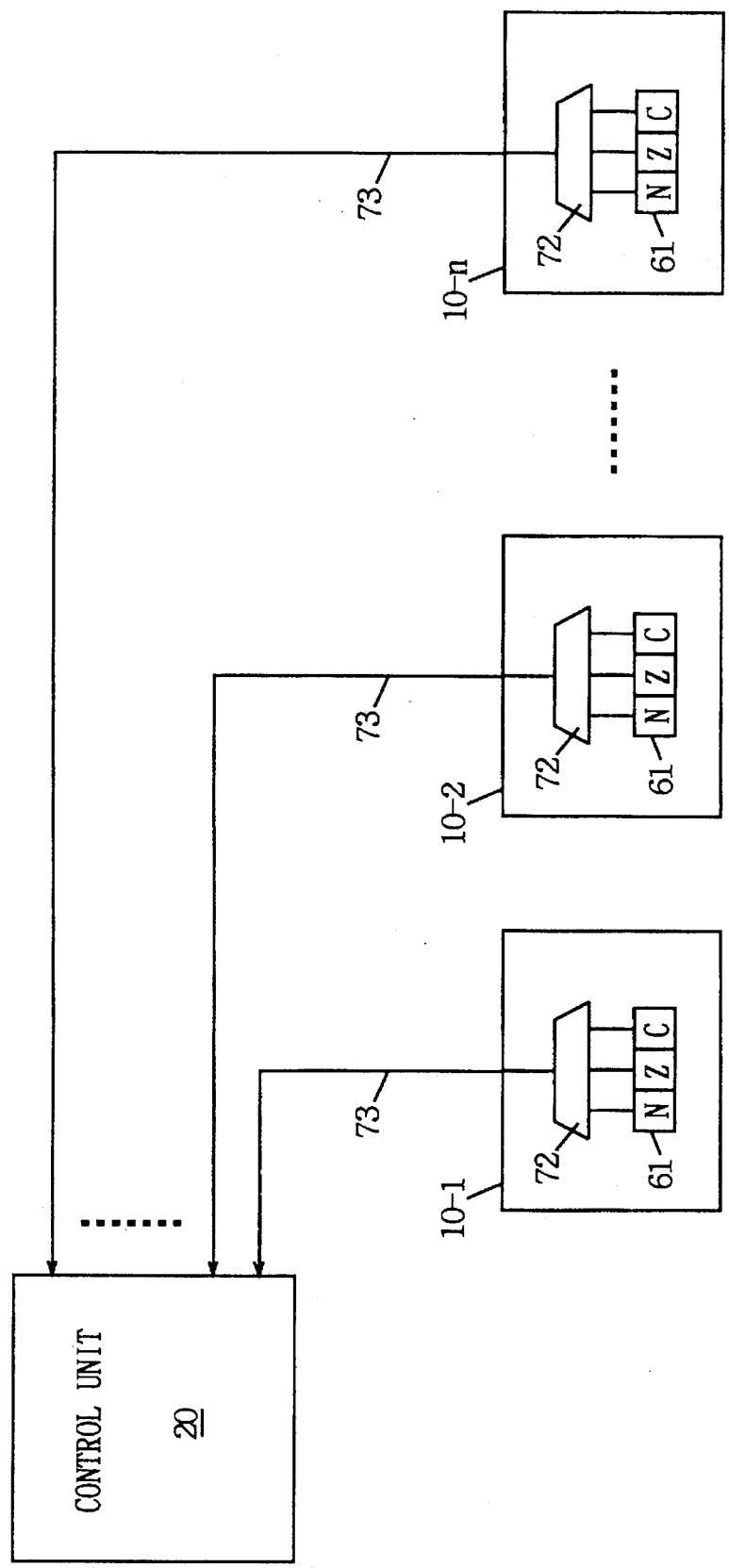
FIG. 23 illustrates a fourth modification of the numerical arithmetic processing unit according to the present invention.

As shown in FIG. 23, therefore, only specific bits of the state registers 61 are transmitted from the arithmetic units 10-1 to 10-n to the control unit 20 through signal lines 73. The arithmetic units 10-1 to 10-n operate in parallel with each other in accordance with instructions from the control unit 20. Selectors 72 select a specific state bit (negative bits N, for example, in the case of maximum value detection) of the state registers 61 under control by the sequence controller 25 shown in FIG. 2, and supply the selected bit to the control unit 20 through the signal lines 73. Since 1-bit state bits are supplied from the arithmetic units 10-1 to 10-n to the control unit 20 through the signal lines 73, it is possible to reduce the number of the wires and to remarkably compress the number of bits referred to by the control unit 20, thereby simplifying the design of a circuit part related to the detection processing in the control unit 20.

Although the maximum value detecting operation has been described in relation to the above state register reference operation, this operation may be replaced by a minimum value detecting processing operation, or another processing operation, so far as the operation is adapted to identify an arithmetic unit providing numeric data satisfying specific conditions. In the control unit 20, the signal lines 73 may be additionally supplied to the input/output selecting circuit 20d shown in FIG. 14, or another dedicated port may be utilized.

[Chip Layout]

Figure 24:
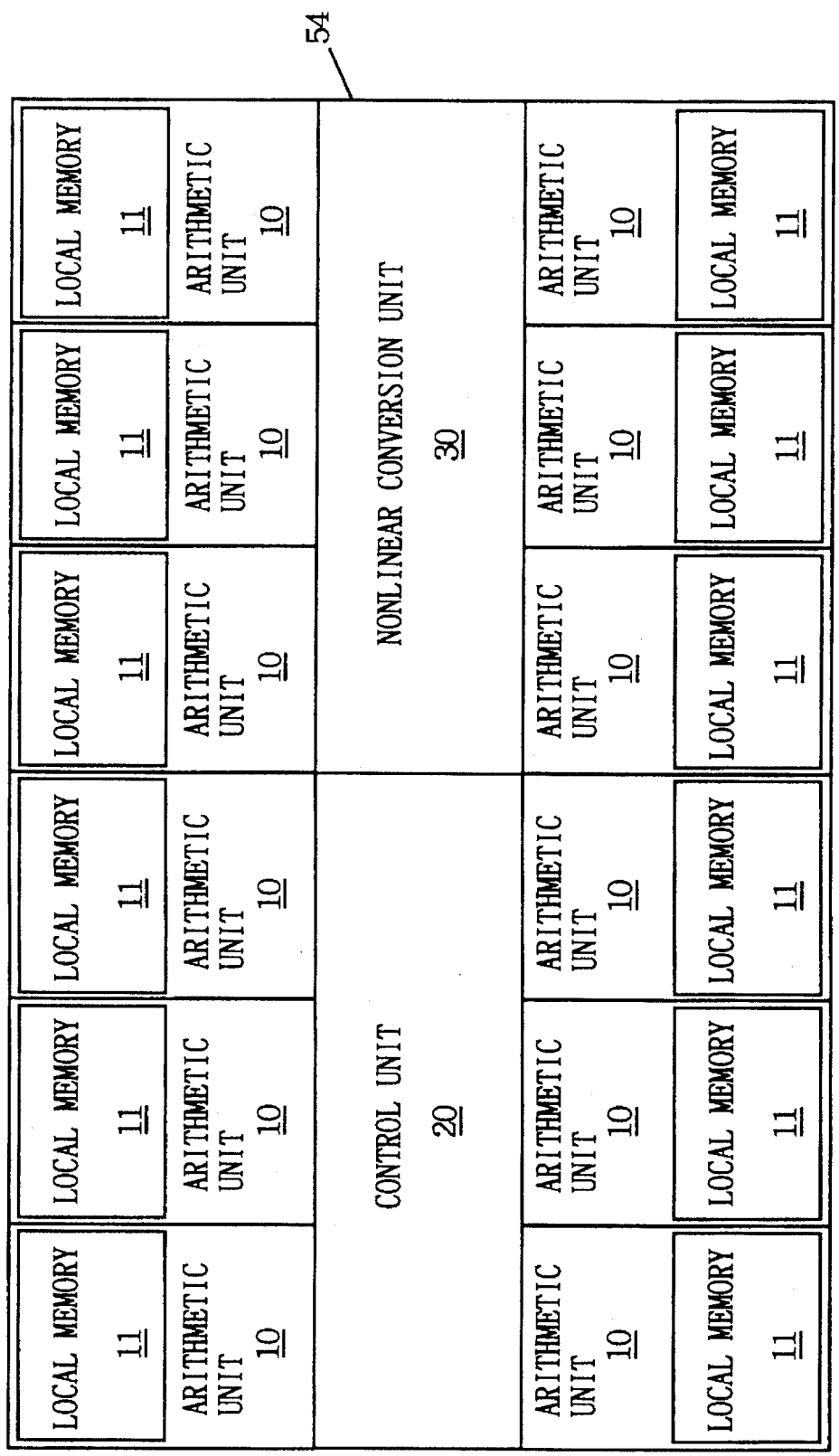
FIG. 24 illustrates the layout of the numerical arithmetic processing unit according to the present invention on a semiconductor chip.

FIG. 24 illustrates the layout of the numerical arithmetic processing unit on a chip. Referring to FIG. 24, the control unit 20 and the nonlinear conversion unit 30 are arranged on a central portion of a semiconductor chip 54. The arithmetic units 10 are arranged on both outer peripheral portions of the semiconductor chip 54, to hold the control unit 20 and the nonlinear conversion unit 30 therebetween. The number of the arithmetic units 10 is not restricted in particular, while FIG. 24 illustrates 12 arithmetic units 10. The control unit 20 transmits instructions, address data and numeric data to all arithmetic units 10. Namely, the control unit 20 notifies all arithmetic units 10 of these data. Therefore, it is possible to reduce signal wires between the control unit 20 and the arithmetic units 10 in length and to simplify signal wiring so that no signal lines are entangled by arranging the control unit 20 on the central portion of the chip 54 while arranging the arithmetic units 10 to enclose the control unit 20. When the signal wires are reduced in length, it is possible to reduce signal propagation delay in these signal wires so that signals are propagated at a high speed, whereby a high-speed operation is provided.

The control unit 20 and the nonlinear conversion unit 30 are arranged on the central portion of the chip 54 in an adjacent manner, for transferring signals with each other. The control unit 20 issues instructions for controlling conversion processing operations in the nonlinear conversion unit 30 and supplies the same to the nonlinear conversion unit 30. When the nonlinear conversion unit 30 has a function of omitting arithmetic results satisfying prescribed conditions for reducing waste operations as described above, for example, such arithmetic results are notified to the control unit 20. The control unit 20 and the nonlinear conversion unit 30, which relatively strongly interact with each other to transfer instructions and numeric data, are arranged to be approximate to each other thereby simplifying the signal wiring and reducing signal propagation delay.

It is possible to readily implement connection of all arithmetic units 10 through annular channels and connection for inserting the nonlinear conversion unit 30 in the annular channels by arranging the arithmetic units 10 to hold the nonlinear conversion unit 30 therebetween. For example, it is possible to readily change the connection mode of the annular channels for facilitating the signal wiring by arranging the selector 33 shown in FIG. 1 on a right outer peripheral portion of the semiconductor chip 54 in FIG. 24.

When such semiconductor chips 54 are interconnected with each other by arranging the arithmetic units 10 along both sides of each semiconductor chip 54 to build a large-scale neural network, interconnection between the chips 54 is simplified. For example, input and output terminals are provided for upper and lower arithmetic units 10 provided on the left side of the semiconductor chip 54, while output and input terminals are correspondingly provided to upper and lower arithmetic units 10 provided on the right side of the semiconductor chip 54 respectively in FIG. 24. When the semiconductor chip 54 is independently utilized, it is possible to readily connect the annular channels by interconnecting the input/output terminals on one side. When a plurality of semiconductor chips 54 are interconnected with each other, opposing input and output terminals are interconnected with each other between adjacent ones of the semiconductor chips 54. Thus, it is possible to form large-scale annular channels $55a$ and $55b$ interconnecting the arithmetic units 10 through a plurality of semiconductor chips 54. The input and output terminals may be provided in correspondence to the control unit 20 and the nonlinear conversion unit 30 respectively.

In the arithmetic units 10, the local memories 11 are provided on the outer peripheries of the semiconductor chip 54, in order to reduce the signal lines between the computing element groups and the register groups in the arithmetic units 10 and the control unit 20 and to simplify wiring therebetween for carrying out data communication therebetween at a high speed.

The local memories 11 are arranged on the outer peripheral portions of the semiconductor chip 54 in the arithmetic units 10, whereby the layout between the computing element groups and the register groups (see FIG. 2) in the arithmetic units 10 and the local memories 11 is simplified and wiring lengths between the computing element groups and the register groups and the local memories 11 can be reduced (if the local memories 11 are placed between the computing element groups and the register groups, wires for directly transferring data between the computing element groups and the register groups are entangled).

[Specific Structure for Omitting Operation]

Description is now made on a specific structure for omitting waste operations, i.e., a specific structure in relation to the arithmetic units. There are various methods of omitting waste operations according to operations to be executed. Description is now made on structures which are successively implemented in the control unit in response to the respective arithmetic processing contents. Also in the following description, connection arrangement of internal circuit elements is implemented by properly adjusting connection paths of selectors etc. under control by the sequence controller 25 shown in FIG. 2.

[First System of Omitting Waste Operation]

Figure 25:
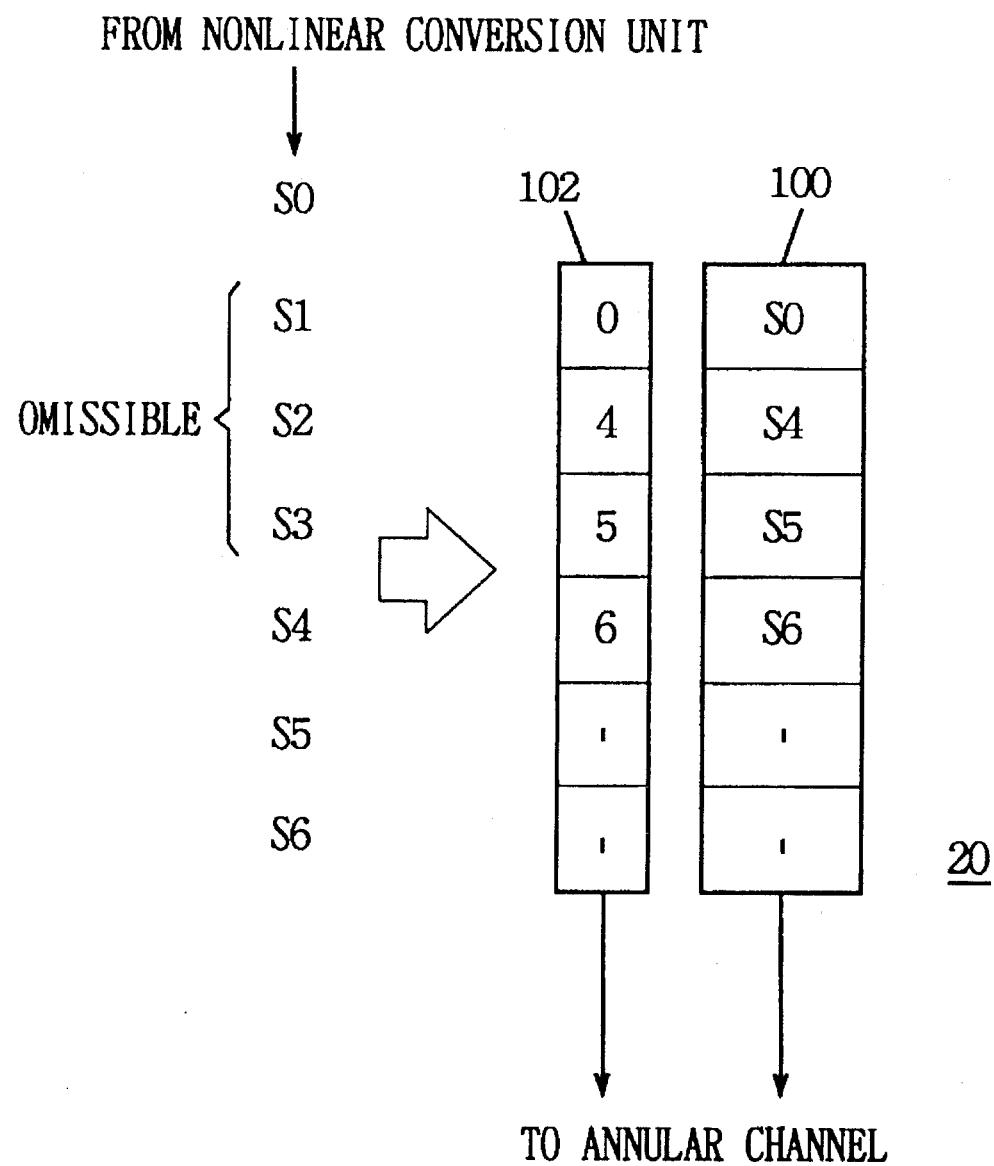
FIG. 25 illustrates conceptually a method for omitting arithmetic processing.

FIG. 25 conceptually shows the structure of a first system of omitting waste operations according to the present invention. The waste operation omission shown in FIG. 25 is executed in the control unit 20 shown in FIG. 1. The control unit 20 is provided therein with a state memory 100 storing valid output state values $Si$, and a tag memory 102 storing addresses identifying neurons generating the valid output state values $Si$. The output state values $Si$ which are generated by nonlinear conversion processing by the nonlinear conversion unit 30 are successively supplied to the control unit 20 through the annular channels. The control unit 20 identifies omissible output state values from the supplied output state values $Si$. Referring to FIG. 25, output state values $S1$, $S2$ and $S3$ are assumed omissible, for example. The omissible state values are identified by comparing the output state values $Si$ supplied from the nonlinear conversion unit 30 with a prescribed threshold value $\epsilon$. In accordance with the results of this identification, the state memory 100 stores the valid output state values $S0$, $S4$, $S5$, $S6$, . . . , and the tag memory 102 stores addresses 0, 4, 5, 6, . . . related to the respective output state values. When arithmetic operations with respect to a single layer are completed, valid output state values $Si(e)$ stored in the state memory 100 and related addresses are read from the state memory 100 and the tag memory 102 to be supplied to the annular channels, and successively supplied to the arithmetic units to execute arithmetic operations (in ordinary operations: output methods are different in learning, as described later in detail).

According to the system conceptually shown in FIG. 25, it is possible to omit estimation in relation to $Si(t) = 0$ in membrane potential calculation. Similarly, it is possible to omit estimation in relation to $\Delta Sj(t)=0$ in operation of $\Sigma Wij(t) \cdot \Delta Sj(t)$ by utilizing the state memory 100 and the tag memory 102. A specific structure is now described.

Figure 26:
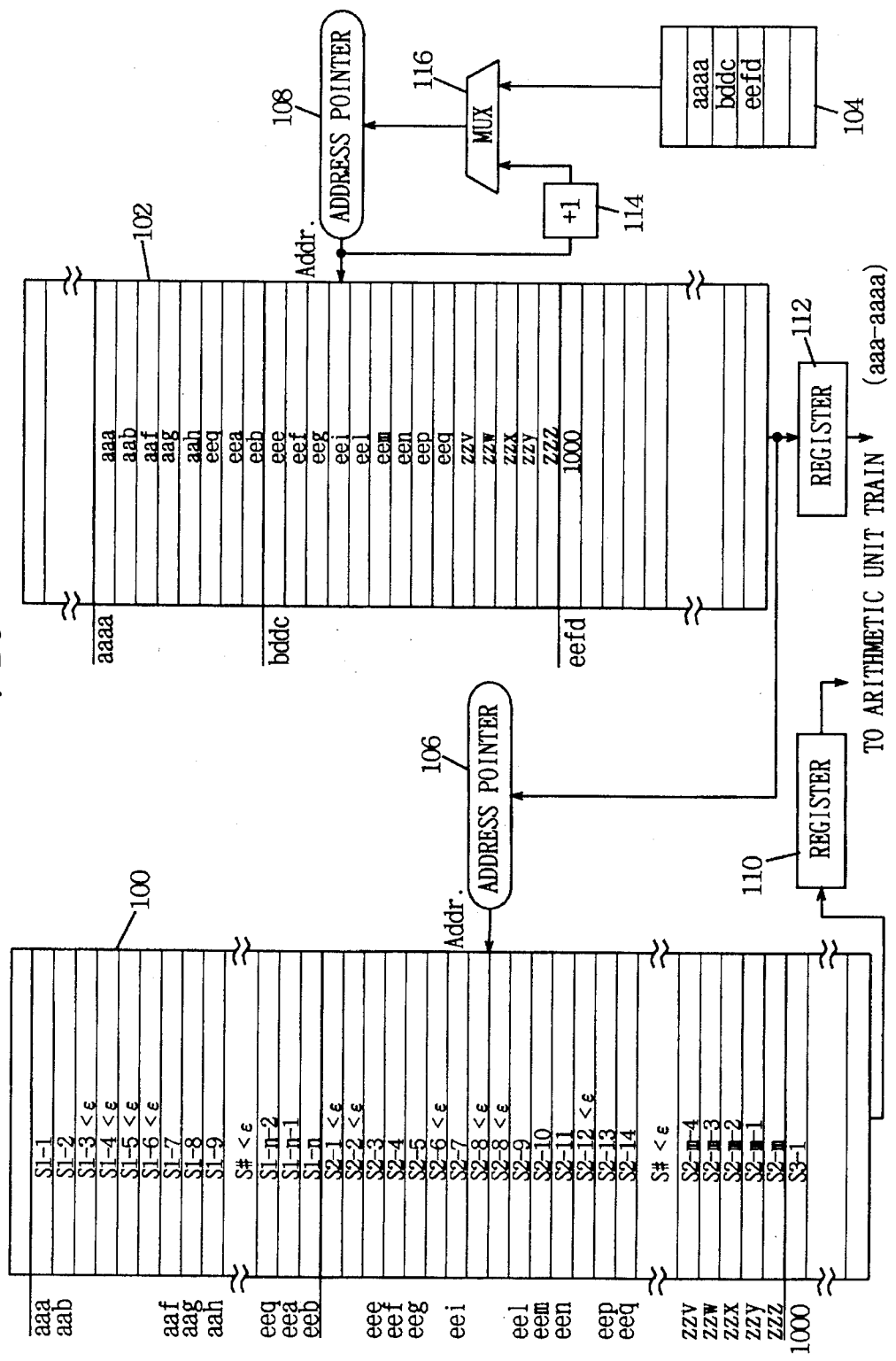
FIG. 26 illustrates specific arrangement for implementing the structure shown in FIG. 25.

FIG. 26 illustrates a specific structure for implementing the first system of omitting waste operations. The structure shown in FIG. 26 is implemented in the control unit 20 shown in FIG. 1. When such structure is provided for each arithmetic unit 10, it is necessary to increase the storage capacity of the local memory 11. Therefore, the structure for omitting waste operations is provided in the control unit 20, to save the memory resource.

Referring to FIG. 26, the state memory 100 stores output state values Sk-j of a plurality of neurons. The subscript k is adapted to identify a layer in the hierarchical neural network, and the subscript j is adapted to identify each neuron in the layer.

The tag memory 102 stores addresses indicating locations storing valid output state values in the state memory 100 for the respective layers. Addresses for identifying address regions allocated to the respective layers in the tag memory 102 are stored in a register file 104. Referring to FIG. 26, addresses "aaaa", "bddc" and "eefd" are stored. The addresses stored in the register file 104 indicate locations for storing data related to first neurons in the respective layers in the tag memory 102. As described later in detail, the tag memory 102 stores information on addresses storing valid output state values. The addresses of the state memory 100 are in one-to-one correspondence to the respective neurons. Addresses "aaa" to "eeb" of the state memory 100 store output state values S1-1 to S1-n. FIG. 26 shows only addresses storing the valid output state values as those of the state memory 100. These addresses are stored in the tag memory 102.

The state memory 100 is addressed by an address pointer 106, while the tag memory 102 is addressed by another address pointer 108. The address pointer 106 generates address information of the state memory 100 in accordance with address information read from the tag memory 102. The address pointer 108 receives address information which is supplied from one of an incrementer 114 and the register file 104, to address the tag memory 102. The output state values read from the state memory 100 are stored in a register 110, and address information (after conversion to relative addresses as described later) read from the tag memory 102 is stored in another register 112. The output state values and the address data stored in the registers 110 and 112 are transmitted onto the annular channels, for example. The output state value reading operation is now described.

First, an address for identifying the layer is read from the register file 104, and supplied to the address pointer 108 through a multiplexer 116. The address pointer 108 first addresses the tag memory 102 in accordance with the address (aaaa, for example) supplied from the register file 104. The address aaaa of the tag memory 102 stores address data aaa, which in turn is read to be supplied to the address pointer 106 and converted to a relative address aaa-aaaa and stored in the register 112. The address pointer 106 performs address selection of the state memory 100 in accordance with the address data aaa supplied from the tag memory 102. The output state value Si-1 stored in the address aaa is read from the state memory 100, to be stored in the register 110. Thus, the register 110 stores the output state value S1-1, while the register 112 stores the (relative) address data (aaa-aaaa).

Then, the address data of the address pointer 108 is incremented by 1 by the incrementer 114, and supplied to the address pointer 108 again through the multiplexer 116. Therefore, address data aab stored in a next address position is read from the tag memory 102. The address pointer 106 again specifies the address aab of the state memory 100, to read the output state value S1-2. In a next cycle, address data aaf is read from the tag memory 102. In this case, the output state value S1-7 is read from the address aaf of the state memory 100. Arithmetic operations for the output state values S1-3 to S1-6 are omitted since these values are less than the prescribed threshold value ε. A similar operation is thereafter repeated so that only the valid output state values (those to be subjected to arithmetic operations) are read from the state memory 100 since address data indicating locations storing the valid output state values in the state memory 100 are stored in the tag memory 102.

Namely, the tag memory 102 stores only the addresses indicating positions storing the output state values to be read from the state memory 100, whereby arithmetic operations are omitted as to the output state values indicated by the address data which are not stored in the tag memory 102. Thus, the number of overall arithmetic operations can be reduced to complete the arithmetic operations at a high speed. The state memory 100 successively stores output state values which are successively supplied from the nonlinear conversion unit 30. It is necessary to store only the address data indicating the locations of the state memory 100 storing the valid output state values in the tag memory 102. The structure for writing address data in the tag memory 102 is now described.

Figure 27:
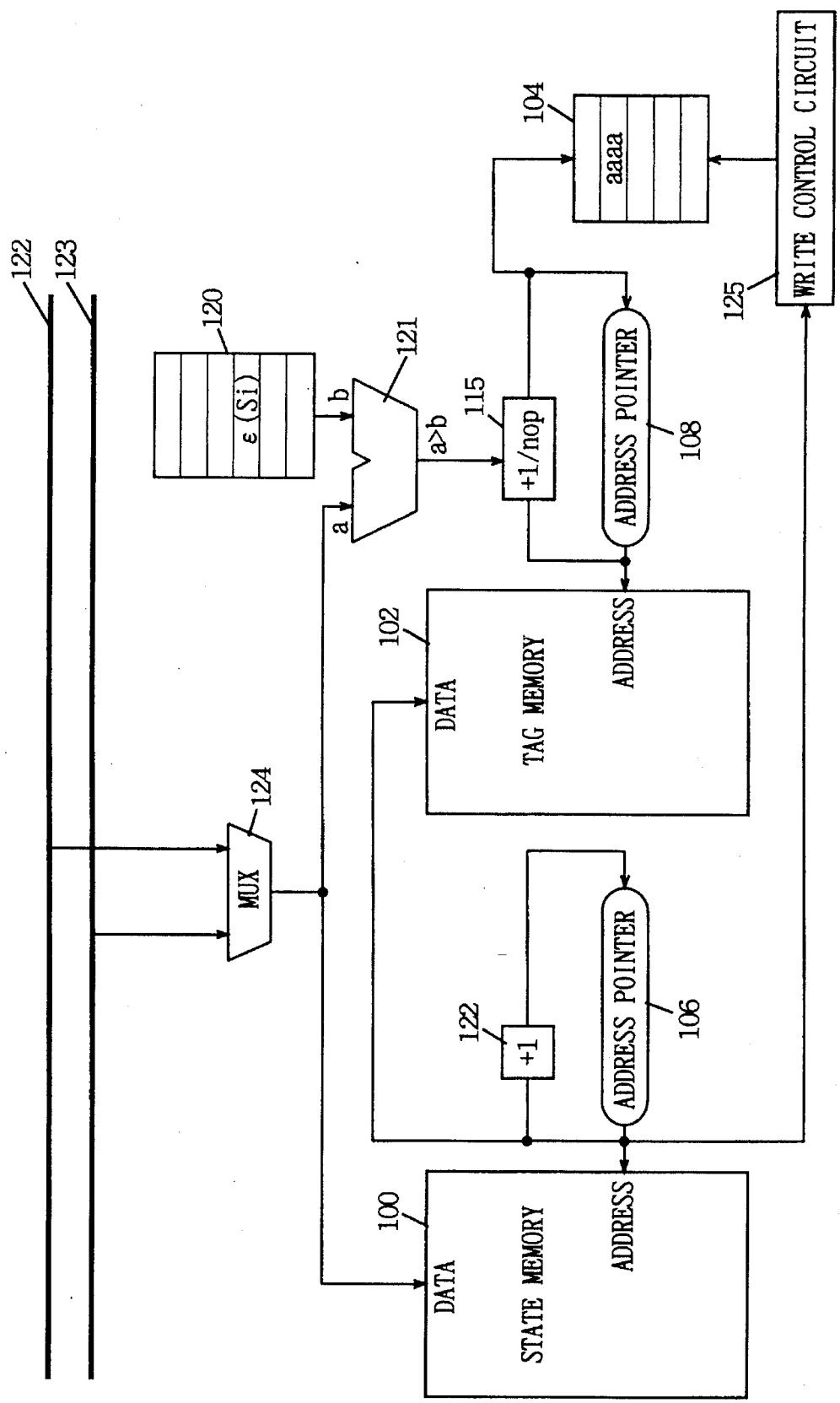
FIG. 27 illustrates a structure for writing data in a state memory and a tag memory in the structure shown in FIG. 26.

FIG. 27 illustrates the structure for writing data in the state memory 100 and the tag memory 102. Referring to FIG. 27, the write control system includes a multiplexer (MUX) 124 for selecting one of data supplied on internal data buses 122 and 123, a register file 120 storing a prescribed threshold value ε(si), and a comparator 121 receiving an output state value supplied from the multiplexer 124 at its first input a while receiving the threshold value ε(si) read from the register file 120 at its second input b. General numeric data are transmitted to the internal data bus 122, while the output state values subjected to nonlinear conversion processing are transmitted to the internal data bus 123 through the annular channels. The multiplexer 124 is set in a state of selecting the numeric data transmitted onto the internal data bus 123 in output state value updating, under control by the instruction issue/executing part 20a shown in FIG. 4. The comparator 121 generates an activation signal when numeric data supplied at its input a is greater than numeric data (threshold value ε(si)) supplied at its input b.

The address pointer 106 for the state memory 100 is supplied with address data through an incrementer 115. The address pointer 108 for the tag memory 102 is supplied with an output of the incrementer 115 through the multiplexer 116. In initialization, address data read from the register file 104 is supplied to the address pointer 108 through the multiplexer 116. The incrementer 115 increments an address supplied from the address pointer 108 by 1 when an output signal of the comparator 121 is in an active state. The incrementer 115, which may be identical to the incrementer 114 shown in FIG. 26, is inhibited from incrementing operation when the output signal of the comparator 121 is in an inactive state, to supply the address received from the address pointer 108 to the address pointer 108 again through the multiplexer 116 without incrementing the received address.

A write control circuit 125 adds 1 to the address data outputted from the address pointer 108 when the address data generated by the address pointer 106 reaches a prescribed value, i.e., when operations as to one layer are completed, to write the resultant address in a prescribed register of the register file 104. Thus, the register file 104 stores a head address of an address region allocated to each layer in the tag memory 102. The operation is now described.

First, the address pointers 106 and 108 are set at initial values. In such initialization, address data generated by the address pointer 108 is stored in a prescribed register of the register file 104 under control by the write control circuit 125. Alternatively, an initial address may be set in the address pointer 108 from the register file 104. Referring to FIG. 27, the register file 104 stores the initial address aaaa of the tag memory 102.

When an output state value is supplied from the multiplexer 124, the state memory 100 stores this output state value in a position corresponding to an address generated by the address pointer 106. The address generated by the address pointer 106 is incremented by 1 by the incrementer 122 after data storage in the state memory 100, and supplied to the address pointer 106 again. The address data generated by the address pointer 106 is supplied to the tag memory 102, and stored in an address position specified by the address pointer 108. The comparator 121 performs a comparing operation in parallel with the storage operation. When the output state value supplied from the multiplexer 124 is greater than the prescribed threshold value $\epsilon(si)$, the incrementer 115 increments the address generated by the address pointer 108 by 1 and supplies the same to the address pointer 108 again. When the output state value outputted from the multiplexer 124 is less than the prescribed threshold value $\epsilon(si)$, on the other hand, the comparator 121 outputs an inactive signal and the incrementer 115 transmits the address generated by the address pointer 108 to the address pointer 108 again without incrementing the address from the pointer 108. When the output signal from the comparator 121 is in an inactive state, therefore, the same address position is specified in the tag memory 102 to be overwritten by the address data generated from the address pointer 106. This operation is repeatedly executed until the address generated by the address pointer 106 reaches a prescribed address. The state memory 100 successively stores the output state values supplied from the multiplexer 124. When the output state value supplied from the multiplexer 124 is less than the threshold value $\epsilon(si)$, the corresponding address data is erased by overwrite processing and rewritten by new address data in the tag memory 102. Thus, the tag memory 102 stores only address data related to valid output state values which are greater than the threshold value $\epsilon(si)$. When the address generated by the address pointer 106 reaches the prescribed value, all output state values of neurons in one layer are obtained. At this time, the write control circuit 125 stores address data outputted from the incrementer 115 in a corresponding register of the register file 104. Thus, the register file 104 stores address data related to the first valid output state value of each layer in the tag memory 102. The write control circuit 125 may be structured to set initial addresses of the address pointers 106 and 108.

In the structure shown in FIGS. 26 and 27, it is possible to execute the processing in a pipeline manner by providing a latch register for temporarily storing the data in a proper position. In the data reading operation shown in FIG. 26, reading of the address data from the tag memory 102, reading of the output state value data from the state memory 100 and transfer of the output state values and the address values to the arithmetic units can be executed in a pipeline manner so that the output state value data can be transferred to the arithmetic units in parallel with reading of the address data from the tag memory 102, whereby the processing can be executed at a high speed. In the structure shown in FIG. 27, on the other hand, it is possible to execute writing of the numeric data in the state memory 100 and writing of the address data in the tag memory 102 in parallel with each other by processing storage of the output state values in the state memory 100, writing of the address data in the tag memory 102 and updating of the addresses by the comparator output in a pipeline manner, thereby executing the data writing at a high speed.

[Second System of Omitting Operation]

Figure 28:
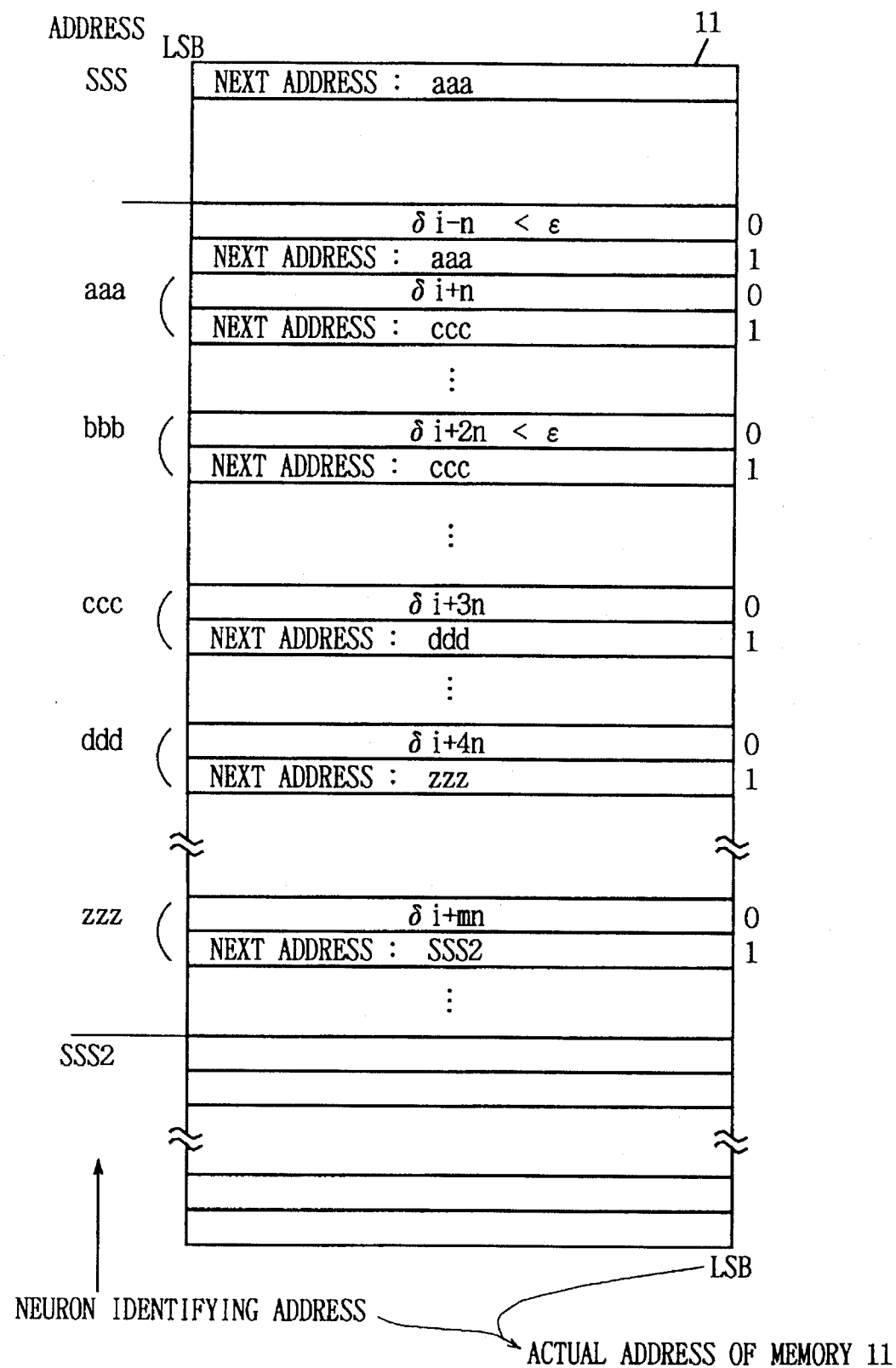
FIG. 28 is a diagram for illustrating a second system for omitting arithmetic processing.

FIG. 28 illustrates a conceptual structure for implementing a second system of omitting operations. Referring to FIG. 28, the local memory 11 stores effective errors. The effective errors are required in a synapse load value correcting operation (refer to an equation $\Delta Wij = \alpha \cdot \Delta Wij(t-1) + \eta \cdot \delta i \cdot Sj$). The synapse load value correction amounts $\Delta Wij$ are calculated in the respective arithmetic units. The synapse loads Wij are corrected in the respective arithmetic units with the synapse load value correction amounts $\Delta Wij$. Effective errors related to the respective neuron units are stored in address positions of the local memories 11 related to the respective neurons. Effective error data is stored in a position of each local memory 11 where the least significant bit LSB of the associated addresses is "0", and address data indicating an address position for storing an effective error to be subsequently executed is stored in a position where the least significant bit LSB is "1". Therefore, an address, such as aaa, for identifying a neuron specifies a corresponding effective error and address data indicating a position for storing an effective error to be subsequently executed. Effective error data and address data are discriminated by the value of the least significant bit LSB of the local memory 11. It is possible to implement the state memory 100 and the tag memory 102 shown in FIGS. 20 and 27 by a single memory by storing numeric data employed for arithmetic processing or address data indicating the addresses of the numeric data in regular positions of the aforementioned memory, thereby simplifying the circuit structure and reducing the area occupied by the memory.

Figure 29:
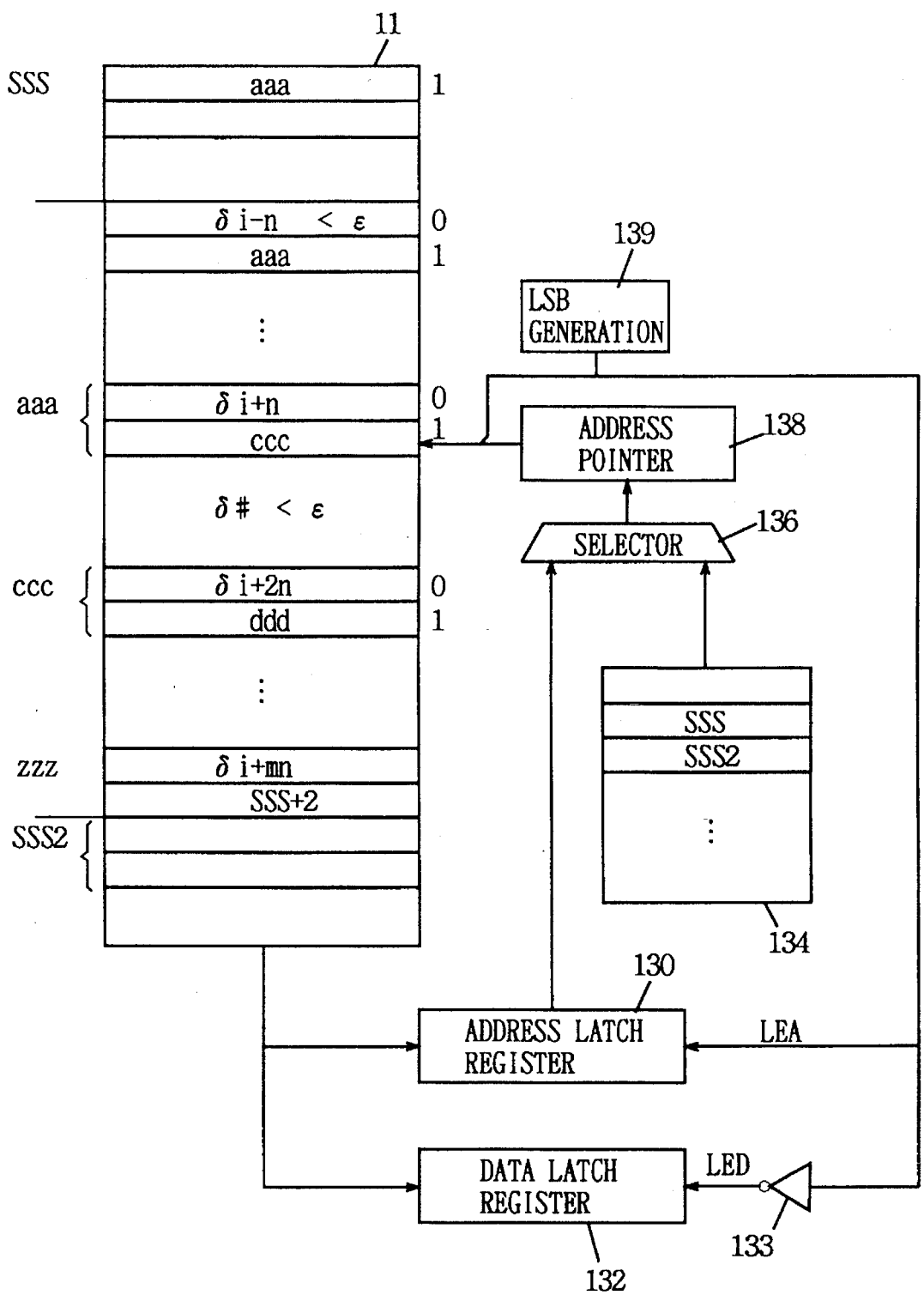
FIG. 29 illustrates a structure for carrying out arithmetic processing in accordance with the structure shown in FIG. 28.

FIG. 29 schematically illustrates a circuit structure for reading effective error data. Referring to FIG. 29, the data read control system includes an LSB generation circuit 139 for generating the least significant address bit LSB of the local memory 11, an address pointer 138 generating a neuron identifying address such as aaa, for example, an address latch register 130 receiving the bit generated by the LSB generation circuit 139 as a latch enable signal LEA for latching and holding numeric data read from the local memory 11, and a data latch register 132 receiving an address bit generated by the LSB generation circuit 139 as a latch enable signal LED through an inverter 133 for latching the numeric data read from the local memory 11. The address pointer 138 is supplied with address data stored in the address latch register 130 or data read from a register file 134 through a selector 136. The address latch register 130 latches the numeric data read from the local memory 11 when the address bit generated by the LSB generation circuit 139 is "1". The local memory 11 stores address data indicating a location to be subsequently accessed in an odd address where the least significant bit LSB is "1", and hence the address latch register 130 regularly stores address data indicating a location to be subsequently accessed. The data latch register 132 latches and holds supplied numeric data when the latch enable signal LED is "1". The latch enable signal LED becomes "1" when the address bit generated by the LSB generation circuit 139 is "0". Namely, an even address of the local memory 11 where the least significant address bit is "0" stores effective error data, and the data latch register 132 latches the effective error data read from the local memory 11. The address data generated by the address pointer 138 and the address bit generated by the LSB generation circuit 139 are supplied as address data for the local memory 11. The operation is now described.

An initial address is set in the address pointer 138. This setting is implemented by reading address data SSS from the register file 134 and supplying the same to the address pointer 138 through the selector 136. In an initial state, an address SSS1 of the local memory 11 stores the address aaa indicating the location to be accessed first, and the LSB generation circuit 139 first generates an address bit of "1". Thus, the address data aaa for the address SSS1 is read and latched by the address latch register 130 (a latch enable signal ADA is in an active state). Then the selector 136 selects and supplies the address held by the address latch register 130 to the address pointer 138. At this time, the LSB generation circuit 139 generates an address bit of "0". Effective error data $\delta i+n$ stored in the address aaa is read. The latch enable signal LED outputted from the inverter 133 enters an active state, and the data latch register 132 holds the effective error data read from the local memory 11. The effective error data stored in the data latch register 132 is supplied to a computing element in the related arithmetic unit, to be employed for calculating the synapse load correction amount $\Delta Wij$.

Then the LSB generation circuit 139 generates an address bit of "1", so that address data ccc indicating a location to be subsequently accessed is read from an address aaa1. The address data ccc read from the local memory 11 is stored in the address latch register 130 (the latch enable signal LEA is in an active state). Thereafter this operation is repeated until a prescribed address is reached.

The LSB generation circuit 139 can be structured by a T flip-flop, whose output data value is inverted every time a clock signal is supplied, or the like.

It is possible to identify whether or not a specific address is reached, i.e., whether all effective error data to be subjected to arithmetic operations in one layer are read, by comparing the maximum value (ddd) of addresses specifying the neurons in the layer with the addresses stored in the address latch register 130. Alternatively, it is possible to identify whether or not ever neuron in a single layer is completely processed by comparing a layer identifying address (SSS2) stored in the register file 134 with data of the addresses stored in the address latch register 130.

The effective error data are stored in the local memory 11 in the following manner, for example: An effective error $\delta i$ is calculated in accordance with $ei \cdot (d(Si)/dui)$. This calculating operation is executed in the control unit 20.

When a neuron i is not provided in the output layer, an error ei is calculated by $\Sigma Wki \cdot \delta k$ with a previously obtained effective error $\delta k$. The error ei can be obtained similarly to the membrane potential, by successively propagating the effective error from the control unit 20 to each arithmetic unit. Thereafter the effective error is again obtained in the control unit 20. When this effective error is obtained, the control unit 20 compares the same with the threshold value, to decide whether or not arithmetic processing is to be executed. When all effective errors of neurons are obtained as to one layer in the control unit 20, neurons requiring no arithmetic operations are identified and addresses of neurons for obtaining effective errors to be subjected to arithmetic operations are stored in a register, for example. The addresses stored in the register are referred to, for deciding addresses to be linked with the respective effective error data. The address for identifying each neuron is compared with the addresses stored in the register, and a specific address of the register is linked with each effective error data until the neuron identifying address reaches one address stored in the register. When the neuron identifying address is equal to the specific address stored in the register, the addresses of the register are updated to repeat the same operation. Thus, it is possible to transmit the effective error data and the address data linked therewith to the respective arithmetic units for storing the same in the local memory 11.

In the structure shown in FIGS. 28 and 29, the effective error data are stored in the locations of the even addresses each having "0" at the least significant address bit, and jump target addresses indicating locations to be subsequently accessed are stored in odd address positions. Alternatively, the most significant address bit MSB may be employed in place of the least significant address bit LSB. Further, the data stored in the local memory 11 may not be the effective error data.

[Third System of Omitting Operation]

Figure 30:
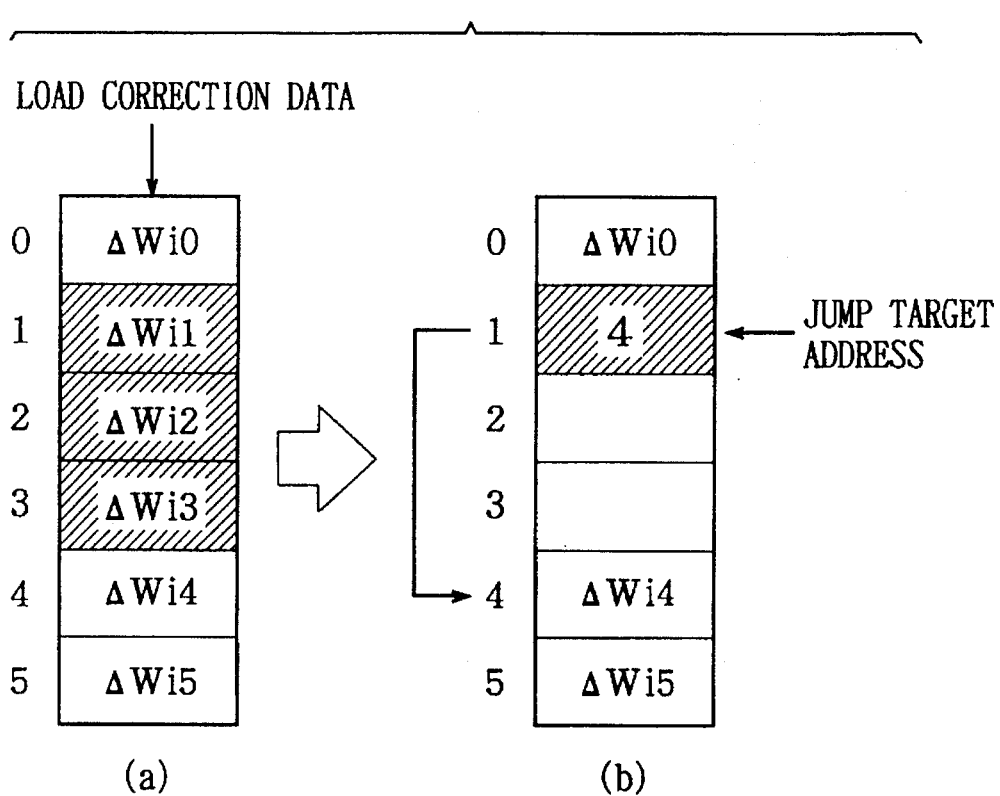
FIG. 30 conceptually illustrates a third system of omitting arithmetic processing.

FIG. 30 illustrates the concept of a third system of omitting arithmetic operations according to the present invention. FIG. 30 shows exemplary synapse load correction data $\Delta Wij$. As shown at (a) in FIG. 30, synapse load correction data $\Delta Wi1$, $\Delta Wi2$ and $\Delta Wi3$ for which arithmetic operations can be omitted are stored in a memory (local memory). Arithmetic operations are omitted in accordance with addresses stored in a separately provided memory region (not shown at (a) in FIG. 30) (jump from an address 0 to an address 4). In the structure of the third system of omitting arithmetic operations, address data indicating a position for storing synapse load correction data to be subsequently subjected to arithmetic processing is stored in this synapse load correction data storage region, as shown at (b) in FIG. 30. Identification is made as to whether numeric data read from the memory is address data or data to be arithmetically operated, and the subsequent procedure is changed to jump over to a next address position while omitting operations. In the structure shown at (b) in FIG. 30, the memory holds only necessary information and requires no memory region for storing jump target addresses, whereby it is possible to save the memory space. Description is now made on the system of changing the procedure in accordance with the content of the numeric data read from the memory, with reference to synapse load correction data.

Figure 31:
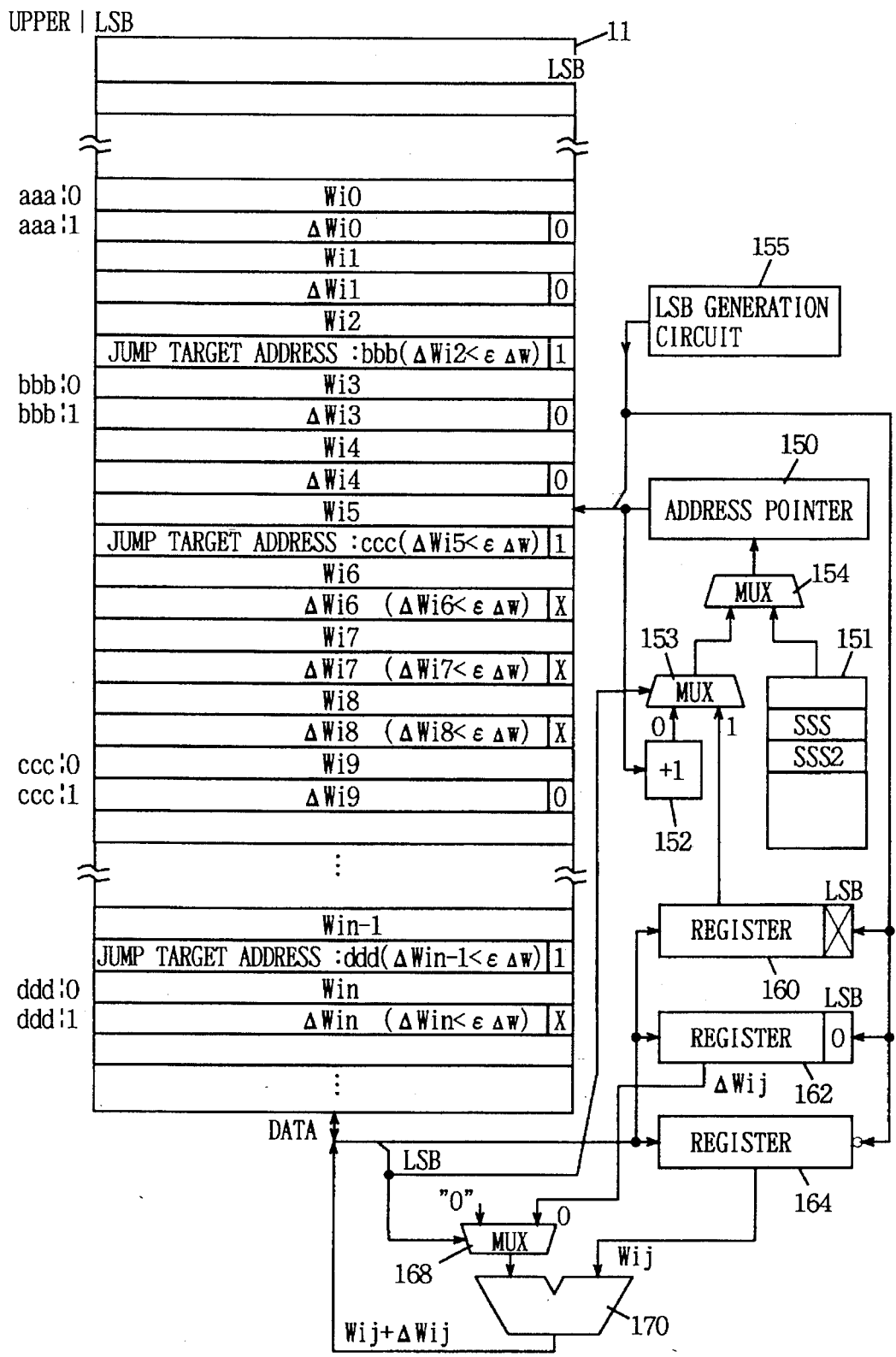
FIG. 31 illustrates specific arrangement for implementing the structure shown in FIG. 30.

FIG. 31 schematically illustrates a circuit structure for synapse load value correction in accordance with the third system of omitting operations. Referring to FIG. 31, the local memory 11 stores synapse load data Wij (Wi0 to Win) and $\Delta Wij$ ($\Delta Wi0$ to $\Delta Win$) in entries of even addresses and odd addresses respectively. Odd addresses are those each having the least significant bit LSB of "1", and even addresses are those each having the least significant bits LSB of "0". Upper addresses of the local memory 11 except the least significant bits LSB identify neurons to be coupled. When synapse load correction data $\Delta Wij$ is less than a prescribed threshold value $\epsilon\Delta W$, the location stores data of an address position (neuron identifying address) to be subsequently accessed.

Identification as to whether numeric data stored in an odd address of the local memory 11 is a neuron identifying address (hereinafter referred to as a jump target address) to be subsequently accessed or valid synapse load correction data is made through the least significant bit LSB of the data stored in the odd address region of the local memory 11. When the least significant bit LSB of the data stored in an odd address of the local memory 11 is "1", the numeric data stored therein is jump target address data, while the same is synapse load correction data when the least significant bit LSB is "0". In accordance with the value of the numeric data stored in the local memory 11, i.e., the value of the least significant bit LSB of the data stored in the odd address, the procedure after reading of the data is changed.

A synapse load change processing system includes an address pointer 150 generating upper addresses for the local memory 11, and an LSB generation circuit 155 generating the least significant bits LSB indicating the odd and even addresses of the local memory 11. The local memory 11 is addressed by the addresses generated by the address pointer 150 serving as the upper addresses and the least significant address bits generated by the LSB generation circuit 155 for reading data.

The change processing system further includes registers 160, 162 and 164 for storing the data read from the local memory 11 in accordance with the values of the address bits generated by the LSB generation circuit 155. The register 160 stores numeric data read from the local memory 11 when an address bit generated by the LSB generation circuit 155 is "1". This register 160 neglects (truncates) the least significant bit LSB of the numeric data read from the local memory 11. When 10-bit numeric data is read from the local memory 11, for example, the register 160 stores only the upper 9 bits. The register 162 stores data read from the local memory 11 when an address bit generated from the LSB generation circuit 155 is "1". This register 162 forcibly sets the least significant bit LSB thereof at "0". The register 164 stores data read from the local memory 11 when an address bit generated by the LSB generation circuit 155 is "0". Therefore, the registers 160 and 162 store the numeric data stored in the odd addresses of the local memory 11, i.e., the jump target addresses or the synapse load correction data. The register 164 stores the numeric data stored in the even addresses of the local memory 11, i.e., the synapse load data.

An arithmetic processing system includes a multiplexer 168 for passing one of numeric data (synapse load correction data $\Delta Wij$) stored in the register 162 and a fixed value "0" in accordance with the least significant bit LSB of numeric data stored in the local memory 11, and an adder 170 for adding the numeric data passed by the multiplexer 168 and numeric data (synapse load data Wij) read from the register 164. The arithmetic result of the adder 170 is stored in an original address position of the local memory 11. When synapse load data Wi0 is read from an address aaa0 of the local memory 11, for example, the arithmetic result of the adder 170 is again stored in this address aaa0.

An address change system includes an incrementer 152 for generating an address generated by the address pointer 150 by 1, a multiplexer 153 for passing an output of the incrementer 152 or data stored in the register 160 in accordance with the least significant bit LSB of numeric data read from an odd address of the local memory 11, and a multiplexer 154 for passing one of an output of the multiplexer 153 and an address read from a register file 151. An output of the multiplexer 154 is supplied to the address pointer 150. The multiplexer 153 selects the output of the incrementer 152 when the least significant bit LSB of the numeric data read from an odd address of the local memory 11 is "0", while the same passes the numeric data (excluding the least significant bit) stored in the register 160 when the least significant bit LSB is "1". The register 160 stores a jump target address when the numeric data read from the odd address of the local memory 11 is the jump target address (upper bit address of the local memory 11 excluding the least significant address bit). Therefore, the multiplexer 153 selects the output of the incrementer 152 when the numeric data read from the odd address of the local memory 11 is the synapse load correction data $\Delta Wij$, while the same selects the data stored in the register 160 when the numeric data indicates the jump target address. The operation is now described.

(i) First, an initial address is set in the address pointer 150. This initial address is set by reading a head address from the register file 151 and supplying the read out head address to the address pointer 150 through the multiplexer 154.

(ii) An address bit generated by the LSB generation circuit 155 is set at "0", and supplied to the local memory 11 with address data generated by the address pointer 150. Thus, the local memory 11 supplies the first synapse load data $\Delta Wi0$ (it is assumed that the address initialized in the address pointer 150 is aaa) to the registers 160, 162 and 164. The value of the address bit generated by the LSB generation circuit 155 is "0", whereby the register 164 stores the numeric data (synapse load correction data) read from the local memory 11.

(iii) The address data generated by the address pointer 150 is left unchanged, and the address bit generated by the LSB generation circuit 155 is made "1". Thus, the synapse load correction data $\Delta Wi0$ is read from the address aaa1. The synapse load correction data $\Delta Wi0$ as read is stored in the registers 160 and 162 since the address bit generated by the LSB generation circuit 155 is "1". Since the least significant bit LSB of the synapse load correction data $\Delta Wi0$ read from the local memory 11 is "0", the multiplexer 168 selects and supplies the synapse load correction data $\Delta Wi0$ stored in the register 162 to the adder 170. The other input of the adder 170 receives the synapse load data Wij stored in the register 164. Therefore, the adder 170 generates a new synapse load value $Wij+\Delta Wij$.

(iv) In parallel with the adding operation of the adder 170, the address bit generated by the LSB generation circuit 155 is made "0" and the addition result data $Wij+\Delta Wij$ outputted by the adder 170 is written in a corresponding address position of the local memory 11. Thus, the synapse load value Wi0 is corrected to $Wi0+\Delta Wi0$.

(v) In the address updating part, on the other hand, the multiplexer 153 selects and supplies the output of the incrementer 152 to the multiplexer 154 in parallel with the selecting operation of the multiplexer 168. The address pointer 150 incorporates the address newly supplied from the multiplexer 154 after completion of writing of the updated synapse load data in the local memory 11, and generates an address indicating a position to be subsequently accessed. The LSB generation circuit 155 makes the address bit "0" in synapse load data writing. Therefore, next synapse load data is then read from the local memory 11, to be stored in the register 164. The aforementioned operation is repeated, and the following operation is executed when data read from an odd address of the local memory 11 is a jump target address.

When numeric data is read from an odd address of the local memory 11, this numeric data is stored in the registers 160 and 162. The least significant bit LSB of the numeric data as read, i.e., a jump target address, is "1", and the multiplexer 168 selects a constant "0" and supplies the same to one input of the adder 170. The other input of the adder 170 is supplied with the synapse load data Wij stored in the register 164. Thus, the adder 170 outputs an arithmetic result $Wij+$"0". Namely, the synapse load correction data $\Delta Wij$ is neglected. The arithmetic result of the adder 170 is stored in an original address position of the local memory 11, similarly to the precedent operation.

In the address updating part, the multiplexer 153 selects the jump target address stored in the register 160. The address generated by the address pointer 150 is updated into the address supplied from the multiplexer 154 after the synapse load data is written in the local memory 11. Thus, the subsequently addressed location of the local memory 11 is that specified by the jump target address stored in the register 160. The aforementioned operation is repeated until all necessary synapse load data are read and processed.

As hereinabove described, it is possible to omit unnecessary arithmetic operations for carrying out prescribed arithmetic operations on only necessary numeric data, i.e., synapse load values to be corrected, by changing the procedure in accordance with the values of the numeric data read from the local memory 11. While adding operations are executed with respect to synapse load values stored in linkage with jump target addresses, the procedure after reading of related synapse load correction data, is changed also as to such synapse load data since the address change procedure is changed.

The connection mode of the register group and the adder shown in FIG. 31 is implemented under control by the sequence controller 25 shown in FIG. 2, while operation timing of each circuit is also set by the sequence controller 25. The registers 160, 162 and 164 execute latch operations when numeric data are read from the local memory 11 in accordance with values of address bits generated by the LSB generation circuit 155, while executing no latch operations in data writing in the local memory 11. The addresses of the address pointer 150 are updated after the arithmetic result data of the adder 170 are stored in the local memory 11.

The registers 160 and 162 may alternatively be formed by only one register. Since the multiplexer 168 selects the constant "0" when a jump target address is read and the multiplexer 153 selects the jump target address, it is possible to reliably omit unnecessary arithmetic operations also when the registers 160 and 162 are formed by one register.

Further, it is possible to execute setting of the addresses, reading of the numeric data, operations of the numerical values, writing of the arithmetic results and updating of the addresses in a pipeline manner by providing latch registers in proper positions.

As hereinabove described, it is possible to hold only information required for processing in the memory 11 to save the memory space by storing data to be subjected to an arithmetic operation and an address indicating a location to be subsequently accessed in a common address region while storing only one of the both in the memory 11. In the structure shown in FIG. 31, further, it is possible to reduce the number of arithmetic operations by changing the procedure in accordance with the value of the least significant bit of numeric data read from the memory 11, thereby completing the overall processing at a high speed.

The above description is made as to updating of jump target addresses in synapse load correction processing. When numeric data satisfies specific conditions in a numeric data storage region, it is possible to execute only a necessary procedure for carrying out the processing at a high speed by storing data defining the content of processing to be subsequently executed in place of the numeric data in the numeric data storage region. Identification between the numeric data indicating the content of processing or that to be subjected to arithmetic processing is made by identifying the numeric value of the read numeric data, so that the subsequent procedure may be adjusted in accordance with the result of this identification. This function corresponds to each functional block of the sequence controller 25 shown in FIG. 3.

[Writing of Address Data in Local Memory]

In order to correctly execute the aforementioned system of omitting arithmetic operations, it is necessary to correctly update an address (jump target address) to be subsequently accessed every time a series of operations such as repeated learning operations are repeated, so that the arithmetic operations to be omitted can be correctly skipped. The updating of the jump target address is executed in parallel with original synapse load correction processing, to attain a sufficient effect of reduction of arithmetic operations. This structure is now described.

Figure 32:
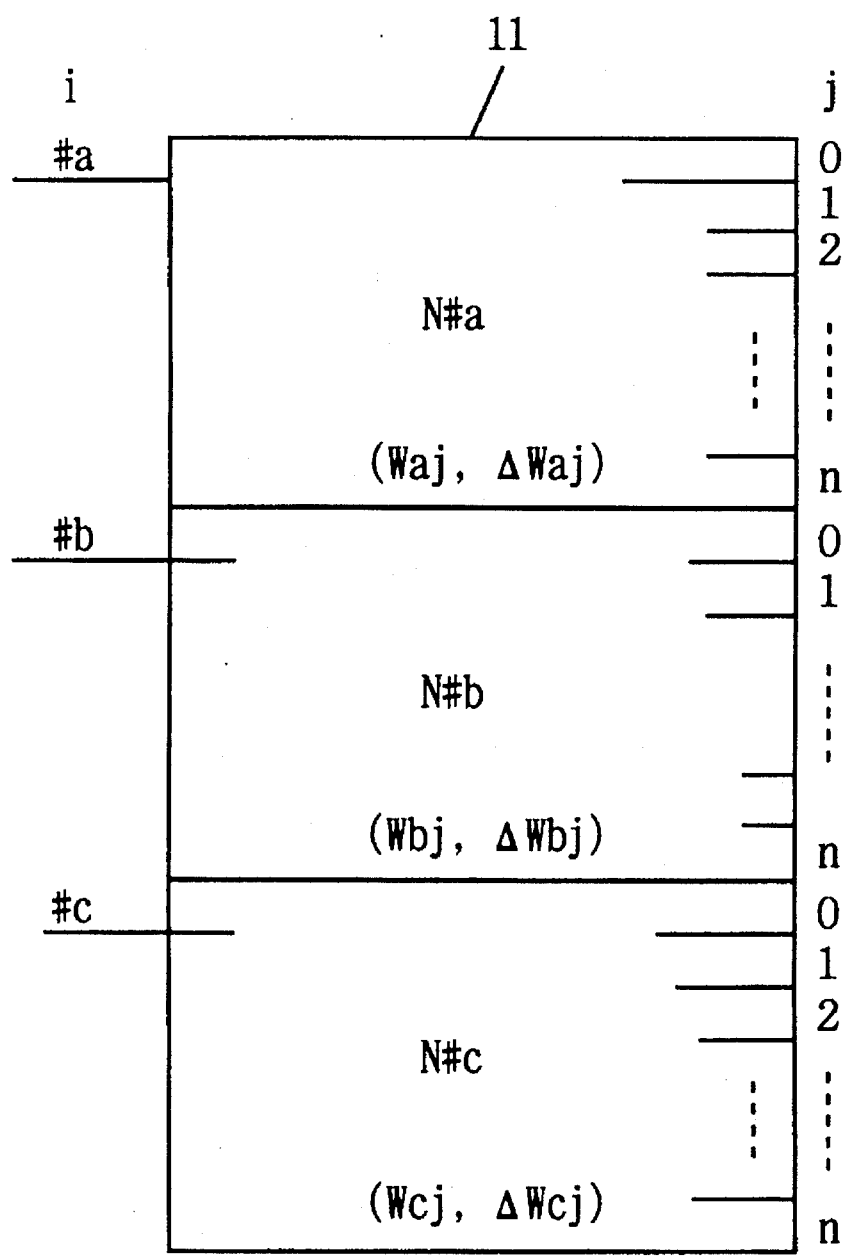
FIG. 32 illustrates exemplary allocation of addresses in a local memory shown in FIG. 31.

Term definition is first made. As shown in FIG. 32, the local memory 11 stores synapse load values and synapse load correction data for a plurality of neuron units. FIG. 32 schematically illustrates such a state that the local memory 11 stores synapse loads and synapse load correction data for neurons N#a, N#b and N#c. In order to identify the neurons N#a, N#b and N#c, the local memory 11 requires head addresses #a, #b and #c which are allocated to the neurons N#a to N#c respectively. The addresses #a, #b and #c for identifying the neurons N#a, N#b and N#c are hereinafter referred to as $i$ addresses. The neurons N#a, N#b and N#c are interconnected with neurons of an other layer in the hierarchical neural network. The local memory 11 stores synapse loads and synapse load correction data for the respective neurons. Addresses (0 to n in FIG. 32) for identifying coupling destination neurons are hereinafter referred to $j$ addresses. In the address structure of the local memory 11 shown in FIG. 31, for example, a subscript $j$ of the synapse load data Wij corresponds to a $j$ address, for example. Sums of the $i$ and $j$ addresses correspond to absolute addresses of the local memory 11 such as the addresses aaa and bbb.

Figure 33:
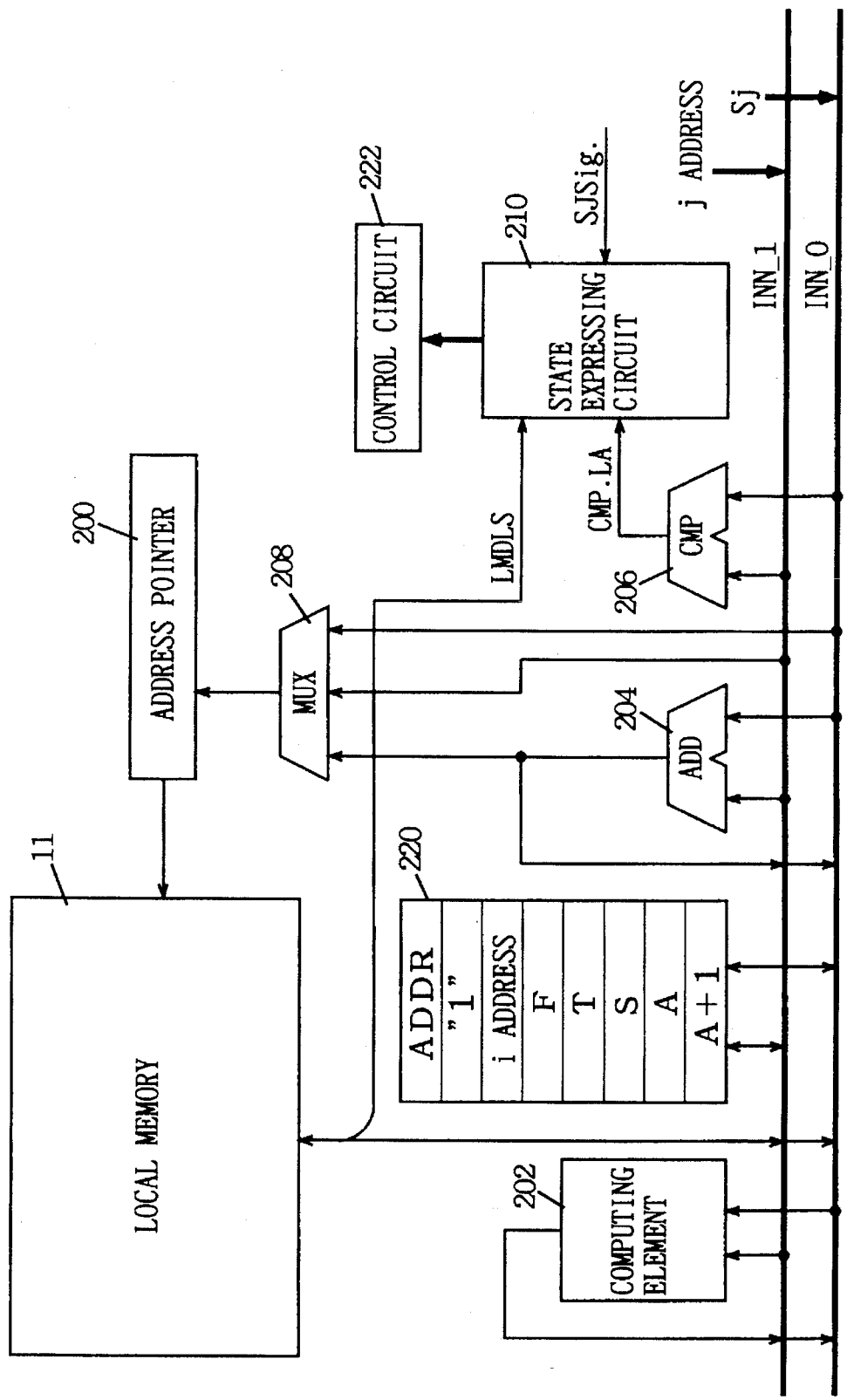
FIG. 33 illustrates a structure for writing numeric data in the local memory shown in FIG. 31.

FIG. 33 shows the structure of a data write control system for synapse load correction. The structure shown in FIG. 33 is provided in each arithmetic unit.

Referring to FIG. 33, the write control system includes an address pointer 200 generating addresses for the local memory 11, a register file 220 storing constant data and status flags indicating the states of progress of arithmetic operations, and a state expressing circuit 210 generating control signals for carrying out control (updating of write addresses, updating of jump target addresses, updating of jump start addresses, writing of numeric data etc.) of data writing in the local memory 11 according to the states of progress of the arithmetic operations.

The register file 220 stores a limit address ADDR indicating termination of single processing, a constant "1", the $i$ address, and various addresses F, T, S, A and (A+1). These addresses have the following meaning:

The address T indicates a jump target address. This jump target address T indicates a position for storing numeric data to be subsequently subject to arithmetic operation, and corresponds to address data (stored in the register 160 shown in FIG. 31) read from the local memory 11.

The address S indicates an absolute address in the local memory 11, and is expressed by the sum (i+j) of $i$ and $j$ addresses. The $j$ address is supplied from the exterior with an output state value Sj.

The address A indicates a current address, which is currently accessed in the local memory 11. The address A is set at S (=i+j) when T>S, while the same is set at T when T≦S.

The address F indicates a jump start address, which is a start position in the local memory 11 for arithmetic operations to be omitted.

All of these addresses T, S, A and F indicate neuron identifying addresses (the address aaa in FIG. 31, for example), and specify both of synapse load data storage and synapse load correction data storage locations.

A computing element 202, an adder (ADD) 204 and a comparator (CMP) 206 are provided for updating the addresses T, S, A and F, updating control signals (status flags) generated by the state expressing circuit 210, and carrying out prescribed arithmetic operations.

The computing element 204 executes operations for the aforementioned synapse load correction value updating etc. The adder 204 executes generation of an absolute address (i+j) of the local memory 11, addition for updating the synapse load value and the synapse load correction value and calculation of a precedent address described later.

The comparator 206 executes the operations of comparation of T>S, $|\Delta W_{ij}| \leq |\epsilon(\Delta W)|$ and A>A(t−1)+1. $\epsilon(\Delta W)$ represents a threshold value for the synapse load correction value $\Delta W_{ij}$. A(t−1) represents a position for storing numeric data which is subjected to a prescribed arithmetic operation or accessed most recently (in a precedent access cycle). In other words, the address A(t−1) indicates an address of the local memory 11 having most recently (in the precedent access cycle) stored synapse load correction data which is greater than the threshold value $\epsilon(\Delta W)$ in the precedent access cycle.

Internal data buses INN0 and INN1 are provided for interconnecting these functional units and transferring necessary data. While FIG. 32 shows two internal data buses INN0 and INN1 for simplifying the illustration, the number of such internal data buses may be increased. The internal data bus INN0 is supplied with external output state value data Sj, while j addresses for identifying the output state values Sj are transmitted to the internal data bus INN1.

The state expressing circuit 210 executes updating of status flags described later in detail, in accordance with an output signal CMPLA from the comparator 206, a signal SJSig supplied from the exterior, and the least significant bit LMDLS of numeric data read from the local memory 11. The signal SJSig is activated to indicate that a j address of currently supplied output state value data Sj is not continuous with that of output state value data Sj(t−1) supplied in a precedent cycle. Namely, the signal SJSig indicates that skipping (omission of arithmetic operation) is carried out with respect to the output state value Sj. This signal SJSig can be generated through the structure shown in FIG. 27.

Figure 34:
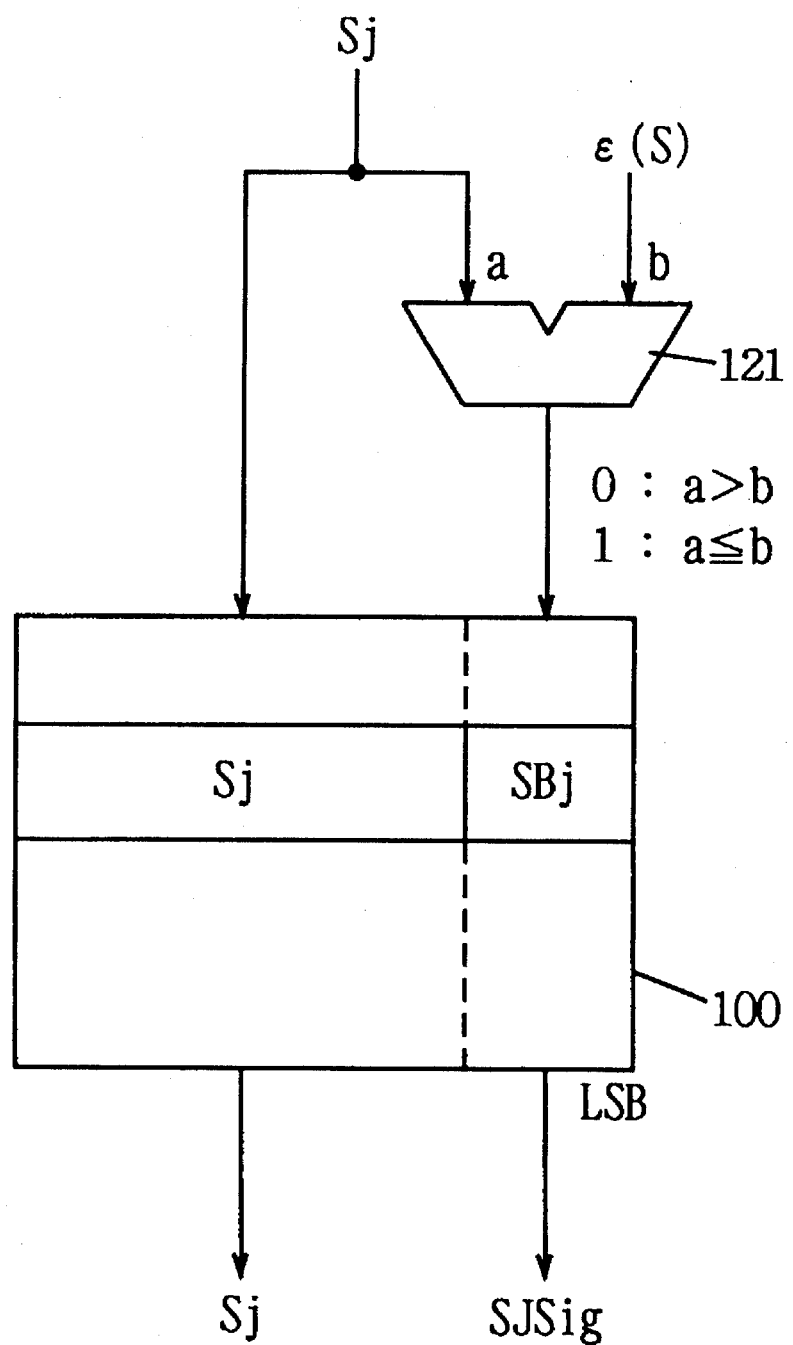
FIG. 34 illustrates an exemplary structure in a control unit which is employed in common with the structure shown in FIG. 33.

As shown in FIG. 34, the output signal of the comparator 121 is written in a prescribed bit position (position of the least significant bit LSB in FIG. 34) of the numeric data storage region of the state memory 100 in linkage with corresponding output state value data Sj. The comparator 121 generates an output signal of "0" when the output state value Sj is greater than the threshold value $\epsilon(\Delta W)$ (when $|Sj|>|\epsilon(\Delta W)|$), and otherwise, it generates an output signal of "1". When a skip bit SBj (corresponding to the output of the comparator 121) which is stored in the state memory 100 in linkage with the output state value data Sj is "1", therefore, this means that the arithmetic operation must be omitted for the related output state value data Sj. If the skip bit SBj stored in the least significant bit LSB is also transmitted to the arithmetic unit when the output state value Sj is transmitted from the state memory 100 to the arithmetic unit, therefore, the signal SJSig is readily generated. The skip bit SBj may be stored not in the least significant bit position, but in the most significant bit position.

Figures 35, 36:
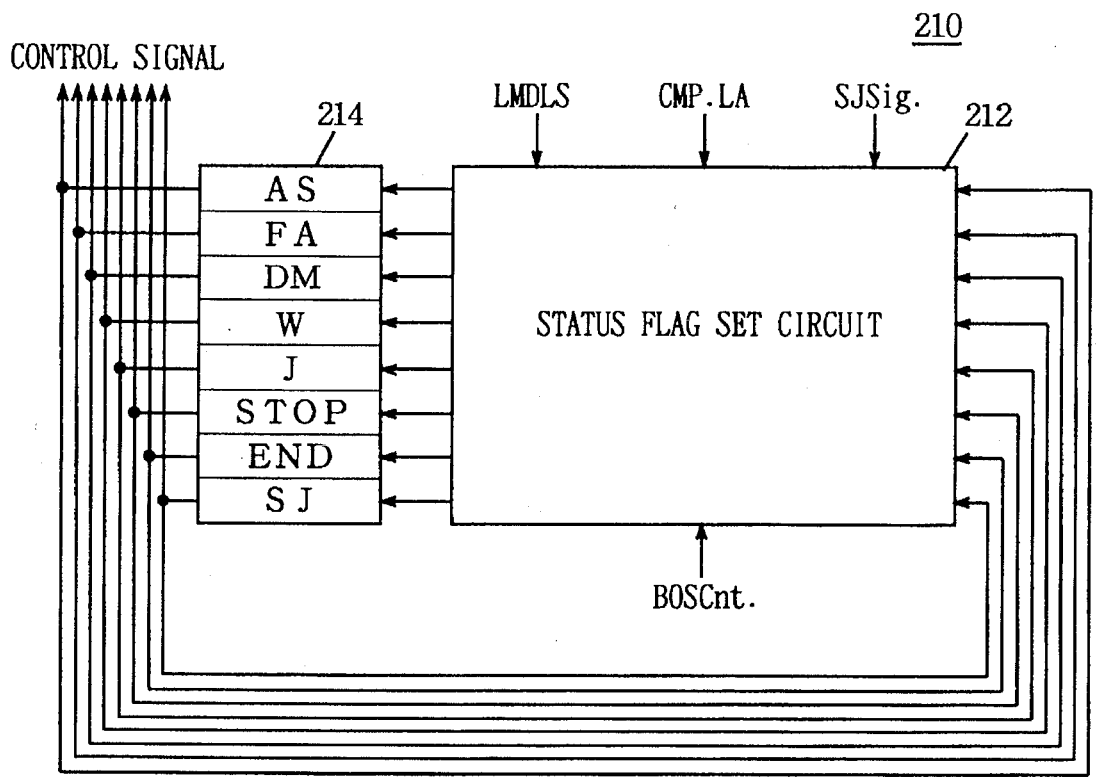
FIG. 35 schematically illustrates a structure of a state expressing circuit shown in FIG. 33.
FIG. 36 is a list showing definition of status flags shown in FIG. 35.

FIG. 35 illustrates the structure of the state expressing circuit 210 shown in FIG. 33. Referring to FIG. 35, the state expressing circuit 210 includes a flag register 214 for storing status flags expressing arithmetic operation states which are required for defining processed-information-writing operations, and a status flag set circuit 212 for updating the status flags stored in the flag register 214. The status flag set circuit 212 receives the least significant bit LMDLS of numeric data read from the local memory 11 shown in FIG. 33, the output signal CMPLA of the comparator 206 shown in FIG. 33, the skip indication signal SJSig shown in FIG. 33 and the respective status flags stored in the flag register 214 for updating the status flags. This status flag set circuit 212 updates a specified status flag in accordance with a flag update control signal BOSCnt supplied from the control unit 20 (see FIG. 1). An operation processing step in each arithmetic unit progresses in accordance with an instruction from the control unit 20. It is possible to correctly update a corresponding status flag in accordance with a processing step, such as latching of the output state value signal Sj supplied from the exterior, reading of numeric data from the local memory 11 etc., for example, in each arithmetic unit by supplying the status flag update control signal BOSCnt from the control unit 20 to each arithmetic unit.

FIG. 36 is a list of definition of the status flags stored in the flag register 214. The definition of the respective flags is now described.

The flag AS becomes "1" when a currently specified address S (=i+j) of the local memory 11 does not yet reach the jump target address T. Namely, the flag AS becomes "1" when an arithmetic operation is omitted.

The flag FA becomes "1" when difference between the address A(t−1) most recently subjected to a prescribed arithmetic operation or accessed in the precedent access cycle and the current address A is greater than 1. Namely, the flag FA indicates that an address of the local memory 11 is skipped (arithmetic operation is omitted).

The flag SJ becomes "1" when an address of the externally supplied output state value data Sj is jumped.

The flag DM indicates the value of the least significant bit LSB of the numeric data read from the local memory 11. Namely, the flag DM indicates whether the read numeric data is address data indicating the content of next processing or data to be subjected to an arithmetic processing.

The flag W becomes "1" when the synapse load correction value $\Delta W_{ij}$ is below the prescribed threshold value $\epsilon(\Delta W)$, i.e., when $|\Delta W_{ij}| \leq |\epsilon(\Delta W)|$. Namely the , flag W indicates that address data specifying the content of next processing is to be written in the local memory 11 in place of the synapse load correction data $\Delta W_{ij}$.

The flag J is equal to the value W(t−1) of the flag W in the precedent arithmetic operation cycle which is most recently accessed.

The flag STOP is equal to the value AS(t−1) of the flag AS in the precedent arithmetic operation cycle which is most recently accessed.

The flag END becomes "1" when the address S(i+j) accessed in the local memory 11 exceeds the prescribed limit address ADDR. Namely, the flag END indicates that all operations are completed.

A control circuit 222 shown in FIG. 33 executes necessary control operations in accordance with the values of these status flags.

A flag generation/updating technique is now described with reference to FIGS. 33 and 35.

Flag AS:

The internal data buses INN0 and INN1 are supplied with an output state value data Sj and a j address. An i address stored in the register 220 is read and the adder 204 adds the i and j addresses to generate an absolute address S (=i+j) of the local memory 11. The absolute address S outputted from the adder 204 is again stored in the register 220. Then, the newly generated absolute address S and an already stored jump target address T are read from the register 220 and supplied to the comparator 206. In this case, the output of the adder 204 may be supplied to the comparator 206, so that the jump target address T is read from the register 220 before storage of the newly generated absolute address S in the register 220. The status flag set circuit 210 shown in FIG. 35 newly generates a flag AS in accordance with the output signal CMPLA of the comparator 206, and writes the newly generated flag AS in the state register 214.

Flag FA:

When the value of the flag AS is set up, the current address A of the register 220 is updated to the jump target address T or the absolute address S. Then, the newly generated current address A and the already stored address A(t−1)+1 are read from the register 220 and supplied to the comparator 206. The comparator 206 compares the addresses A with A(t−1)+1 and generates the signal CMPLA in accordance with the result of the comparison. The status flag set circuit 212 (see FIG. 35) sets the value of the flag FA in accordance with the output signal CMPLA from the comparator 206, and updates the flag FA in the flag register 214.

Flag SJ:

The flag SJ is updated in accordance with the signal SJSig.

Flag DM:

The status flag DM in the flag register 214 is updated in the status flag set circuit 212 in accordance with the value of the least significant bit LSB when numeric data is read from the local memory 11 (numeric data read from an odd address of the local memory 11 in the aforementioned embodiment).

Flag W:

When a synapse load correction value $\Delta Wij$ is calculated by the computing element 202, the threshold value $\epsilon(\Delta W)$ stored in the register (not clearly shown) is read. The comparator 206 compares the calculated synapse load correction value $\Delta Wij$ with the threshold value $\epsilon(\Delta W)$, and generates the output signal CMPLA in accordance with the result of the comparison. The status flag set circuit 212 updates the flag W in accordance with the output signal CMPLA.

Flag J:

The status flag set circuit 212 selects a flag of the precedent arithmetic operation cycle, to update the flag J. It is possible to readily update the flag value of the current cycle in accordance with the flag value in the precedent arithmetic operation cycle by supplying a flag outputted from the flag register 214 to an input part of the status flag set circuit 212.

Flag STOP:

The status flag set circuit 212 selects the flag AS in the precedent arithmetic operation cycle to update the flag STOP in update timing described later in detail. The flag STOP indicates that the arithmetic result in this arithmetic operation cycle is to be neglected and the numeric data of the local memory 11 must not be updated or subjected to an arithmetic operation. When the flag STOP is "1", writing of numeric data in the local memory 11 and the arithmetic operation of the numeric data are inhibited.

Flag END:

The newly calculated absolute address S and the limit address ADDR are read from the register 220 and supplied to the comparator 206. The comparator 206 compares the addresses S with ADDR, and generates the output signal CMPLA in accordance with the result of the comparison. The status flag setting circuit 212 makes the flag END "1" after completion of the arithmetic operation cycle when the signal CMPLA indicates S=ADDR. When the flag END becomes "1", it means that all arithmetic operations of valid numeric data (numeric data to be subjected to arithmetic operations, i.e., synapse load values and synapse load correction values) stored in the local memory 11 are completed.

Referring to FIG. 33, the addresses of the address pointer 200 are set through the multiplexer 208. As described later, an address for writing address data in the local memory 11 is supplied by the current address A or the jump start address F. The multiplexer 208 is provided for selecting the address for writing the address data. A specific operation is now described.

The flag STOP is temporarily reset under control by the control unit 20 when output state value data Sj to be subsequently subjected to an arithmetic operation is supplied, since it is necessary to carry out generation of the absolute address S, comparison with the jump target address T and generation of the flag AS in accordance with the newly supplied output state value Sj and the j address. The flag STOP holds the flag AS(t−1) in the precedent cycle until brought into a reset state. When the value of the flag AS is determined by comparison of the jump target address T and the absolute address S in the current cycle, the flag STOP is also determined in response. When T>S, it is not necessary to perform an arithmetic operation for the newly supplied output state value data Sj, and subsequent processing is stopped. In general, a reset signal is supplied after the arithmetic unit is supplied with the output state value Sj. Therefore, the flag STOP holds the flag AS in the precedent cycle when the output state value Sj is supplied. Thus, the flag STOP expresses the flag AS(t−1).

If address data is read in place of the synapse load value correction data $\Delta Wij$ when the synapse load correction amount $\Delta Wij$ is read from the local memory 11 to update the synapse load value correction amount, the newly read address data is stored in the register 220 as the jump target address T.

The flag W indicates a condition $|\Delta Wij| \leq |\epsilon(\Delta W)|$, and the flag J indicates relation between the flag W in the precedent cycle, i.e., the synapse load value correction amount, and the threshold value. In order to omit the arithmetic operation, address data is written in place of the synapse load correction data $\Delta Wij$ when $|\Delta Wij| \leq |\epsilon(\Delta W)|$. The state of progress of the processing can be recognized by the values of the two flags J and W, as described below:

$$J=W=0 \qquad (i)$$

Figure 37:
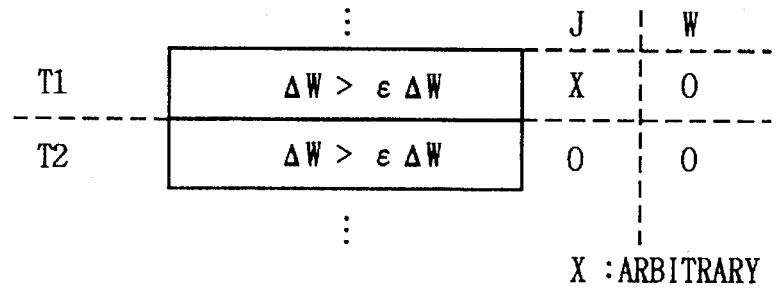
FIG. 37 illustrates correspondence between states of status flags W and J shown in FIGS. 35 and 36 and arithmetic processing states.
Figure 38A:
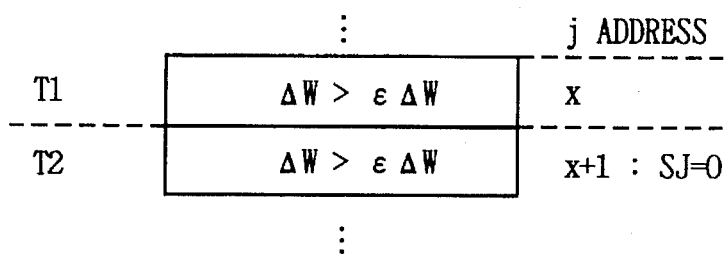
FIGS. 38A–38C illustrates states of the status flags W and J shown in FIGS. 35 and 36 and currently indicated arithmetic processing states.

In this state, synapse load correction data $\Delta W$ are calculated in two continuous arithmetic operation cycles T1 and T2 to indicate that data $\Delta W$ are greater than the threshold value $\epsilon(\Delta W)$, as shown in FIG. 37. The following combinations of states are conceivable as states where arithmetic operations are carried out in two continuous arithmetic operation cycles:

When j addresses of the cycles T1 and T2 are continuous as shown in FIG. 38A, the skip indication bit SJ is zero. In this case, it is not necessary to store address data in the local memory 11. In this case, therefore, no specific processing is carried out in relation to updating of the jump target address in particular.

Figure 38B:
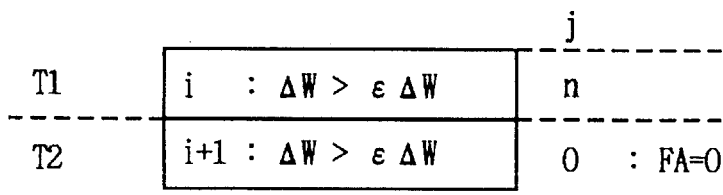

When i addresses are continuous as shown in FIG. 38B, the flag FA becomes zero, since data stored in locations of continuous addresses in the local memory 11 are subjected to arithmetic operations. Also in this case, no processing is performed for updating the jump target address.

Figure 38C:
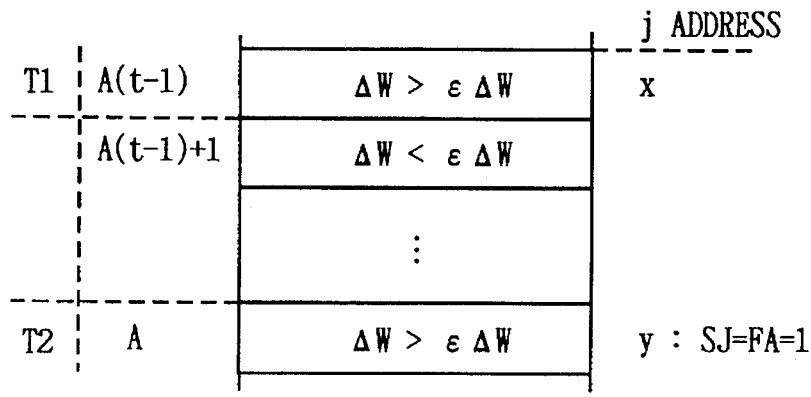

When the difference between addresses storing numeric data processed in the cycles T1 and T2 is greater than 1 as shown in FIG. 38C, both of the flags SJ and FA become "1". The j address is also skipped from x to y (each address of the local memory 11 corresponds to a coupling destination neuron, and an adjacent location has an adjacent j address). In this case, an arithmetic operation for numeric data stored in the address A(t−1) +1 which is next to the address A(t−1) can be omitted. Therefore, the current address A is written in this address A(t−1)+1. It is possible to implement storage of address data in the effective error data storage shown in FIG. 29 when the current address A is written into the locations from the address A(t−1)+1 to an address A−1.

The j addresses are jumped in the continuous two arithmetic operation cycles, since only valid output state value data is supplied to the arithmetic unit in accordance with the first arithmetic operation system.

$$J=0, W=1 \quad \text{(ii)}$$

Figure 39:
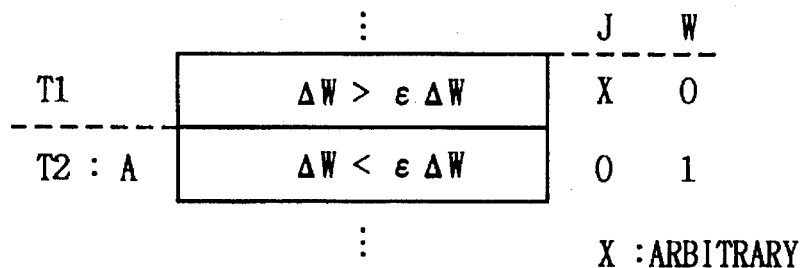
FIG. 39 illustrates the status flags W and J shown in FIGS. 35 and 36 and currently executed arithmetic processing states.
Figure 40:
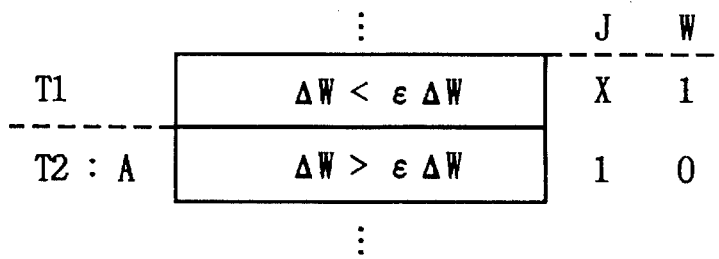
FIG. 40 illustrates correspondence between the status flags W and J and currently executed operations.
Figure 41:
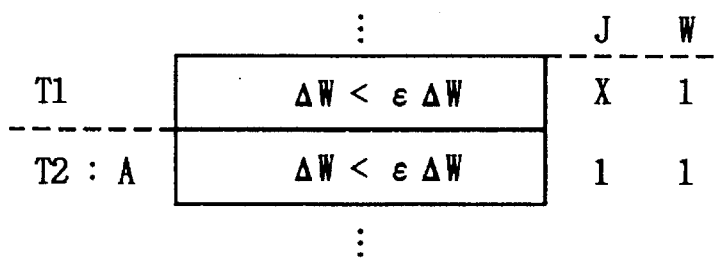
FIG. 41 illustrates the status flags W and J and current arithmetic processing states.

This state indicates that the arithmetic result in the precedent cycle T1 is valid and the arithmetic result in the current cycle T2 is omissible, as shown in FIG. 39. Therefore, it is necessary to write address data in an address position accessed in the current cycle. As clearly understood from FIGS. 38A and 38B, the current address A is the jump starting position when one of the flags SJ and FA is "0", and hence the current address A is stored in the register 220 shown in FIG. 33 as the jump start address F.

When both of the flags FA and SJ are "1", on the other hand, the jump start address is the address A(t−1) +1 on the analogy of FIG. 38C. Therefore, the address A(t−1)+1 is stored in the register 220 as the jump start address F in this case.

$$J=1 \text{ and } W=0 \quad \text{(iii)}$$

In this case, the current address A stores valid numeric data and the numeric data processed in the precedent cycle T1 can be omitted. Namely, the current address A indicates a point of termination of address jumping. Therefore, it is necessary to store the current address A in a jump start address position. Namely, the jump start address F is read from the register 220 (see FIG. 33), so that the current address A is written in the jump start address F of the local memory 11. This writing of the jump target address in the local memory 11 is executed regardless of the states of the flags SJ and FA.

$$J=w=1 \quad \text{(iv)}$$

This state indicates that both of the numeric data subject to arithmetic operation in the two continuous cycles T1 and T2 are omissible numeric data (synapse load correction data), i.e., address jumping must be continued. Therefore, no address updating for address jumping is carried out.

As hereinabove described, it is possible to decide whether or not address jumping is terminated in the current cycle, whether or not address jumping is started and whether or not jumping is continuous by recognizing the values of the flags J and W for correctly identifying the jump target address, the jump start address and the jump target address storage position in accordance with the values of the flags SJ and FA to store the identified one in the local memory 11, thereby executing the arithmetic operation only on the valid numeric data.

In this processing, further, the jump target address is written in accordance with the result of calculation of the synapse load correction data ΔW, whereby it is possible to decide and write the jump target address in the local memory 11 in parallel with the synapse load correction arithmetic operation for carrying out the arithmetic operation while omitting invalid numeric data which are increased in number with progress of learning, thereby efficiently executing the processing at a high speed.

Figure 42:
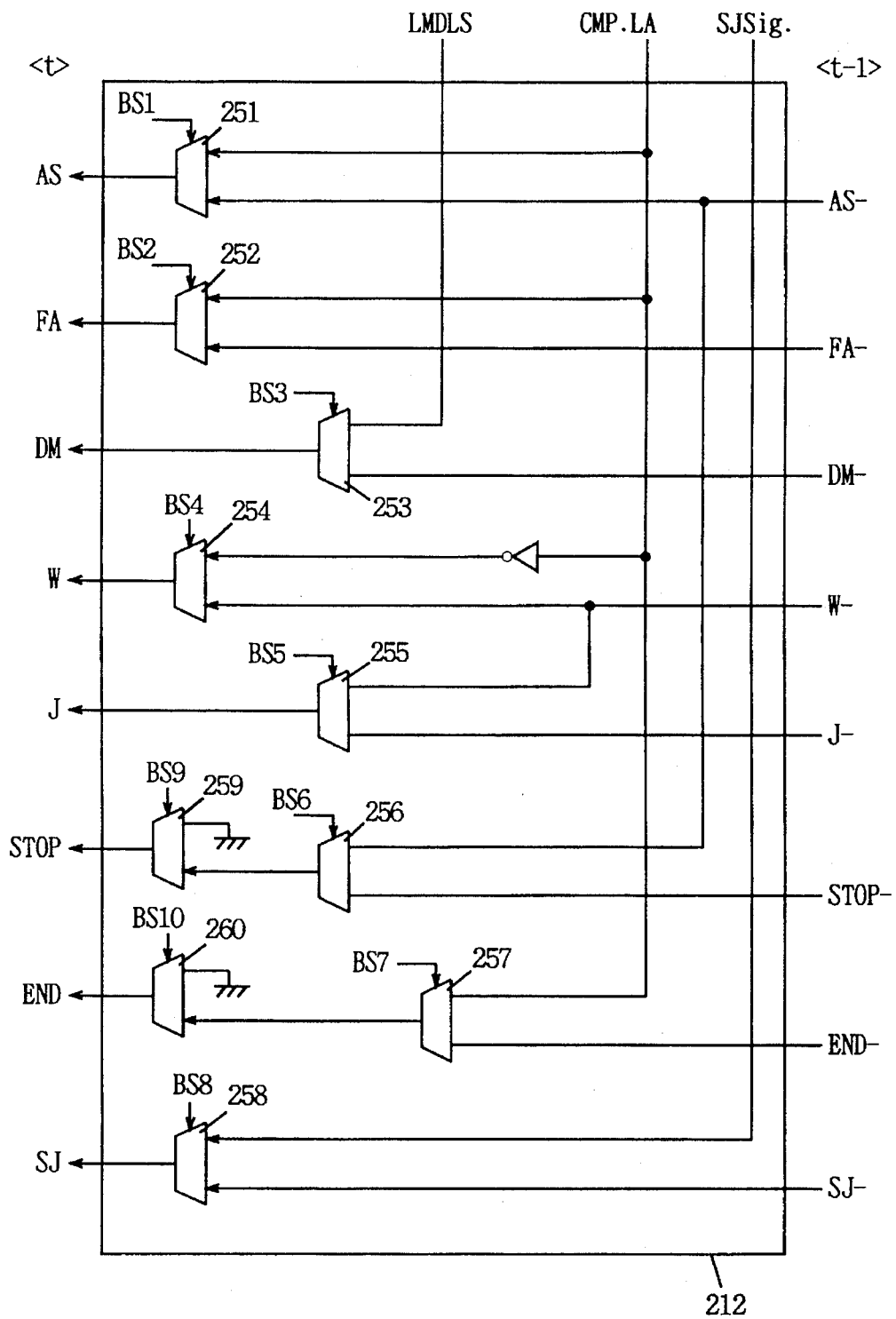
FIG. 42 illustrates an exemplary structure of a status flag set circuit shown in FIG. 35.

FIG. 42 shows a specific structure of the status flag set circuit 212 shown in FIG. 35. Referring to FIG. 42, the status flag set circuit 212 includes 10 selectors 251 to 260 in total. The selector 251 selects one of the output signal CMPLA from the comparator 206 and a status flag AS- supplied from the flag register 214 (see FIG. 35) in accordance with a control signal BS1, and generates the status flag AS in the current cycle. The selector 252 selects one of the comparator output signal CMPLA and a flag FA- stored in the state register 214 in accordance with a control signal BS2, and generates the flag FA in the current cycle. The selector 253 selects one of a least significant bit value LMDLS of numeric data read from the local memory 11 and a flag DM0 stored in the state register 214 in accordance with a control signal BS3, and generates the flag DM in the current cycle.

The selector 254 selects one of the comparator output signal CMPLA and a status flag W- outputted from the flag register 214 in accordance with a control signal BS4, and generates the flag W in the current cycle.

The selector 255 selects one of the status flag W- and a status flag J- outputted from the flag register 214 in accordance with a control signal BS5, and generates the flag J of the current cycle. The selector 258 selects one of the address skip indication signal SJSig and a status flag SJ- outputted from the flag register 214 in accordance with a control signal BS8, and generates the flag SJ of the current cycle.

Two selectors are provided for each of the flags STOP and END. Two selectors 256 and 259 are provided for the flag STOP. The selector 256 selects one of status flags AS- and STOP- in accordance with a control signal BS6. The selector 259 selects one of a ground potential ("0") and an output signal of the selector 256 in accordance with a control signal BS9, and generates the flag STOP of the current cycle. On the other hand, selectors 257 and 260 are provided for the flag END. The selector 257 selects one of the comparator output signal CMPLA and a status flag END- outputted from the flag register 214 in accordance with a control signal BS7. The selector 260 selects one of the ground potential ("0") and an output signal of the selector 257 in accordance with a control signal BS10, and generates the flag END of the current cycle. The selector 259 and 260 are provided for forcibly resetting the flags STOP and END from the exterior. Advantages obtained by forcibly resetting the flags STOP and END are described later in detail. It is briefly stated here that common numeric data can be synchronously notified to all arithmetic units from the control unit 20.

The control signals BS1 to BS10 are supplied from the control unit 20 to the respective arithmetic units in common. Only necessary flags are updated. The flag register 214 shown in FIG. 35 latches supplied data entirely at the same timing. An output signal of the flag register 214 is supplied to the control circuit 222 shown in FIG. 33 as a control signal and is also fed back to the status flag set circuit 212. Therefore, it is possible to update only necessary status flags by selectively driving the selectors 251 to 260 by the control signal BS1 to BS10 also when the flag register 214 is synchronously driven. It is not necessary to control latch operations for only specific registers but all registers are synchronously driven in the flag register 214, whereby operation control of the flag register 214 is simplified.

Figure 43:
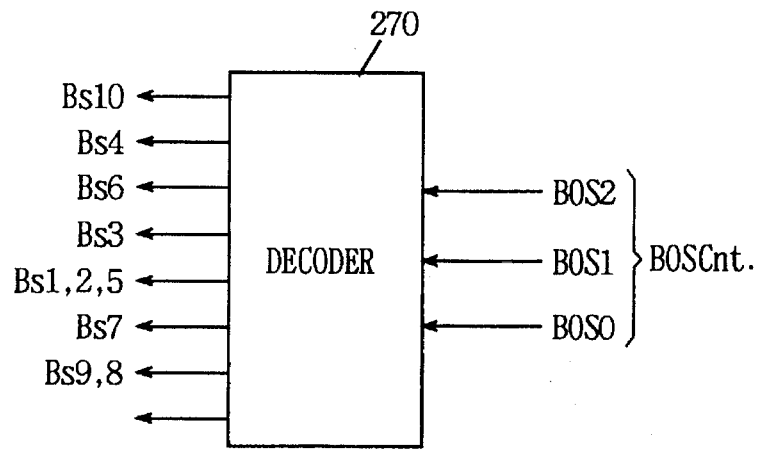
FIG. 43 illustrates an exemplary structure for generating a selector control signal shown in FIG. 42 and correspondence between external control signals and the selector control signal.

While the control signals BS1 to BS10 are supplied from the control unit 20, the number of signal lines for notifying the control signals from the control unit 20 to the arithmetic units is preferably minimized in consideration of the area occupied by the wires or interconnection lines. As shown in FIG. 43, therefore, a decoder 270 is provided in the status flag set circuit 212 for decoding a multi-bit signal BOSCnt notified from the control unit 20. Referring to FIG. 43, the control signal BOSCnt include 3-bit control bits BOS0 to BOS2, and the decoder 270 generates respective control signals in accordance with the control bits BOS0 to BOS2. FIG. 43 also shows flags updated in accordance with the respective states of the control bits BOS0 to BOS2. When all control bits BOS0 to BOS2 are zero, the decoder 270 executes no decoding operation. Therefore, seven states are implemented as combinations of the control bits. Correspondence between the control bits BOS0 to BOS2 and the status flags as updated is arbitrary and other combinations may be employed.

In the structure shown in FIG. 43, the flags AS, FA and J are updated when the control signals BOS0 to BOS2 are "110". In this case, the control signals BS1 and BS5 are generated to update these flags. The flag AS corresponds to T-S, and the flag FA corresponds to A-A(t-1)-1. When the decoder 270 shown in FIG. 43 is employed, therefore, the selectors 251 and 252 are supplied with output signals of different comparators. This structure is readily implemented when two separate comparators are employed. The bit number of the control signals BOSCnt may be increased when a single comparator is employed.

As shown in FIG. 43, it is possible to reduce the number of the signal lines for notifying the control signals updating the status flags from the control unit 20 to the arithmetic units by decoding the control signals BOSCnt supplied from the control unit 20 by the decoder 270 and generating the control signals for updating the status flags, thereby reducing the area occupied by the wires.

[Addition-Subtraction/Comparison Composite Circuit

Figure 44:
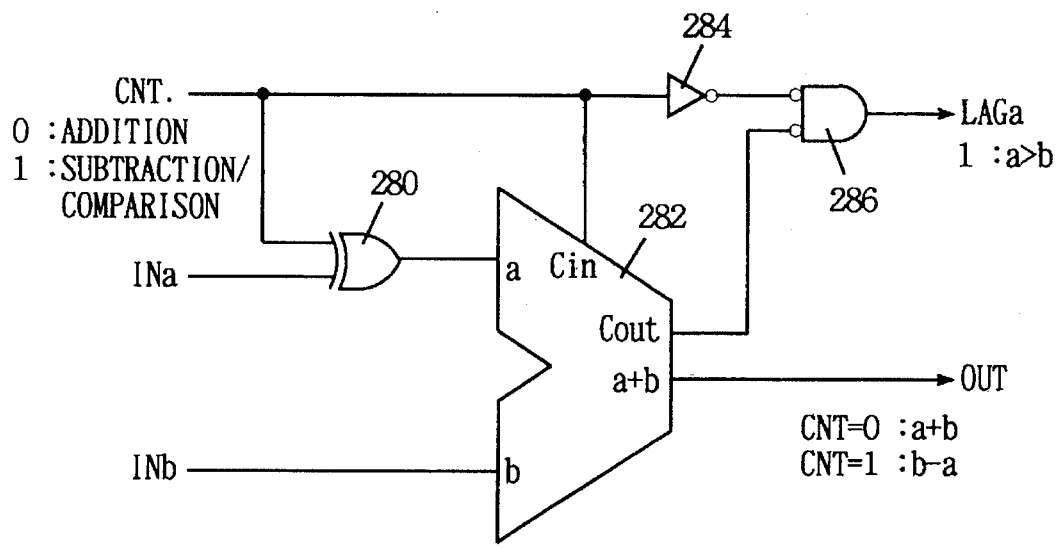
FIG. 44 illustrates modifications of an adder and a comparator shown in FIG. 33.

FIG. 44 shows a structure of an addition-subtraction/comparison composite circuit. The composite circuit shown in FIG. 44 implements the functions of the adder 204 and the comparator 206 shown in FIG. 33. Referring to FIG. 44, the composite circuit includes an EXOR circuit 280 receiving a control signal CNT and input data INa, a computing element 282 receiving output data of the EXOR circuit 280 in its first input $\underline{a}$ while receiving input data INb in its second input $\underline{b}$, an inverter circuit 284 for inverting the control signal CNT, and a NOR circuit 286 receiving an output signal of the inverter circuit 284 and an output signal (sign bit) Cout of the computing element 282. The computing element 282 generates output data OUT indicating the result of an operation performed on the data supplied to the inputs $\underline{a}$ and $\underline{b}$.

When the control signal CNT is "0", the EXOR circuit 280 functions as a buffer circuit. Therefore, the EXOR circuit 280 passes the input data INa without inverting the same. The computing element 282 adds up the data supplied at the inputs $\underline{a}$ and $\underline{b}$ in accordance with the control signal CNT supplied at its control input Cin. Therefore, the result of addition of the data supplied to the inputs $\underline{a}$ and $\underline{b}$ is outputted as the output data OUT. Namely, OUT=a+b. When the control signal CNT is "0", the inverter circuit 284 outputs "1" and an output signal LAGa of the NOR circuit 286 is "0". Since it is not necessary to carry out comparison, this output signal LAGa is neglected.

When the control signal CNT is "1", on the other hand, the EXOR circuit 280 functions as an inverter circuit, to invert the input data INa. The computing element 282 carries out addition in accordance with the control signal CNT. Therefore, the output signal OUT of the computing element 282 is b-a. The current sign bit Cout is supplied to the NOR circuit 286. The inverter circuit 284 outputs "0", and the NOR circuit 286 functions as an inverter. The sign bit Cout outputted from the computing element 282 becomes "0" when the output OUT is b-a<0, while it becomes "1" when b-a≧0. Therefore, the output signal LAGa of the NOR circuit 286 becomes "1" when a>b.

When the EXOR circuit 280 is made to function as an inverter circuit to carry out an arithmetic operation in the computing element 282 and numeric data of two's complement notation is employed, the computing element 282 adds "1" to the numerical value supplied to the input $\underline{a}$ in accordance with the control signal CNT. In the case of the numeric data of two's complement notation, the sign bit Cout becomes "1" when b-a<0. In this case, a structure of generating the comparison result signal LAGa through an AND circuit receiving the control signal CNT and the sign bit Cout may be employed.

It is possible to selectively implement three functions of an adder, a comparator and a subtracter through a single computing element by employing the composite circuit shown in FIG. 44, thereby reducing the circuit scale.

[Modification of Write Control System]

Figure 45:
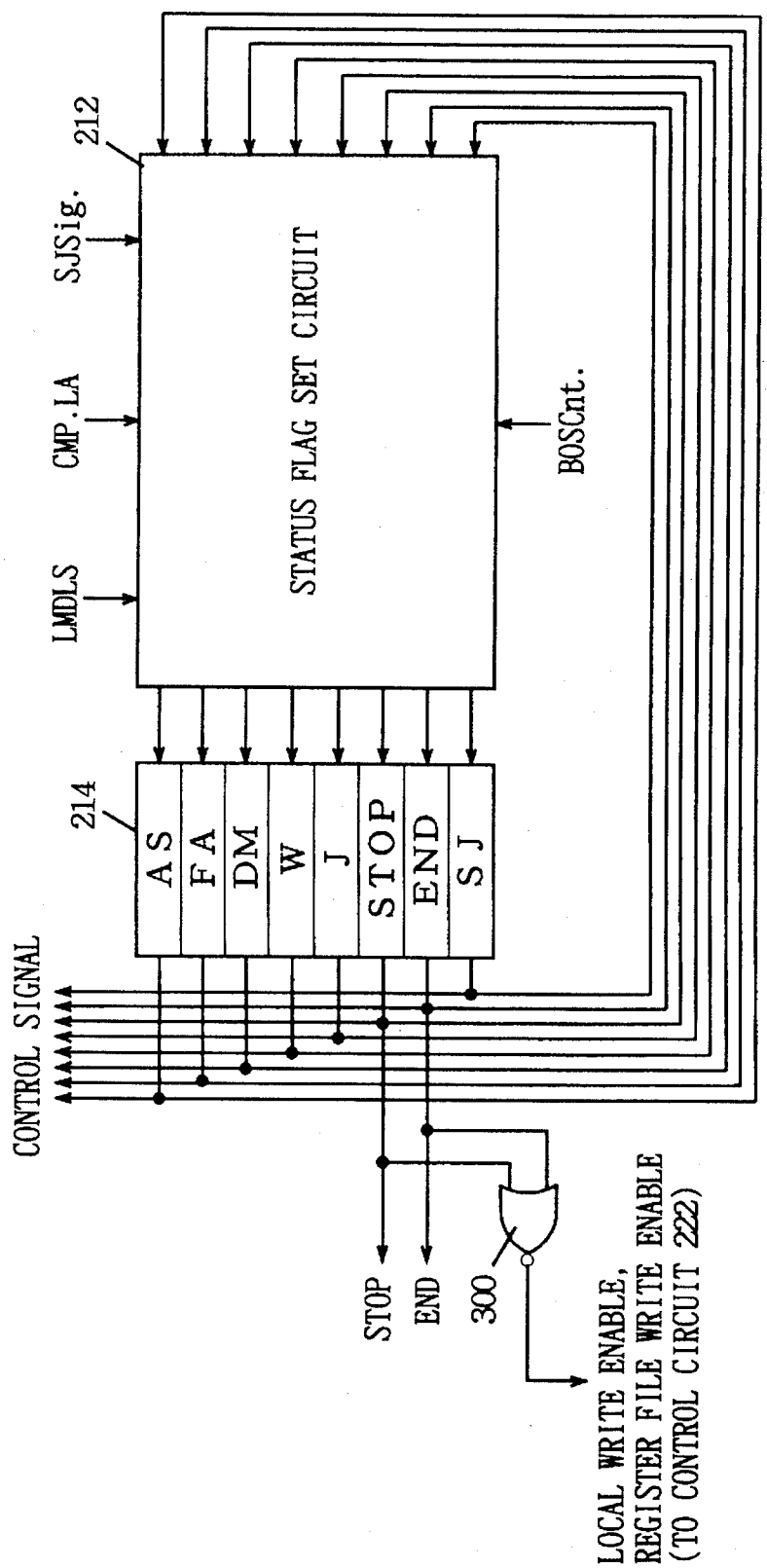
FIG. 45 illustrates a first modification of the state expressing circuit shown in FIG. 33.

FIG. 45 illustrates a modification of the numeric data write control system in the arithmetic unit. Referring to FIG. 45, this write control circuitry includes a NOR circuit 300 receiving the flags STOP and END outputted from the flag register 214. The NOR circuit 300 generates a local memory write enable signal for allowing data writing in the local memory 11 and a register file write enable signal for allowing writing of numeric data in the register file 220. The enable signals generated from the NOR circuit 300 are supplied to the control circuit 222 shown in FIG. 33. When the output signals of the NOR circuit 300 become "1", writing of numeric data in the local memory 11 and the register file 220 is enabled. The output signals of the NOR circuit 300 become "1" when both of the flags STOP and END are "0", i.e., when numerical arithmetic operations are executed in the arithmetic unit. When at least one of the flags STOP and END is "1", the numeric arithmetic operations must be interrupted (omitted) or entirely completed in this arithmetic unit, and writing of numeric data in the local memory 11 and the register file 220 is inhibited in this state. The structure of allowing/inhibiting writing of numeric data with the NOR circuit 300 provides the following advantages:

The aforementioned system of omitting arithmetic operations can also be applied to a single arithmetic unit. When it is possible to utilize a plurality of address values of $\underline{i}$ address in the local memory 11 provided in the arithmetic unit, a single arithmetic unit can express a plurality of neurons. However, the numerical arithmetic processing unit of the present invention includes a plurality of arithmetic units, in order to form a large-scale neural network and to improve efficiency in parallel processing. These arithmetic units operate in parallel with each other under control by the single control unit 20. The plurality of arithmetic units are supplied with control signals and instructions in common from the control unit 20, in accordance with the SIMD system.

In correction of synapse load values, the plurality of arithmetic units are supplied with the numeric data Sj and $\underline{j}$ ($\underline{j}$ addresses) in common. The arithmetic units omit or execute arithmetic operations with respect to the supplied numeric data Sj and $\underline{j}$. At this time, the control unit 20 supplies instructions and/or control signals for executing arithmetic operations to the plurality of arithmetic units in common. In arithmetic units which must omit arithmetic operations, therefore, unnecessary control signals may be generated (the flag update control signals BOSCnt are supplied to all arithmetic units in common), or numeric data stored in the local memories and the register files may be erroneously updated.

In the structure shown in FIG. 45, however, writing of numeric data from the NOR circuit 300 to the register file (220 shown in FIG. 33) and to the local memory 11 is inhibited when at least one of the flags STOP and END is "1". Therefore, operations are temporarily stopped in arithmetic units which are in processing interrupting or completion states regardless of various control signals or instructions supplied to all arithmetic units in common, and these arithmetic units maintain the standby states until a reset signal for the flag STOP or END is supplied.

When the arithmetic units which must omit arithmetic operations are brought into standby states as described above, it is possible to synchronize starting and termination of arithmetic operation cycles of all arithmetic units by utilizing this structure in combination with a structure described below, whereby addresses to be processed are synchronously changed in response to the j addresses supplied from the exterior (control unit 20) in all arithmetic units. Thus, it is possible to avoid mismatching between the addresses to be processed in the arithmetic units, thereby driving all arithmetic units in a parallel mode.

Figure 46:
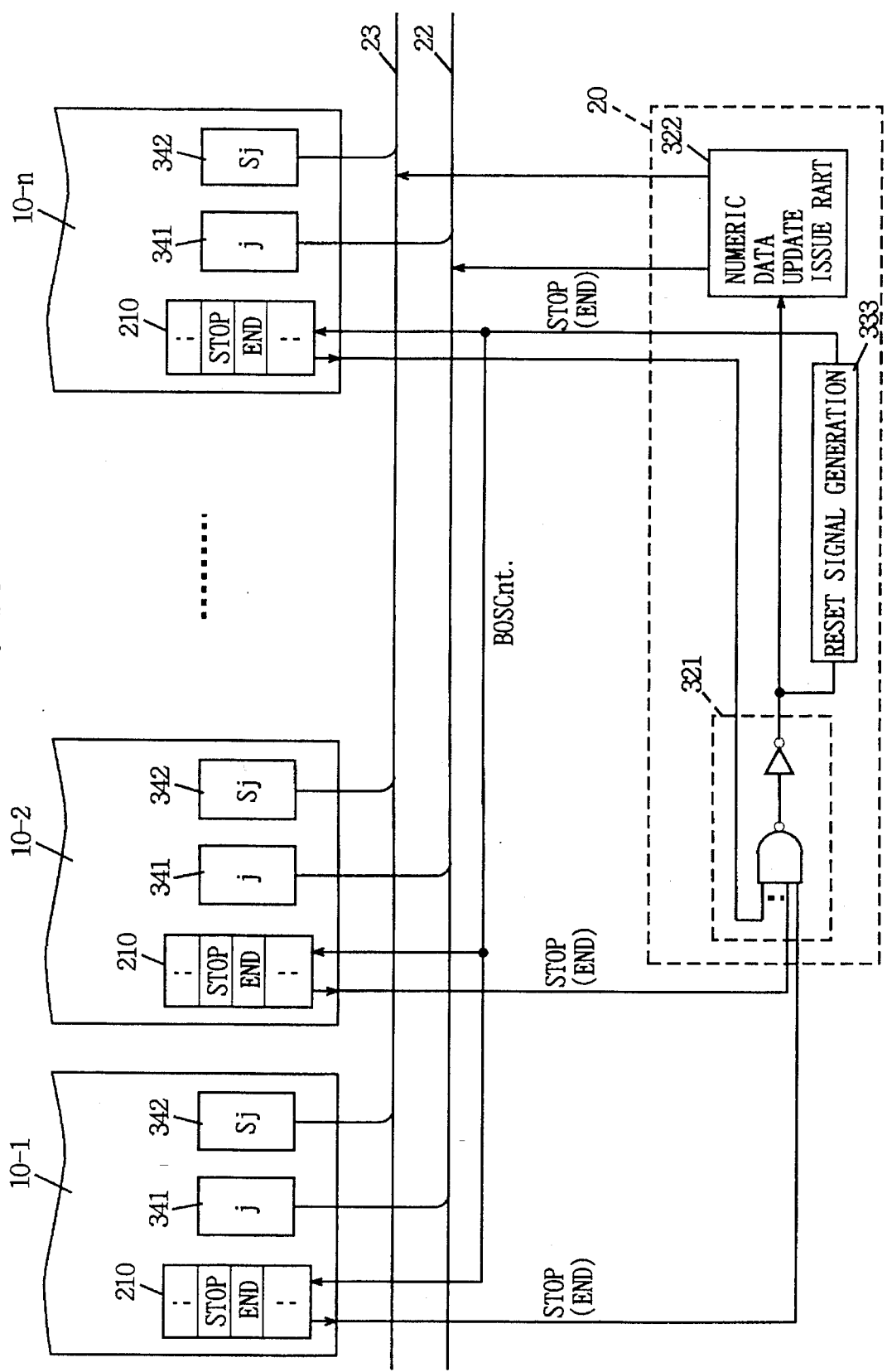
FIG. 46 schematically illustrates an overall structure of a numerical arithmetic processing unit employing the structure shown in FIG. 45.

FIG. 46 shows a structure for numeric data updating. Referring to FIG. 46, the control unit 20 includes an AND circuit 321 for obtaining the logical product of the flags STOP notified from all arithmetic units 10-1 to 10-n, a numeric data update issue part 322 for issuing onto the data broadcast bus 23 and the address broadcast bus 22 new numeric data Sj and j in response to (synchronously with) an output signal from the AND circuit 321, and a reset signal generation circuit 333 for generating control signals for resetting the flags STOP in response to the output signal of the AND circuit 322. Reset signal BOSCnt from the reset signal generation circuit 333 is supplied to the state expressing circuits 210 (more correctly, the status flag set circuits 212) of the arithmetic units 10-1 to 10-n in the form of 3 bits BOS2, BOS1 and BOS0="0, 0, 1", as shown in FIG. 43, for example, to reset the flag STOP at "0".

After (or simultaneously with) the numeric data update issue part 322 issues onto the broadcast buses 22 and 23 the new numeric data Sj and j, the reset signal generation circuit 333 generates the control signals BOSCnt for resetting the flags STOP. After the arithmetic units 10-1 to 10-n are supplied with the numeric data Sj and j and the flag STOP is reset, the numeric data Sj and j are stored in the internal registers of the arithmetic units 10-1 to 10-n to execute or omit arithmetic operations.

Each flag STOP becomes "1" when the jump target address T is greater than the absolute address S (=i+j). The flag STOP is "0" when a prescribed arithmetic operation is carried out in an arithmetic unit which executes the arithmetic operation without omission. When the value of ΔWij becomes less than a prescribed value in the process, jump target address data is stored in place of the synapse load correction amount ΔWij. The written jump target address is utilized in a next process cycle (the arithmetic operation is carried out in the current process cycle and difference resides in only whether address data or arithmetic processing result data is written in data writing) operation.

In the arithmetic unit executing the arithmetic operation, it is not necessary to execute subsequent processing in particular in the current cycle when address data is written in the local memory 11, as described later in detail with reference to a flow chart. Setting of new address data in the address pointer 200 and access to the local memory 11 in accordance with the new address data are executed. Address data (read address data) specifying the content of a subsequent arithmetic operation is stored in the state register 214 as the jump target address T when address data indicating the content of the subsequent arithmetic operation is read from the local memory 11. Further, the address is incremented by 1 when the arithmetic operation is terminated without omission. The incremented address is stored in the register as the jump target address T. When the jump target address T is updated, it is not necessary to execute the subsequent arithmetic operation in this cycle. Therefore, the flag STOP is updated by the control signal BOSCnt upon completion of a single arithmetic operation (after an instruction for writing the synapse load value data Wij or the synapse load correction data ΔWij in the local memory 11 is supplied, for example). In the arithmetic unit executing the arithmetic operation, the flag STOP becomes "1" after the necessary arithmetic operation is completed (AS>0 from AS=T–S, and the flag STOP of "0" becomes "1"). When the flags STOP of all arithmetic units 10-1 to 10-n become "1", therefore, the arithmetic units 10-1 to 10-n enter standby states to wait for next numeric data. Therefore, it is possible to synchronously drive all arithmetic units 10-1 to 10-n by supplying the numeric data Sj and j to the arithmetic units 10-1 to 10-n in accordance with the output signal of the AND circuit 321, while all addresses (absolute address i+j and the i addresses) in the arithmetic units 10-1 to 10-n progress in the same states.

Further, it is possible to equalize all operation start timings for the arithmetic units 10-1 to 10-n with each other by simultaneously supplying signals for resetting the flag STOP from the reset signal generation circuit 333 to the arithmetic units 10-1 to 10-n, thereby synchronously driving all arithmetic units 10-1 to 10-n in parallel with each other.

When the flag END is employed in place of the flag STOP, it is possible to supply necessary numeric data to the arithmetic units 10-1 to 10-n after all arithmetic units 10-1 to 10-n complete necessary arithmetic operations.

When the aforementioned flags STOP and END are employed, it is possible to correctly notify all arithmetic units 10-1 to 10-n of not numeric data but numeric data such as constant data, for example, to be supplied to the arithmetic units 10-1 to 10-n in common.

[Specific Structure of Numeric Data Update Executing Part]

Figure 47:
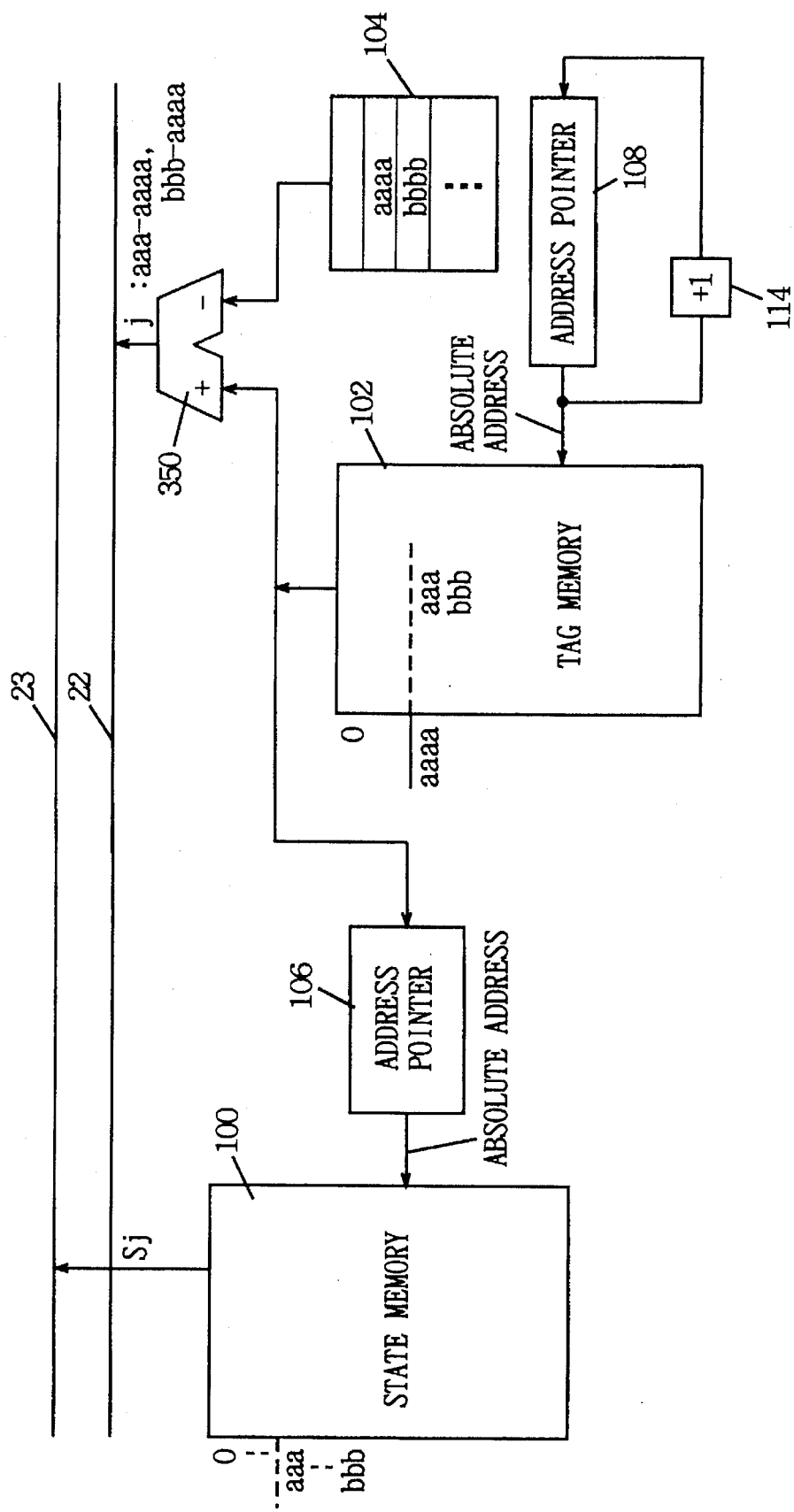
FIG. 47 illustrates a state of a numeric data generation part of a control unit which is employed in common with the arrangement shown in FIG. 31.

No technique of converting addresses read from the tag memory 102 to the j addresses for identifying the neurons in the respective layers of the neural network is clearly shown in the structure shown in FIG. 26. Valid output state values are successively read from the state memory 100 through the address pointer 106 in accordance with the addresses stored in the tag memory 102. Therefore, the address pointer 106 specifies absolute addresses in the state memory 106. Namely, the tag memory 102 stores the absolute addresses showing the positions of the state memory 100 storing the valid output state values. The register file 104 stores first address of each respective layer of the neural network in the tag memory 102. This address correspondence between the state memory 100 and the tag memory 102 is only in the interior of the control unit 20. It is conceivable that no correspondence is present with respect to the addresses of the local memories 11 in the arithmetic units. A possibility for presence of the address correspondence is reduced particularly when effective error data are stored in the local memories 11. As shown in FIG. 47, therefore, i addresses are generated by a subtracter 350 carrying out subtraction between the addresses read from the tag memory 100 and start addresses for the respective neural network layers stored in the register file 104. Thus, the subtracter 350 correctly generates a j address indicating a neuron supplying its output state value in a certain layer of the neural network. Thus, the arithmetic units 10-1 to 10-n can correctly read corresponding numeric data in the local memories 11 thereof regardless of storage addresses of the output load values Sj stored in the state memory 100 and the tag memory 102.

Also in the structure shown in FIG. 47, it is possible to access the tag memory 102 and the state memory 100 and generate the numeric data Sj and j in a pipeline mode by providing latch registers in proper positions for transferring numeric data between the registers in synchronization with clock signals.

[Exemplary Synapse Load Correction Flow]

Figure 48:
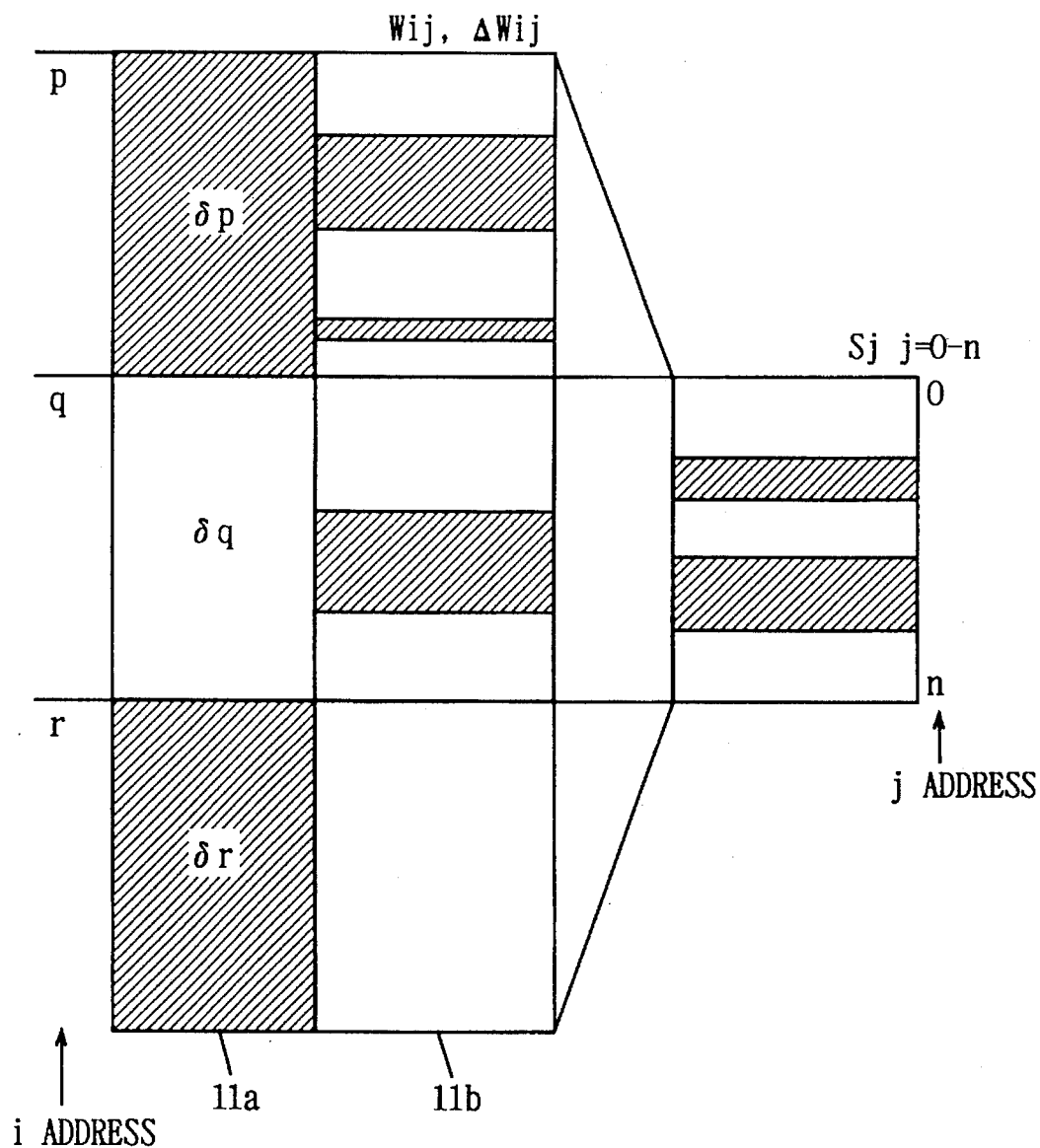
FIG. 48 illustrates exemplary correspondence between numeric data stored in a local memory in synapse load correction and externally supplied numeric data.

FIG. 48 shows exemplary storage states of effective error data δ, synapse loads Wij and synapse load correction data ΔWij in the local memory in a single arithmetic unit. Referring to FIG. 48, a local memory 11a stores effective errors δp, δq and δr of neurons p, q and r (refer to FIG. 29 as to the storage mode for the effective error data). A local memory 11b stores synapse load data Wij and synapse load correction data ΔWij for the neurons p, q and r respectively. Only three addresses (three entries) are required for storing the effective errors δp, δq and δr. Referring to FIG. 48, an effective error storage region is shown in an enlarged manner, to clarify correspondence between the effective errors and the synapse load values Wij and the synapse load correction values ΔWij stored in the local memory 11b.

Output state values Sj (j=0 to n) of coupling destination neurons are supplied from the exterior for the neurons p, q and r respectively, to correct the synapse loads. When arithmetic operations can be omitted in regions shown by slant lines in FIG. 48, arithmetic operations utilizing numeric data stored in these regions are omitted. For example, an arithmetic operation of η·δp·Sj utilizing the effective error data δp can be omitted. Thus, synapse load correction data ΔWpj is supplied by α·ΔWpj(t−1), whereby the synapse load correction value can be calculated at a high speed. When an arithmetic operation of ΔWpj(t−1) is omissible, it is possible to completely omit the arithmetic operation of the synapse load correction value ΔWpj. Similarly, an arithmetic operation of Wpj=Wpj(t−1) can also be omitted.

Figure 49:
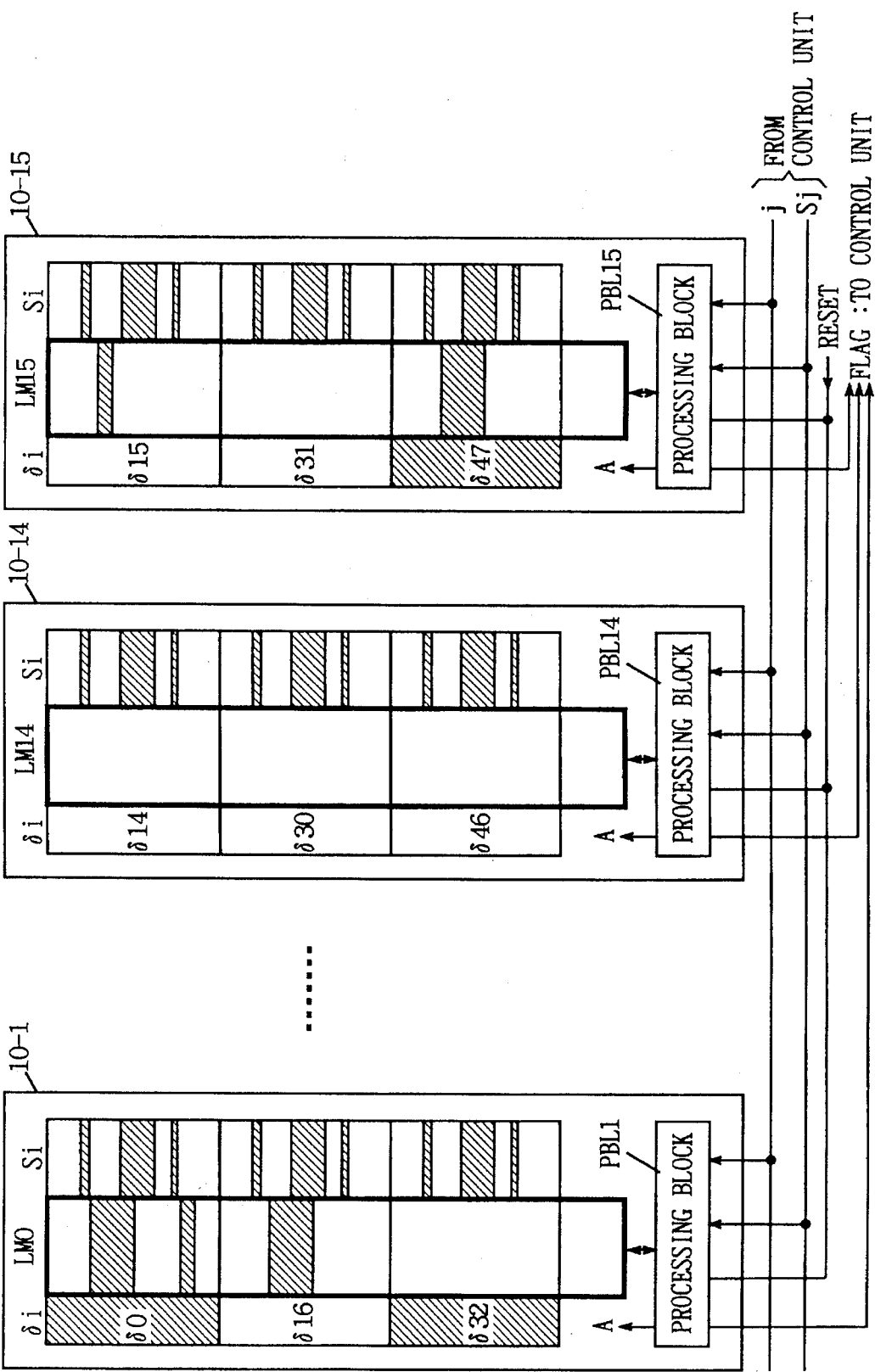
FIG. 49 is a diagram for illustrating an operation of the numerical arithmetic processing unit according to the present invention in synapse load correction.

FIG. 49 shows exemplary states of storage of effective error data, synapse load data and synapse load correction amount data in respective arithmetic units in synapse load correction processing. FIG. 49 illustrates arithmetic units 10-1 to 10-15, for example. FIG. 49 also shows states of output state values Sj supplied from the exterior (control unit 20). The output state value data Sj are not stored in local memories LM. Effective error data δi may be stored in prescribed regions of the local memories LM, or in specific registers of register files with corresponding i addresses. The arithmetic units 10-1 to 10-15 are supplied with numeric data Sj and j from the control unit 20 in common. Processing blocks PBL1 to PBL15 provided in the respective arithmetic units 10-1 to 10-15 execute necessary operations. The processing blocks PBL1 to PBL15 also supply the flags STOP and END to the control unit 20. These flags are reset by control signals from the control unit 20.

Figure 50:
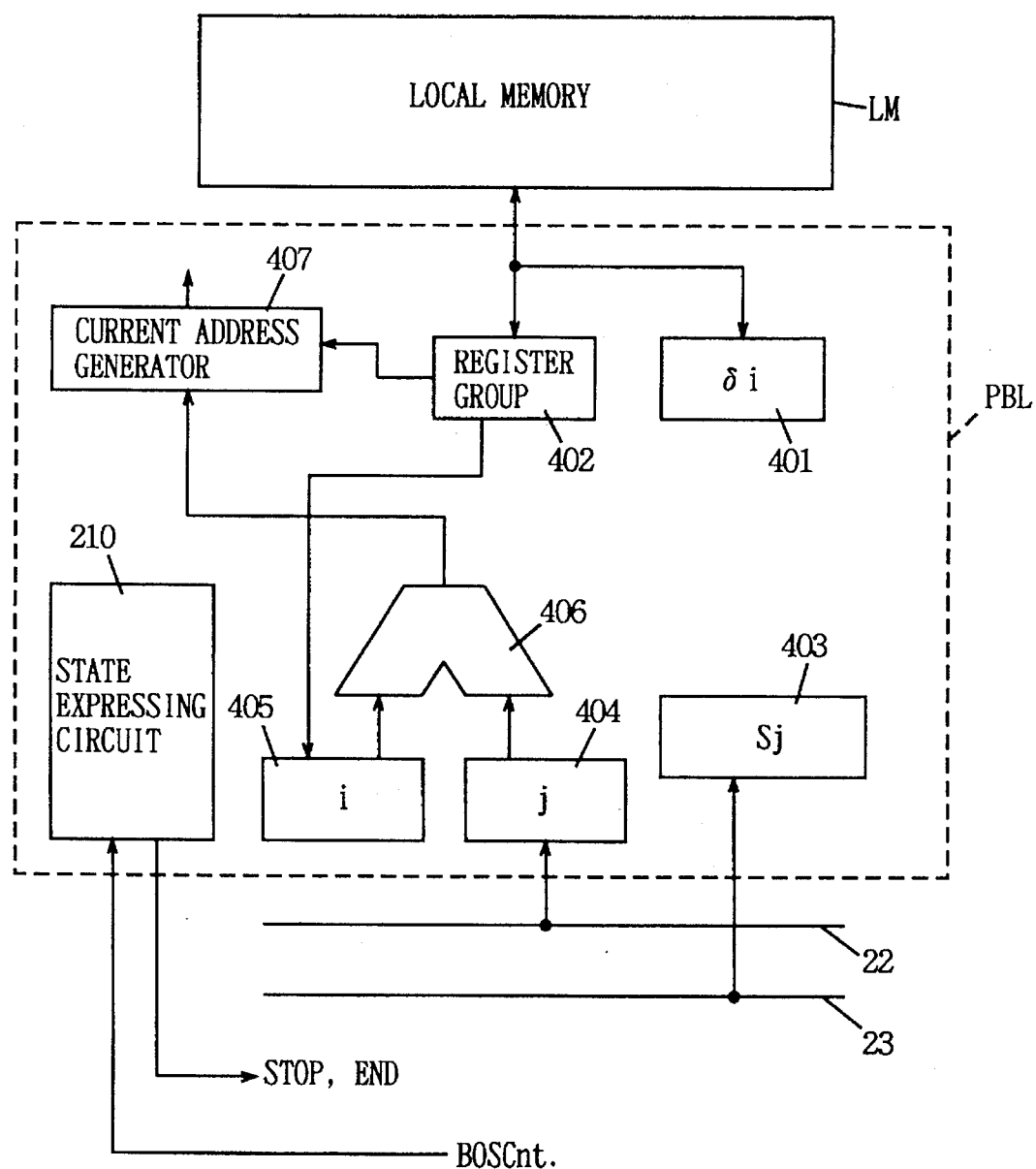
FIG. 50 illustrates a structure of a processing block shown in FIG. 49.

FIG. 50 shows a specific structure of each processing block PBL shown in FIG. 49. Referring to FIG. 50, the processing block PBL includes a register 401 temporarily storing the effective error data δi, a register group 402 for temporarily storing data read out from the local memory LM, a register 405 for latching i addresses stored in the register group 402, registers 404 and 403 for latching numeric data j and Sj supplied through the broadcast buses 22 and 23 respectively, an adder 406 for adding numeric data j and i stored in the registers 404 and 405, a current address generator 407 for generating an absolute address (current address A) for the local memory LM in accordance with an arithmetic result output of the adder 406 and status flags stored in the register group 402, and a state expressing circuit 210 expressing the state of progress of arithmetic operations in the corresponding arithmetic unit. The register group 402 includes the aforementioned various registers required for the operations, and stores a register for temporarily storing process data, the jump target address T, the absolute address S, the current address A, the precedent address A+1, the limit address ADDR, the threshold value εΔW, and εδ data. Am exemplary flow of a synapse load correcting operation is now described with reference to a flow chart shown in FIG. 51.

First, learning parameters η and α are set in the arithmetic units 10-1 to 10-14 respectively. The constant data η and α are set by bringing the arithmetic units 10-1 to 10-14 into reset states (resetting of the flags STOP and END) as described above and supplying the learning parameters η and α to the arithmetic units 10-1 to 10-14 through the data broadcast bus 23 for writing in prescribed registers by instructions from the instruction broadcast bus 21 (see FIG. 1). Further, initial values are set in the address pointers for setting initial addresses of the local memories LM. These initial values of the address pointers are also set in a similar manner, and threshold values ε(ΔW) and εδ are set in the arithmetic units 10-1 to 10-14 respectively under control by the control unit 20. These parameters ε, α, ε(ΔW) and εδ and the initial values of the address pointers may be set in arbitrary order. Thus, initialization of the arithmetic units 10-1 to 10-14 is completed (step STP1).

The arithmetic units 10-1 to 10-14 (hereinafter referred to as PU) set the i addresses stored in the registers at initial values (step STP2).

Due to the setting of the i address at the initial value, address data storing numeric data to be subjected to arithmetic operations are then read from the local memories LM, as shown in FIG. 49. Jump target addresses are specified in accordance with the read i address and the effective error data δi are read from the local memories LM, and stored in the registers 401 shown in FIG. 50. In storage of the effective error data δi in the registers 401, effective error data related to arithmetic operations to be omitted are skipped (effective error data δ0 is skipped in FIG. 49, for example) (step STP3).

Then, the control unit 20 (hereinafter referred to as CU) transmits the numeric data Sj and j to the data broadcast bus 23 (DB) and the address broadcast bus 22 (AB) respectively. Also in notification of the numeric data from the control unit CU to the respective arithmetic units 10-1 to 10-15, numeric data for arithmetic operations to be omitted are skipped. When each arithmetic unit PU is notified of the numeric data Sj and j from the control unit CU, the arithmetic unit PU latches the supplied numeric data Sj and j while the adder 406 calculates i+j to obtain an address S, which in turn is stored in the register group 402 (this path is not shown) and supplied in the current address generation circuit 407 shown in FIG. 50. The current address generator 407 generates the current address A in accordance with the address S and a flag AS stored in the register group 402 (step STP4).

An arithmetic unit PU having the flag STOP of "0" first performs an arithmetic operation of δi·Sj·η and stores the arithmetic result in a specific register as a parameter a. Then, the synapse load correction data ΔWij is read from the local memory LM in accordance with the current address A. An arithmetic operation of $\alpha \cdot \Delta Wij + a$ is carried out from the read synapse load correction data $\Delta Wij$ and the precedently calculated parameter $\underline{a}$, and the result of this calculation is stored in a specific register as a parameter $\Delta Wij+$. When the calculated new synapse load correction data $\Delta Wij+$ is in excess of the prescribed threshold value $\epsilon(\Delta W)$, the calculated synapse load correction data $\Delta Wij+$ is written in a current address position of the local memory LM. When the calculated synapse load correction data $\Delta Wij+$ is less than the threshold value $\epsilon(\Delta W)$, on the other hand, address data is written in the local memory LM at the position of the current address A in accordance with the technique described above with reference to FIGS. 31 and 37 to 41, or writing thereof is retarded. When address data is read from the local memory LM in place of the synapse load correction data $\Delta Wij$, the arithmetic operation is terminated at this point of time and the jump target address T is updated for waiting for next supply of new numeric data Sj and $\underline{j}$.

Then, the synapse load data Wij is read from the local memory LM so that an operation of $Wij + \Delta Wij+$ is carried out with the previously calculated synapse load correction data $\Delta Wij+$, whereby a new synapse load value $Wij+$ is generated and written in the current address position of the local memory LM. The series of operations shown in FIG. 31 are executed in the operation for correcting the synapse load Wij. A step STP5 is terminated by the above processing.

When any process is terminated, the control unit CU identifies whether the necessary arithmetic operations are completed in all arithmetic units PU by the flags STOP supplied from the state expressing circuits 210 of the arithmetic units PU (step STP6). When all flags STOP from all arithmetic units PU are not "1", at least one arithmetic unit PU is in execution of an arithmetic operation and hence the control unit CU waits until the flag STOP from this arithmetic unit PU becomes "1" (step STP6).

When all flags STOP from the arithmetic units PU become "1", the control unit CU decides whether a generated address $\underline{j}$ is a final address end j (step STP7). If $\underline{j}$ <end j, the control unit CU reads and broadcasts numeric data Sj and $\underline{j}$ to be subsequently, arithmetically operated to the arithmetic units PU again (return to the step STP4). The reset technique described above with reference to FIGS. 46 and 47 is employed when the process returns from the step STP7 to the step STP4. Each arithmetic unit PU executes arithmetic operations in accordance with the newly supplied numeric data Sj and $\underline{j}$. Also at the step STP5, arithmetic operations are omitted when the synapse load correction value $\Delta Wij$ can be omitted, and the arithmetic unit PU stops its processing until PU is notified of corresponding numeric data Sj and $\underline{j}$ by the control unit CU (flag STOP="1").

When a determination is made on j= end j at the step STP7, it is determined that an operation of correcting the synapse load of a single neuron is terminated in each arithmetic unit PU, and the control unit CU sets the $\underline{j}$ addresses at initial values (step STP8). Then, the control unit CU identifies whether or not every arithmetic units PU completes necessary operations by observing the flags ENDs. In other words, the control unit CU identifies whether or not the $\underline{i}$ address reaches the prescribed limit address ADR in all arithmetic units PU, and sets the flags ENDs at "1" or "0" in accordance with the result of the identification. When the $\underline{i}$ address does not reach end i (=ADDR) in all arithmetic units PU, the process returns to the step STP3 again so that effective error data $\delta i$ corresponding to neurons to be subsequently subjected to arithmetic operations are read and the series of processing steps STP4 to STP8 are executed.

When a determination is made that all arithmetic units PU complete necessary operations at a step STP9, the control unit CPU determines that correction of synapse loads is completed as to a single layer, and a synapse load correcting operation as to a next layer should be performed.

Figure 51:
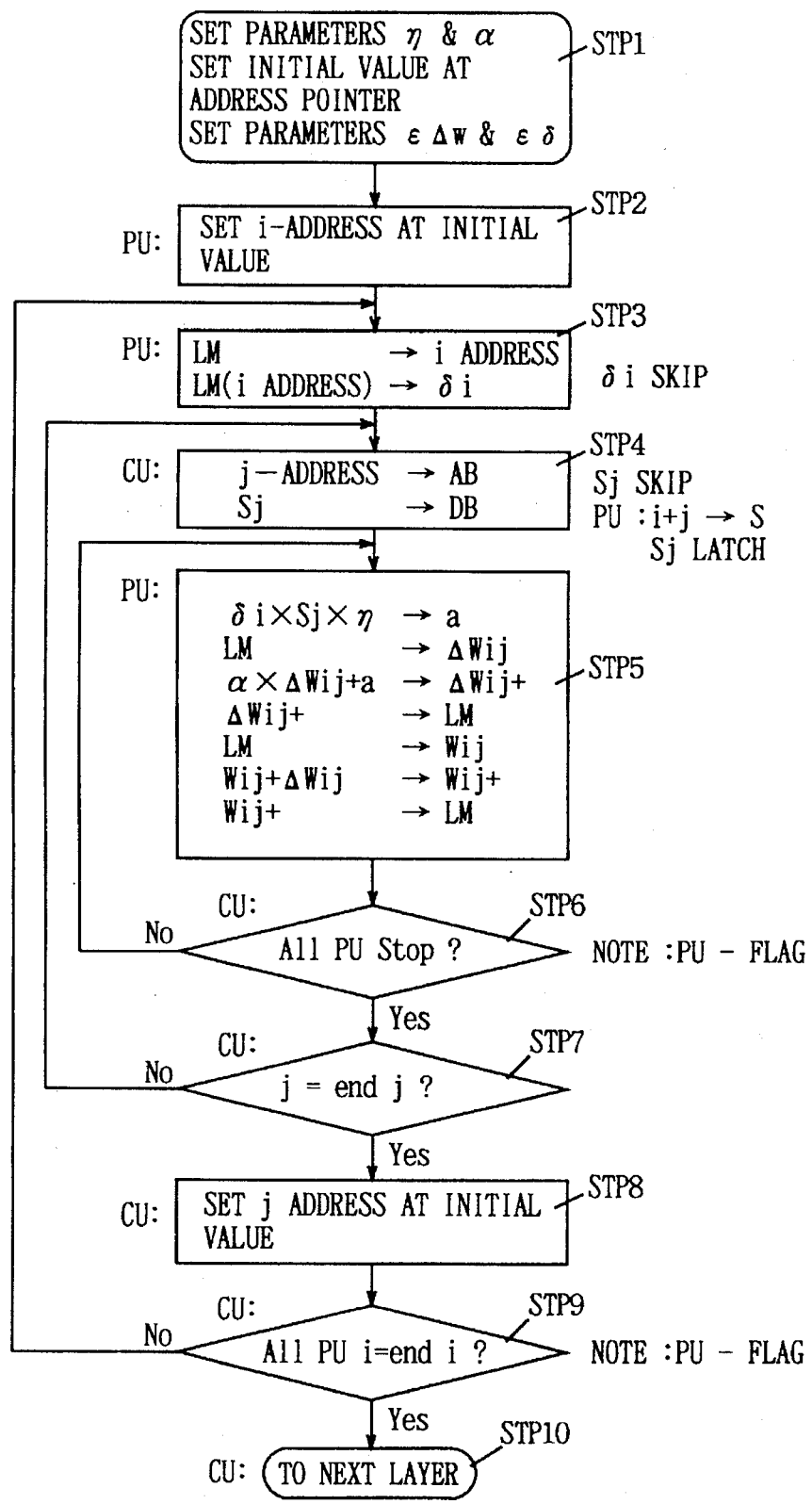
FIG. 51 is a flow chart showing a synapse load correcting operation according to the present invention.
Figure 52:
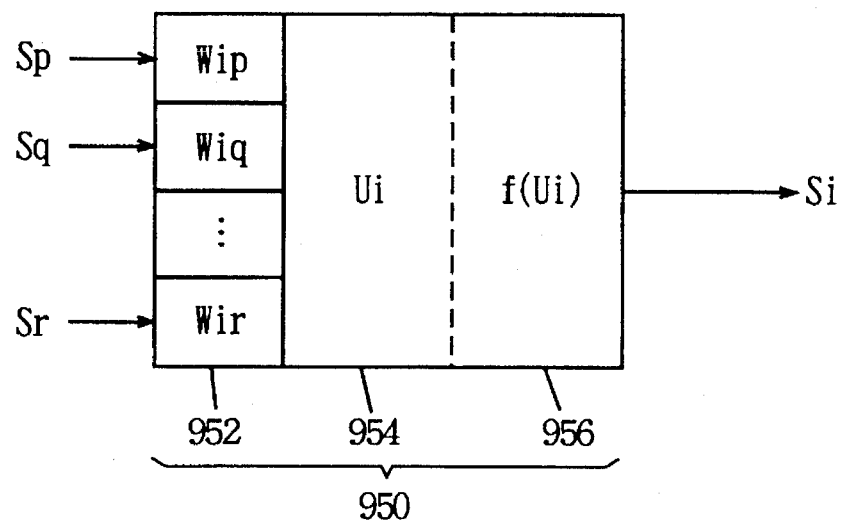
FIG. 52 schematically illustrates a generally employed mathematical model of a neuron.
Figure 53:
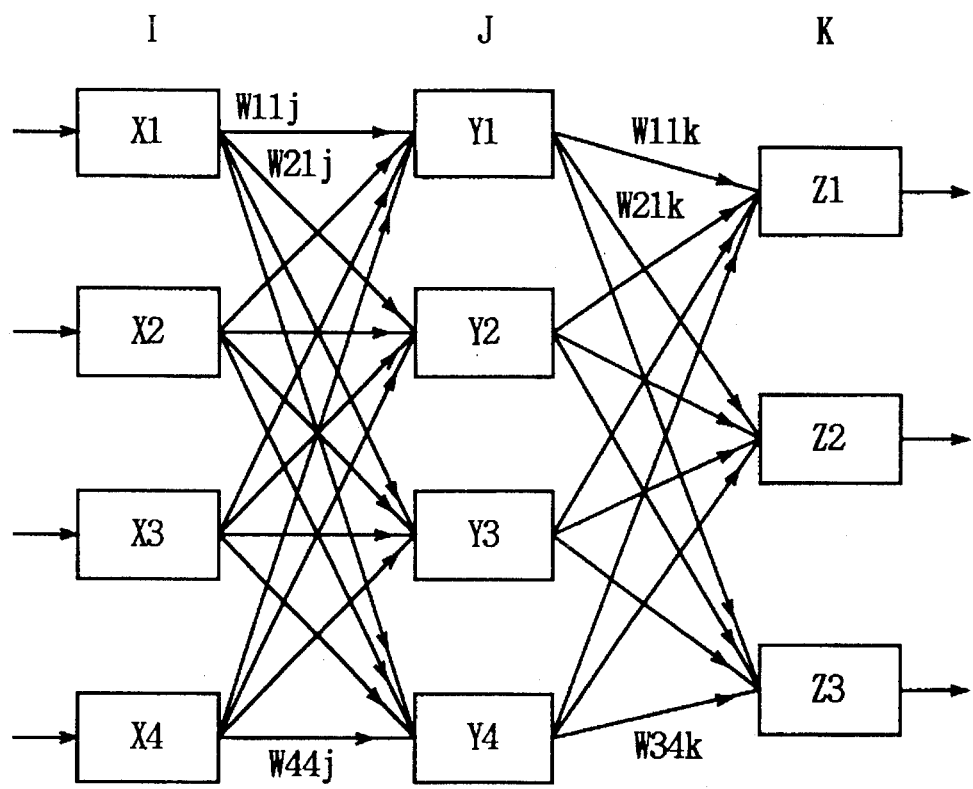
FIG. 53 illustrates an exemplary structure of a hierarchical neural network.
Figure 54:
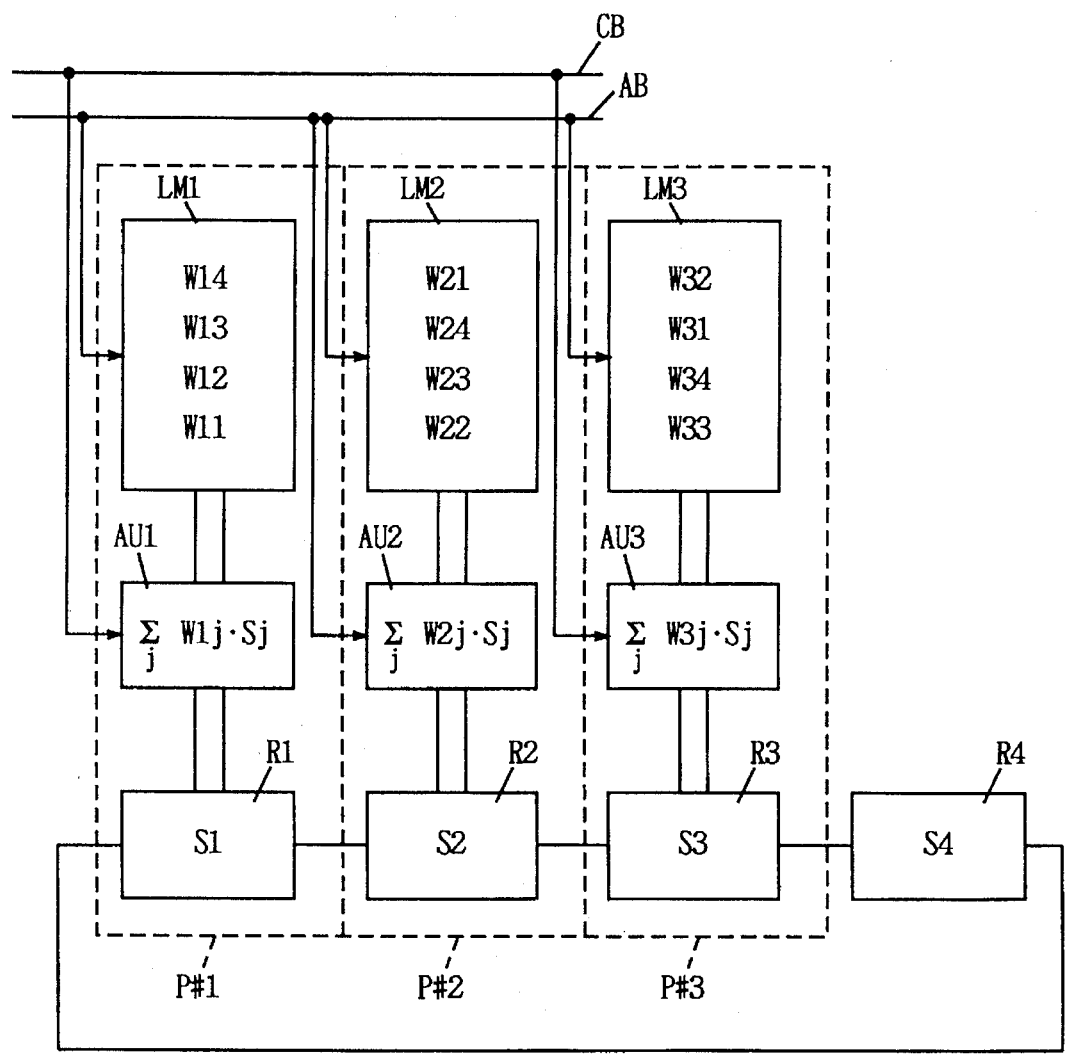
FIG. 54 illustrates an exemplary structure of a conventional numerical arithmetic processing unit.
Figure 55:
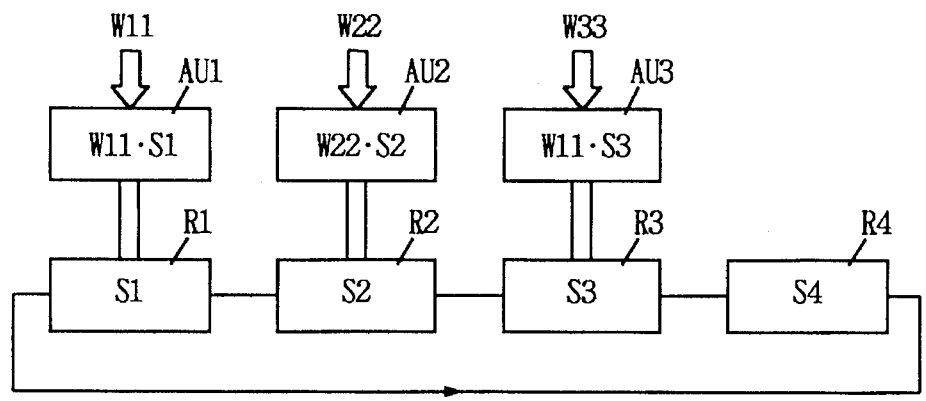
FIG. 55 is a diagram for illustrating an operation of the conventional numerical arithmetic processing unit.
Figure 56:
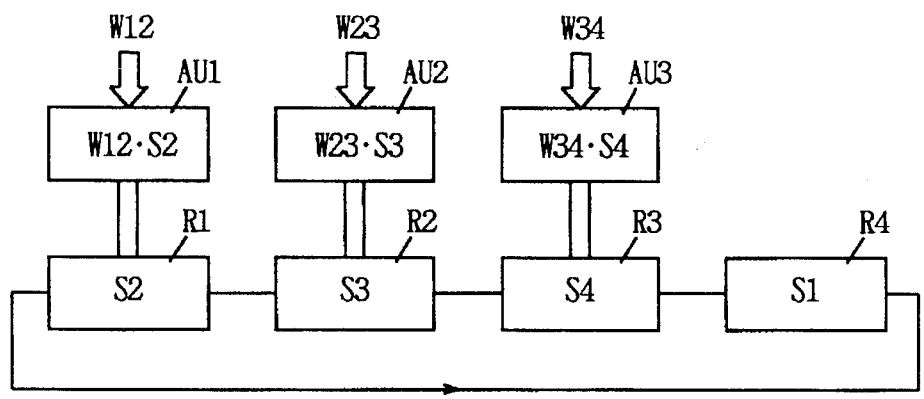
FIG. 56 is a diagram for illustrating an operation of the conventional numerical arithmetic processing unit.
Figure 57:
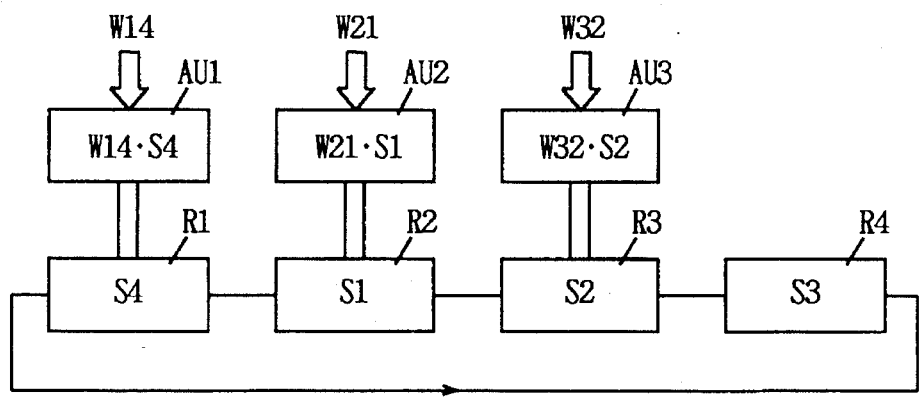
FIG. 57 is a diagram for illustrating an operation of the conventional numerical arithmetic processing unit.
Figure 58:
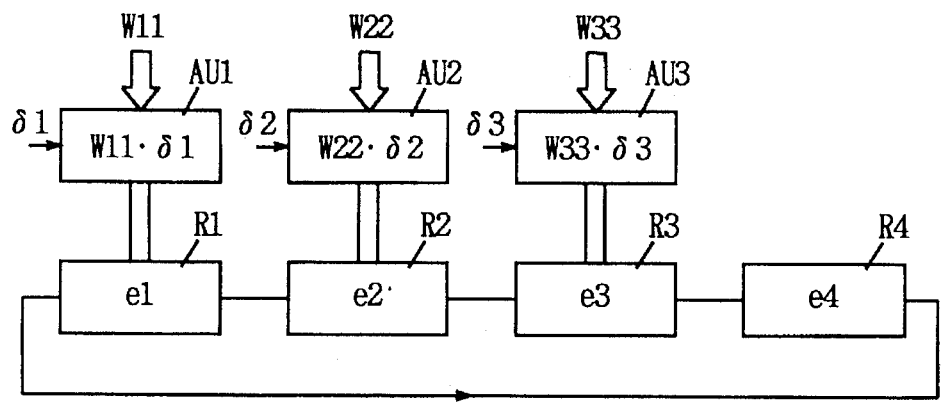
FIG. 58 is a diagram for illustrating an operation of the conventional numerical arithmetic processing unit.
Figure 59:
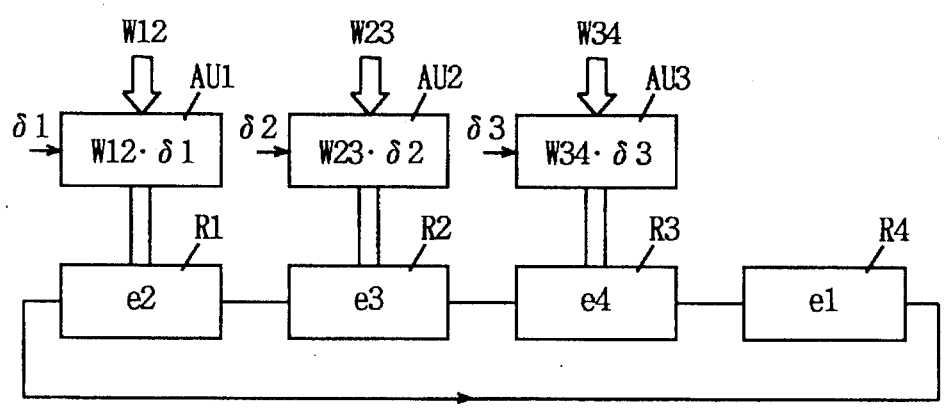
FIG. 59 is a diagram for illustrating an operation of the conventional numerical arithmetic processing unit.
Figure 60:
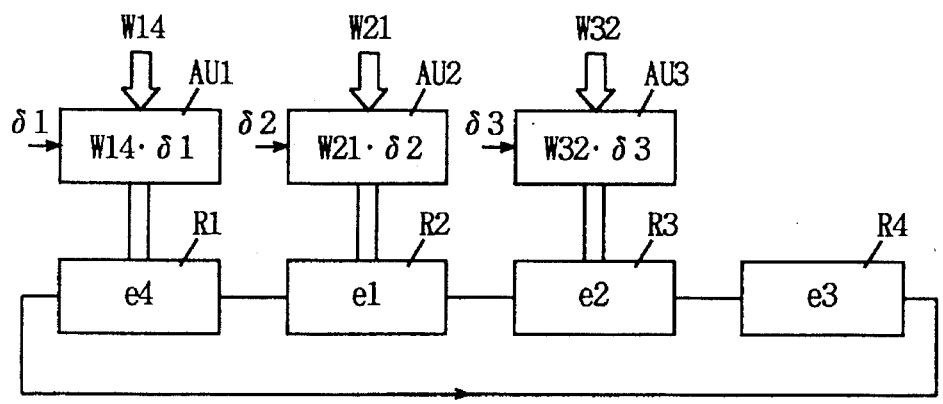
FIG. 60 is a diagram for illustrating an operation of the conventional numerical arithmetic processing unit.
Figure 61:
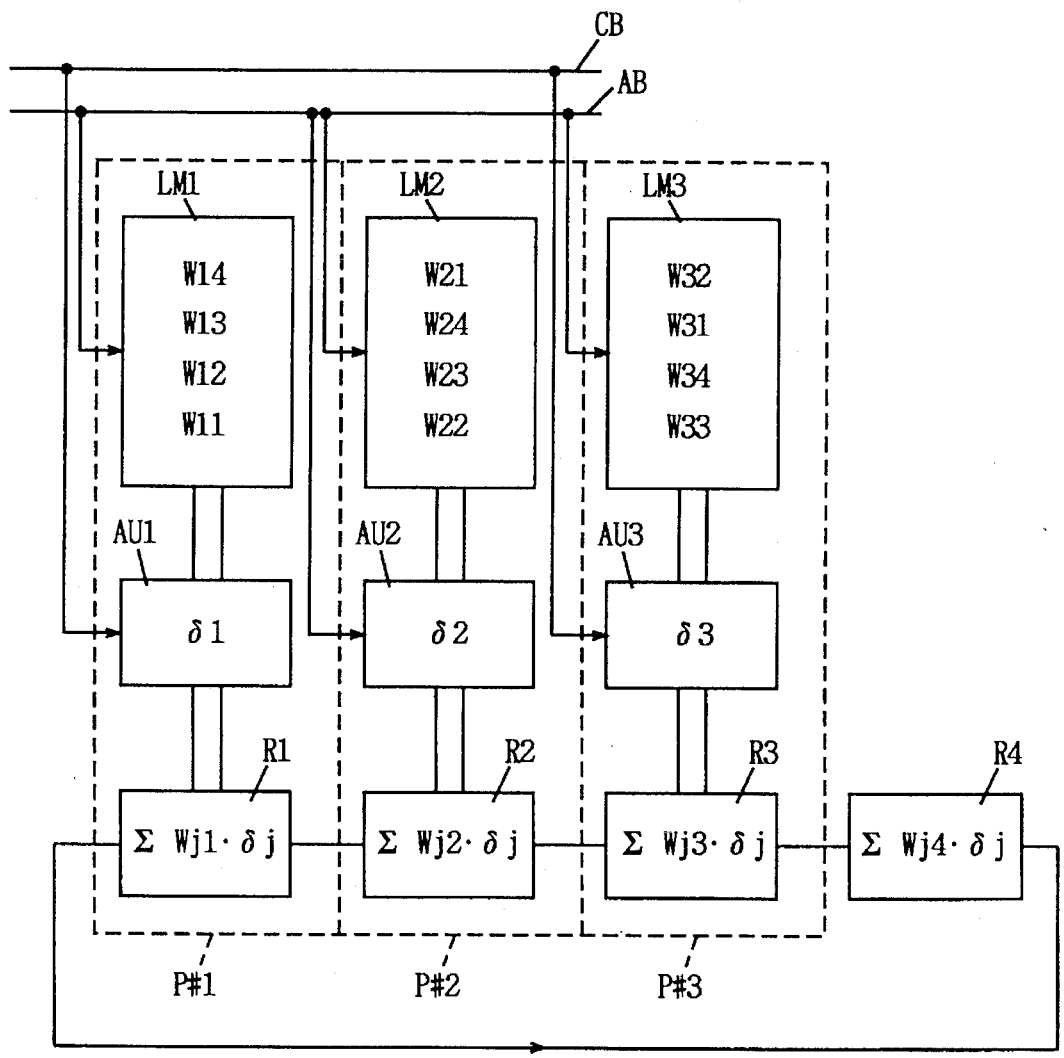
FIG. 61 illustrates a state of numeric data stored in the conventional numeric arithmetic processing unit upon completion of the operation shown in FIG. 60.

The synapse load correcting operation flow shown in FIG. 51 is a mere example, and the arithmetic units PU may be successively supplied with the numeric data Sj and $\underline{j}$ similarly to the membrane potential calculating operation, so that synapse load correction is executed in the respective arithmetic units PU. In this case, necessary numeric data Sj and $\underline{j}$ are successively shifted through the annular channels when all flags STOP of the arithmetic units PU become "1". The determination at the step STP7 is made when all numeric data Sj and $\underline{j}$ stored in the annular channels are processed, so that the annular channels receive new numeric data Sj and $\underline{j}$. The synapse load correction may be executed along such a processing flow. Alternatively, the synapse loads Wij may be corrected after all synapse load correction data $\Delta Wij$ are calculated (the third system of omitting operations can be applied as such).

While the structure, the operating principle and the specific operations of the numerical arithmetic processing unit of the present invention have been described, the numerical arithmetic processing unit of the present invention is also applicable to an interconnection type neural network in addition to a hierarchical neural network. Further, the application of the numerical arithmetic processing unit is not restricted to a neural network but the present invention is also applicable to a unit performing arithmetic operations in accordance with the SIMD system in general.

According to the present invention, as hereinabove described, it is possible to obtain a numerical arithmetic processing unit which can efficiently execute arithmetic operations at a high speed since the operations are carried out with omission of arithmetic operations which are omissible. Principal characteristics of the present invention are as follows:

(1) The content of the subsequent process is decided in accordance with numeric data read from the storage means, whereby it is possible to efficiently execute the operations while setting the optimum procedure with omission of arithmetic operations of unnecessary numeric data, for example.

(2) Numeric values and codes indicating the process contents are linked with each other and stored in the respective entries of the storage means, whereby it is possible to readily and correctly identify the attributes of the read out numeric data, for setting the procedure required for the numeric parts.

(3) The numeric code parts indicate whether related numeric parts are numeric data to be arithmetically operated or data defining the process to be subsequently executed, whereby it is possible to readily and correctly identify the content of the arithmetic operation to be subsequently carried out by recognizing the numeric code parts.

(4) The set circuitry decides the contents of the arithmetic operations to be subsequently executed in accordance with the numeric values of the numeric code parts, whereby there is no need to recognize all notification of the numeric data but it is possible to simplify the structure for setting the operational process.

(5) The numeric code parts indicate whether related numeric value parts are data to be arithmetically operated or address data indicating storage positions of numeric data to be subsequently accessed in the storage means, whereby it is possible to carry out the operations while jumping unnecessary numeric data in the storage means in accordance with the numeric codes, thereby reducing the processing time.

(6) The set circuitry sets the values of addresses with respect to the storage in accordance with the numeric codes, whereby it is possible to carry out the arithmetic operations by reading only numeric data to be subjected to prescribed arithmetic operations from the storage means, thereby reducing the processing time.

(7) The set circuitry adjusts numerical values to be added in accordance with the numerical values of the numeric code parts, whereby it is possible to reliably prevent unnecessary change of the numeric data.

(8) The set circuitry decides the process to be subsequently carried out in accordance with only the numeric values of numeric data read from the second address position among those read from the first and second address positions of the storage, whereby it is possible to readily change the content of two-input arithmetic operations in accordance with the numeric values of the numeric data read from the second address position.

(9) The numeric data read from the entries of the adjacent first and second addresses of the storage are held in the first and second holding elements to carry out an input operation of the numeric data stored in the first holding element and the prescribed constant or the numeric data held in the second holding in accordance with the numeric values of the numeric data read from the entry of the second address, whereby it is possible to change the contents of the arithmetic operations for the numeric data held in the first holding element in accordance with the numeric values of the numeric data read from the entry of the second address thereby correctly changing the contents of the arithmetic operations in accordance with the numeric values of the numeric data read from the storage.

(10) The two-input arithmetic results are stored in original first addressing of the storage, whereby the same operations can be repeatedly executed.

(11) Either the current address or the precedent address (address next to the precedently accessed one) is stored in the third register as a start address of numeric data to be subjected to a process which is different from a prescribed arithmetic operation in accordance with the first and second flags indicating whether prescribed arithmetic results of the numeric data satisfy prescribed conditions in the most recent precedent cycle and the current cycle respectively, whereby it is possible to correctly decide the start address of the numeric data to be subjected to the processing which is different from the prescribed arithmetic operation in response to a progress request for the processing, thereby correctly omitting unnecessary arithmetic operations.

(12) The address data to be written in the storage as numeric data and entry positions thereof are decided in accordance with the first and second flags indicating whether or not numeric data subjected to the prescribed arithmetic operations in the most recent precedent cycle and the current cycle satisfy the prescribed conditions respectively, the third flag indicating whether or not the difference between the addresses of the storage accessed in the precedent and current cycles is greater than 1, the externally supplied address jump indication signal and the current and precedent addresses, whereby it is possible to correctly decide the start address indicating the start position for omitting the arithmetic operation for writing the data in correct address positions of the storage even if processing signals are supplied from the exterior according to the state of progress of the processing in jumped order, thereby correctly identifying the numeric data for omitting arithmetic operations for omitting the arithmetic operations.

(13) The entries to be stored in the storage are identified and the address data to be stored are decided in accordance with whether or not the prescribed arithmetic results of the numeric data read in the most recent arithmetic operation cycle and the current cycle satisfy the prescribed conditions in accordance with the first and second flags, whereby it is possible to correctly identify the numeric data for omitting arithmetic operations.

(14) The first to seventh flags indicating arithmetic operation states of the processing unit are generated for controlling the operations in the processing unit in accordance with these flags, whereby it is possible to correctly control the operation for writing the numeric data in the storage and identify the numeric data for omitting arithmetic operations in accordance with the state of progress of the processing in the arithmetic processing unit.

(15) Update timings for the first to seventh flags are decided by the control signals supplied from the exterior, whereby it is possible to update only a desired flag under control by the external control unit.

(16) Access inhibition from the exterior to the storage is forcibly stopped, whereby it is possible to write necessary numeric data in the storage at a desired timing from the exterior.

(17) Access to the storage is inhibited in inhibition of processing execution, whereby only necessary data can be written in the storage.

(15) The signal for indicating accessibility to the exterior is generated in accordance with a flag indicating interruption of access to the storage and that indicating completion of access, whereby the external unit can access the storage in an accessible state.

(19) A plurality of arithmetic units whose processing contents are changeable in accordance with numeric values of the numeric data, the control unit for supplying instructions to the plurality of arithmetic units in common and the nonlinear conversion unit for nonlinearly converting the outputs of the arithmetic units are provided, whereby it is possible to implement an SIMD neural network which can effectively execute arithmetic operations while omitting unnecessary arithmetic operations.

(20) Each of the plurality of arithmetic units includes at least two numeric data input ports and at least two numeric data output ports while the plurality of arithmetic units are cascade-connected with each other, whereby it is possible to set the numeric data utilized in the plurality of arithmetic units independently of each other so that only necessary numeric data are successively supplied to these plurality of arithmetic units to execute operations, thereby efficiently carrying out the processing.

(21) Both of the input and output ports have a process data input port and an address input port for addressing the storage so that individual addresses for the storage of the plurality of arithmetic units can be independently set and only necessary process data can be supplied to the plurality of arithmetic units for carrying out arithmetic operations while reading corresponding numeric data from the storage means, thereby omitting arithmetic operations for unnecessary numeric data.

(22) The control unit is adapted to simultaneously notify the plurality of arithmetic units of address data and process data through the common bus which is provided for the plurality of arithmetic units in common, whereby it is possible to simultaneously supply necessary numeric data to the plurality of arithmetic units.

(23) The selector is employed to insert the nonlinear conversion processing part between a specific arithmetic unit and an arithmetic unit adjacent thereto in the cascade connection, whereby the nonlinear conversion unit can be inserted in the cascade-connection of the arithmetic units only when output state value calculation of the neural network is necessary, resulting in efficient carrying out of the processing. Further, it is not necessary to provide the nonlinear conversion part in all arithmetic units, and hence the unit area or size can be reduced.

(24) The arithmetic units are connected in the form of a ring, whereby it is possible to successively transfer necessary data to the arithmetic units by shift operations, thereby efficiently executing the processing.

(25) A plurality of arithmetic units are bypassed by the first and second selectors, whereby the control unit can directly transfer numeric data with the exterior for carrying out necessary processing on inputted numeric data to output the processing results. When a plurality of arithmetic processing units are cascade-connected with each other, further, it is possible to notify numeric data between control units for the plurality of arithmetic processing units, thereby readily executing arithmetic operations such as calculation of the maximum or minimum values, for example, in a large-scale system.

(26) Each of the arithmetic units is adapted to control the result register for storing arithmetic result data produced in the arithmetic unit, a state register for storing the status flag indicating which one of a plurality of possible states the arithmetic result belongs, and storage of the output of the computing element in the arithmetic result register in accordance with the status flag, whereby numeric data satisfying prescribed conditions can be held in the arithmetic result register so that an arithmetic result output satisfying a condition such as the maximum or the minimum can be obtained.

(27) A specific bit of the status flags is selected and notified from each of the plurality of arithmetic units to the control unit, whereby the control unit can select arithmetic result outputs satisfying specific conditions from those of the plurality of arithmetic units. Since only the specific bit is notified to the control unit, further, it is possible to reduce occupied areas of signal wires required for selecting the arithmetic result outputs satisfying the specific conditions.

(28) The arithmetic units are arranged on a semiconductor chip to sandwich the control unit and the nonlinear conversion processing units therebetween, whereby it is possible to minimize the lengths of wires between the control unit and the arithmetic units for minimizing propagation delay in these wires, thereby enabling a high-speed operation. Further, the wiring layout is simplified since the arithmetic units are arranged on both sides of the control unit.

(29) In each of the arithmetic units, the local memory is arranged on the semiconductor chip side, whereby a circuit part operating in accordance with a signal transmitted from the control unit can be arranged in a region close to the control unit and each arithmetic unit can transfer signals with the control unit at a high speed for operating at a high speed. In each arithmetic unit, further, the computing element group, the register group and the circuit part necessary for operation control can be arranged in proximity to each other to minimize the length of wires for interconnecting these elements, thereby driving the arithmetic unit at a high speed.

(30) The content of the process to be executed is switched in accordance with the numeric values of the numeric data read from the numeric data memory and a plurality of arithmetic units are provided in parallel with each other to be supplied with instructions from the control unit in common, whereby it is possible to implement an efficient SIMD system numerical arithmetic processing unit which can perform arithmetic operations only on necessary numeric data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A numerical arithmetic processing unit comprising:

storage means for storing numeric data; and set means for reading a numeric data from said storage means; and setting processing to be executed subsequently to the reading of the numeric data from said storage means in accordance with a numeric value of said numeric data being read each said numeric data including a numeric part onsisting of a numeral data and a numeric code part including a code specifying whether the numeric data is data to be arithmetically processed or data indicating processing to be executed subsequently, said code including said numeric value.

2. The unit in accordance with claim 1, wherein said storage means includes the plurality of entries each linking and storing the numeric part and a numeric code part as said numeric data.

3. The unit in accordance with claim 2, wherein said set means includes means for setting arithmetic processing to be subsequently executed in accordance with each said numeric code part.

4. The unit in accordance with claim 2, wherein each said numeric code part specifies whether a related numeric part is numeric data to be arithmetically processed or an address indicating a position of an entry having numeric data subsequently read from said storage means.

5. The unit in accordance with claim 4, wherein said set means includes means for incrementing an address indicating a position of an entry storing said numeric data read out in said storage means by 1 when said numeric code part indicates that said related numeric part is numeric data to be arithmetically processed, while setting said related numeric part as said address when said numeric code part indicates that said related numeric part is said address.

6. The unit in accordance with claim 4, further comprising:

a first register for storing a current address indicating an entry of said storage means storing a numeric data being read from said storage means in a current cycle, a second register for storing an address subsequent to an address indicating an entry storing a numeric data subjected to predeterminedly set arithmetic processing in a precedent cycle as a precedent address, first flag generation means for generating a first flag indicating whether said numeric data being subjected to said predeterminedly set arithmetic processing in said precedent cycle satisfies a predeterminedly set logical condition, second flag generation means for generating a second flag indicating whether the result of said prescribed arithmetic processing of the numeric data read in said current cycle satisfies said prescribed condition, third flag generation means for generating a third flag indicating whether a difference between said precedent address being stored in said second register and said current address being stored in said first register is greater than 1, and address deciding means for deciding an address data to be written in said storage means as said numeric data and an entry position of said storage means to be subject to the writing of the decided address data in accordance with said first flag, said second flag, said current address, said precedent address and an address skip indication signal being supplied from an exterior.

7. The unit in accordance with claim 6, wherein said address deciding means includes:

state deciding means for deciding whether (a) said prescribed arithmetic processing of said numeric data satisfies said prescribed condition in both of said precedent and current cycles, (b) the result of said prescribed arithmetic processing of said numeric data being read in said current cycle does not satisfy said prescribed condition and the result of said prescribed arithmetic processing of said numeric data being read in said precedent cycle satisfies said prescribed condition, or (c) the result of said prescribed arithmetic processing of said numeric data being read in said current cycle satisfies said prescribed condition and the result of said prescribed arithmetic processing of said numeric data in said precedent cycle satisfies said prescribed condition, in accordance with said first and second flags, first write means for storing said current address in an entry of said storage means being specified by said precedent address in accordance with a decision of said state deciding means on said state (a), means for storing one of said current address and said precedent address in a fourth register in accordance with said address skip indication signal and said third flag when said state deciding means decides said state (b), and means for storing said current address in an entry of said storage means being indicated by an address stored in said fourth register in accordance with detection of said state (c) by said state deciding means.

8. The unit in accordance with claim 7, wherein said means for storing in said fourth register includes means for storing said current address in said fourth register when said address skip indication signal indicates no address jump while storing said precedent address in said fourth register when said address skip indication signal indicates an address jump and said current address is greater than said precedent address.

9. The unit in accordance with claim 2, further including addition means for adding said numeric data being read from said storage means, said set means including means for inhibiting said addition means from adding said numeric data being read from said storage means in accordance with the numerical value of said numeric code part.

10. The unit in accordance with claim 2, further including two-input arithmetic means carrying out a logical operation on data received at the two inputs, said set means comprising:

first holding means for holding and supplying a first numeric data read from an entry of a first address of said storage means to one input of said two-input arithmetic means, second holding means for holding a second numeric data being read from a second entry being adjacent to said first address, and selection means for supplying one of said numeric data being held by said second holding means and a predetermined constant to the other input of said two-input arithmetic means in accordance with the numeric value of said numeric code part of said second numeric data.

11. The unit in accordance with claim 10, further comprising write means for writing an output of said two-input arithmetic means in the entry of said first address of said storage means.

12. The unit in accordance with claim 2, further comprising:

a first register for storing a jump target address indicating a position of an entry storing a numeric data to be subsequently subjected to a prescribed arithmetic processing, first flag generation means for generating a first flag indicating that a difference between an address indicating a position of an entry storing a numeric data being most recently subjected to said prescribed arithmetic processing and a current address indicating a position of an entry of a currently accessed numeric data in a current cycle is greater than one, second flag generation means for generating a second flag indicating that an address of said storage means are jumped in response to an address skip indication signal supplied from an exterior, third flag generation means for generating a third flag indicating whether numeric a data being read from said storage means is to be subjected to said prescribed arithmetic processing in accordance with the numeric code part of said numeric data being read, fourth flag generation means for generating a fourth flag indicating whether a numeric data being subjected to said prescribed arithmetic processing or a numeric data subjected to the processing being different from said prescribed arithmetic processing is to be written as a numeric data in writing of a numeric data in said storage means, fifth flag generation means for outputting said fourth flag in a precedent cycle preceding said current cycle as a fifth flag indicating a write control of said current cycle, sixth flag generation means for outputting said first flag in said precedent cycle as a sixth flag indicating an inhibition of a data writing into said storage means in said current cycle, and seventh flag generation means for generating a seventh flag indicating whether said current address reaches a prescribed limit address.

13. The unit in accordance with claim 12, further comprising decoder means for decoding a multibit control signal from the exterior and setting flag update timings for said first to seventh flag generation means.

14. The unit in accordance with claim 13, wherein each of said first to seventh flag generation means includes (i) a flag register for latching a corresponding status flag, and (ii) selection means for selecting one of an output of said flag register included therein and a newly generated flag in accordance with a decode signal from said decoder means and transmitting the selected one to the corresponding flag register.

15. The unit in accordance with claim 14, further comprising reset means for forcibly resetting one of said sixth and seventh flags in response to a control signal from the exterior.

16. The unit in accordance with claim 2, further comprising means for forcibly releasing inhibition of an access to said storage means in response to a control signal from an exterior.

17. The unit in accordance with claim 2, further comprising:

means for generating a first flag indicating a completion of an access to said storage means, second flag generation means for generating a second flag indicating that an entry position being accessed in said storage means reaches a predeterminedly set address of said storage means, and means for generating a signal indicating an accessibility to said storage means to an exterior in response to said first and second flags.

18. The unit in accordance with claim 1, wherein said storage means stores a first numeric data in the location of a first address while storing a second numeric data in the location of a second address being adjacent to said first address, said set means including means for setting a processing to be subsequently executed in accordance with the numeric value of said second numeric data.

19. The unit in accordance with claim 18, wherein said set means includes means for setting either an operation utilizing said first and second numerical data or a predetermined arithmetic operation of said first numeric data and a predetermined constant in accordance with the numeric value of said second numeric data.

20. The unit in accordance with claim 1, wherein said set means includes means for setting said processing to be subsequently executed in accordance with a bit value of a least significant bit of said numeric data.

21. The unit in accordance with claim 1, further comprising:

a first register for storing a current address indicating a position in said storage means storing a currently accessed numeric data, a second register for storing a precedent address indicating an address being subsequent to a position storing a numeric data accessed in a precedent cycle, first flag generation means for generating a first flag indicating whether the result of arithmetic processing of said numeric data read in said precedent cycle satisfies a predetermined logic condition, second flag generation means for generating a second flag indicating whether the result of said arithmetic processing of said currently accessed numeric data satisfies said predetermined logical condition, and address deciding means for deciding either said current address or said precedent address as a start address for numeric data to be subjected to arithmetic processing being different from a predeterminedly set arithmetic processing and storing a decided one in a third register, said start address defining a head address of a series of numeric data when said numeric data to be subjected to the arithmetic processing different from said predeterminedly set arithmetic processing are successive.

22. An arithmetic processing apparatus including:

a plurality of arithmetic units each having (i) arithmetic means whose arithmetic processing content is changeable in accordance with a numeric value of a supplied numeric data, (ii) a memory for storing data utilized by said arithmetic means, and (iii) a register for storing a flag data indicating accessibility to said memory and a state of progress of the processing in said arithmetic means, and a control unit commonly coupled to said plurality of arithmetic units for supplying an arithmetic instruction to said plurality of arithmetic units in common, said control unit including reset means for forcibly resetting said flag data in all of said plurality of arithmetic units for enabling an access to said memory.

23. The apparatus in accordance with claim 22, wherein said reset means includes means for supplying the numeric data to said plurality of arithmetic units in common and resetting all of said flag data when all said flag data from said plurality of arithmetic units each indicate an access inhibition to said memory.

24. The apparatus in accordance with claim 22, wherein said control unit includes means for transmitting a numeric data write address for said storage means and a numeric data to be written at said numeric data write address in said storage means through an address bus and a data bus being connected to said plurality of arithmetic units in common.

25. A numerical arithmetic processing unit comprising:

a plurality of arithmetic units each including (i) a computing element, (ii) a memory for storing numeric data utilized by said computing element and (iii) means for changing a content of a processing to be subsequently executed in a related arithmetic unit in accordance with a numeric value of a numeric data read from said memory, said plurality of arithmetic units being arranged to operate in parallel with each other;

a control unit being provided for said plurality of arithmetic units in common for simultaneously issuing a common instruction to said plurality of arithmetic units for making said plurality of arithmetic units execute said common instruction for outputting the result execution; and a nonlinear conversion processing unit for nonlinearly converting outputs received from said plurality of arithmetic units successively for outputting the result of nonlinear conversion successively.

26. The unit in accordance with claim 25, wherein each of said plurality of arithmetic units includes at least two numeric data input ports and at least two numeric data output ports, said plurality of arithmetic units being cascade-connected with each other by said input ports and said output ports to include a first through final stage arithmetic unit.

27. The unit in accordance with claim 26, wherein said at least two numeric data input ports include an address input port for inputting address data specifying an address of said memory, and a data input port for inputting data to be processed by said computing element, said at least two output ports including an output port for outputting said address data, and a data output port for outputting said data to be processed.

28. The unit in accordance with claim 26, further comprising:

a common bus being provided for said plurality of arithmetic units in common, for simultaneously notifying said plurality of arithmetic units of process data from said control unit and address data indicating an address of said storage means in which said process data is to be written.

29. The unit in accordance with claim 26, further including:

selection means provided between said output ports of a predeterminedly selected specific arithmetic unit in said cascade connection and said input ports of another arithmetic unit being adjacent to said specific arithmetic unit in the cascade connection for selecting either data outputted from said output ports of said specific arithmetic unit or output data from said nonlinear conversion processing unit and transmitting the selected one to said input ports of said another arithmetic unit.

30. The unit in accordance with claim 26, wherein said input ports and said output ports of said plurality of arithmetic units are connected to form a ring-shaped data transmission channel.

31. The unit in accordance with claim 26, further comprising:

first selection means being provided at a prestage in front of said input ports of the first-stage arithmetic unit in said cascade connection for transmitting supplied numeric data to either said input ports of said first-stage arithmetic unit or an input port of said control unit, and second selection means being provided in a subsequent stage coupled to said output ports of the final-stage arithmetic unit in said cascade connection for selecting and passing either numeric data being transferred from said output ports of said final-stage arithmetic unit or numeric data from said control unit to the first selection means.

32. The unit in accordance with claim 25, wherein each of said plurality of arithmetic units further includes:

an arithmetic result register for storing an arithmetic result output of said computing element, a state register storing a status flag indicating in which one of a plurality of preobtained possible states of the arithmetic result of the computing element said arithmetic result is, and means for controlling storage of said arithmetic result output of said computing element in said arithmetic result register in accordance with said status flag stored in said state register.

33. The unit in accordance with claim 32, wherein said status flag is a multibit flag, and wherein each of said plurality of arithmetic units further comprises means for selecting a specific bit of said multibit flag and notifying said control unit of the specific bit.

34. The unit in accordance with claim 25, wherein said numeric arithmetic processing unit is integrated on a single semiconductor chip, said plurality of arithmetic units being arranged on said semiconductor chip to hold said control unit and said nonlinear conversion processing unit therebetween.

35. The unit in accordance with claim 34, wherein said memory in each of said plurality of arithmetic units is arranged on an outer periphery end being remote from said control unit on said semiconductor chip.

36. A parallel arithmetic processing unit comprising:

a plurality of arithmetic units each comprising (i) a memory for storing numeric data, and (ii) means for selecting among a plurality of predeterminedly set processings a processing to be executed in accordance with a numeric value of a numeric data read from said memory, said plurality of arithmetic units operating in parallel with each other; and a control unit for supplying a common instruction to said plurality of arithmetic units for making said plurality of arithmetic units operate in parallel with each other.

* * * * *